Jan. 23, 1940.  W. F. QUINBY  2,187,892
TRANSMITTING MEANS
Filed Oct. 6, 1937  11 Sheets-Sheet 2

INVENTOR
W. F. QUINBY
BY M. J. Reynolds
ATTORNEY

Jan. 23, 1940.   W. F. QUINBY   2,187,892
TRANSMITTING MEANS
Filed Oct. 6, 1937   11 Sheets-Sheet 8

INVENTOR
W. F. QUINBY
BY M. J. Reynolds
ATTORNEY

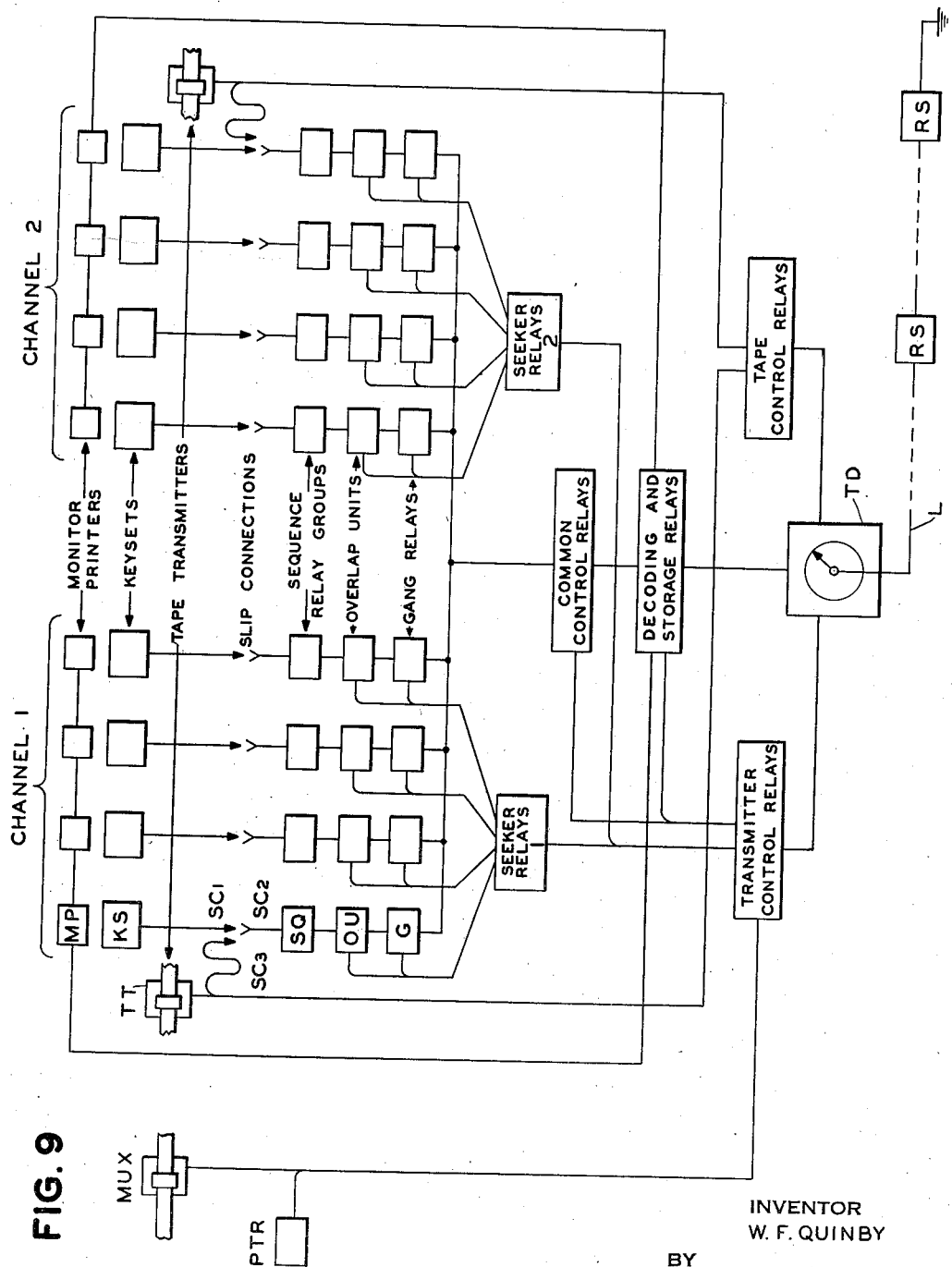

Jan. 23, 1940. W. F. QUINBY 2,187,892
TRANSMITTING MEANS
Filed Oct. 6, 1937 11 Sheets-Sheet 10
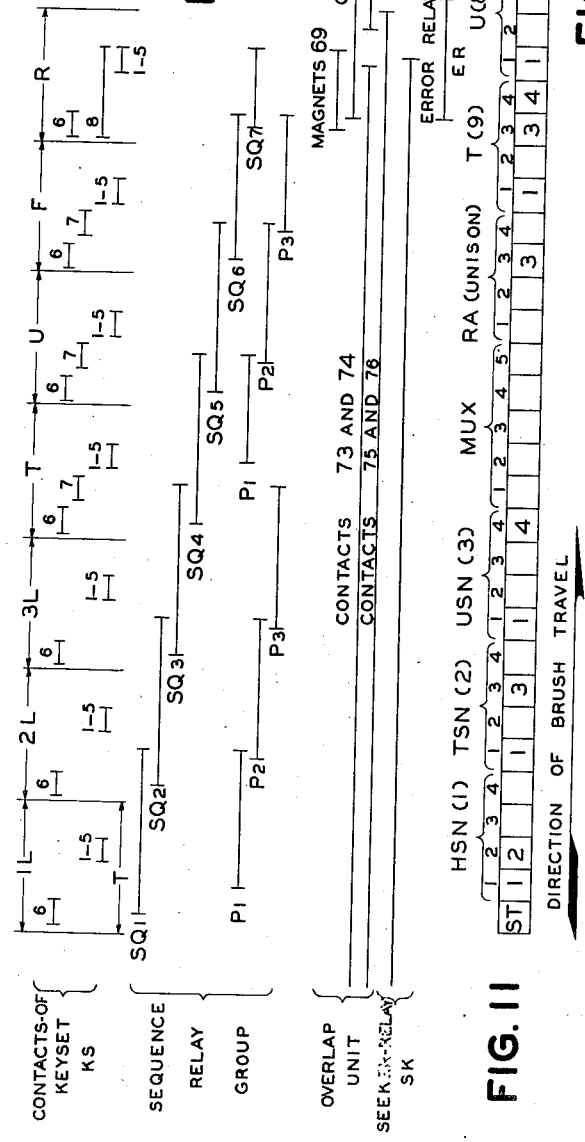
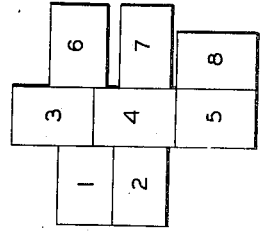
INVENTOR
W. F. QUINBY
BY M. J. Reynolds
ATTORNEY Patented Jan. 23, 1940

2,187,892

UNITED STATES PATENT OFFICE 2,187,892

TRANSMITTING MEANS

William F. Quinby, Long Island City, N. Y., assignor to The Teleregister Corporation, New York, N. Y., a corporation of Delaware Application October 6, 1937, Serial No. 167,541

14 Claims. (Cl. 177—353)

This invention relates to signaling systems and is particularly adapted for the dissemination of information pertaining to quotations for stocks, commodities or the like but is not so limited as it may be used with other communication systems such as telemetering, program systems and the like. It is particularly applicable for use in systems wherein the information transmitted from a central station is reproduced simultaneously at a plurality of receiving stations which may be remotely situated with respect to the origin of information.

In certain systems of this character heretofore devised as for example, systems for posting the quotations of stocks, commodities or other information pertaining thereto, it is the practice to transmit the quotation signals comprising stock selection, price and range signals in permutation code over the single conductor employed, in such a manner that the selection signals sent to the line are permuted in accordance with each letter of the stock designation and preferred designation, if any. At each receiving station suitable selecting means are employed to coordinate the permutation letter signals and thus cause the stock to be selected in accordance with the letter permutation signals received. The receiving mechanism for effecting a selection by five unit permutation code signals corresponding to the letters of the stock designation is necessarily expensive, cumbersome and complicated and since it must be duplicated at each receiving station the cost and maintenance of such receiving mechanism has required a system which is expensive to install and maintain in operation.

In other systems of this character the selection signals comprise a five unit permutation telegraph code signal for each letter of the stock abbreviation, which signals are sent from a transmitting station to a plurality of cities remotely situated from the transmitting station and in each of these cities the received signals are stored and the five unit code selection signals are translated into four unit permutation code number signals and retransmitted to a plurality of receiving stations served by this translator-retransmitter. The duplication of these translator-retransmitters in each of the several cities, required the services of additional maintenance men, were expensive to install and were a potential source of system failure.

Furthermore, in systems of this character hitherto devised, the transmitting apparatus thereof cannot be operated by more than four operators at any one time. Such systems are not suitable for furnishing the present required type of service in which quotations are taken simultaneously from a large number of tickers respectively associated with the many different exchanges, produce markets, curb markets, bond markets and the like in the United States and Canada.

Among the objects of the present invention is a quotation system for stocks or other items in which the information to be transmitted may be initiated by any desired number of operators' keysets, whereby a considerable number of operators may simultaneously transmit without interference the information obtained from a considerable number of ticker tapes and other sources.

Another object of the invention is a quotation system wherein the information to be transmitted may be taken either wholly or in part from one or more perforated tapes and interspersed at will with quotations taken from the operators' keysets.

Another object of the invention is provision at the transmitting station for translatting the stock designation information set up on an operator's keyset or on a perforated tape in five unit letter permutation code and transmitting this information as a three digit number in four unit permutation code, the translating device functioning automatically to set up the selection information in numerical form before the quotation set up on the keyset is transmitted to the outgoing line.

A still further object of the invention resides in the provision of means for the operation of monitor printers directly from the transmitting distributor without the necessity of intermediate retransmitting mechanism, to control these monitor printers by the same storage relays that control the signals transmitted to the outgoing line.

Other objects of the invention are to provide means for transmitting a special or rewrite signal controlling the operation of certain of the receiving stations to the exclusion of others, and to print a character on the monitor tapes representative of this signal.

Additional objects and advantages of the invention will be apparent from the following description taken in connection with the accompanying drawings and specifically pointed out in the appended claims.

Briefly, the illustrative embodiment of the invention shown in the accompanying drawings and described in detail hereinafter comprises a transmitting system wherein the quotations originate at the keysets and tape transmitters and are subsequently transmitted by a transmitting distributor having segments thereon which are electrified in accordance with combinations of signals representative of the information to be transmitted over a single outgoing conductor and over a plurality of conductors to a plurality of groups of monitor printers.

The system herein disclosed comprises two groups of operators' keysets each group being associated with an individual channel. The two groups of keysets are selected alternately so that during an odd numbered revolution of the transmitting distributor signals for channel 1 will be transmitted and during even numbered revolutions of the distributor the information transmitted comprises channel 2 signals.

Four keysets are associated with each channel or a total of eight keysets for the two aforesaid channels. Each keyset is similar in appearance to a typewriter key board, there being one additional row of keys controlling the range selection and starting of the transmitter. This group of range keys is provided with a mechanism which prevents the operation of any range key of the group until the previous quotation written on the keyset has progressed sufficiently in the process of transmission as not to be in interference with the succeeding quotation written on the keyset.

The grouping of the stocks or other items may be made in any convenient manner between the two channels, as for example, all stocks having the first letter of the stock abbreviation within the alphabetical grouping of A to J may be grouped into channel 1 signals and the remaining stocks K to Z grouped into the second channel. The operator obtains the information to be written on these keysets from one or more tickers conveniently placed so that the ticker tape issuing from each ticker passes in front of the operator. The tickers may be arranged to print only that information to be transmitted from the associated keyset, all other information having been deleted from the ticker tapes. The operator depresses the letter and figure keys of the keyset corresponding to the information appearing on the tape. Should the stock symbol comprise three letters followed by a price consisting of three digits, the operator successively depresses the letter keys corresponding to the stock symbol, and then the figure keys corresponding to the price. A range key is then depressed which selects the range or ranges to be posted and causes the transmission of the information written on the keyset.

The range keys are representative of the positions in which the price for any stock is to be posted on a subscriber's board, there being five range positions for each stock designated: previous close, open, high, low and last respectively. Certain of the range keys cause the simultaneous operation of the indicators for an item in a plurality of the range positions thereof. The range or ranges within which a stock price is to be posted may be determined by an editor adjacent to the operator who marks the tape for the operator's guidance in transmitting quotations.

In the event that a stock symbol comprises one or two letters only, the operator depresses one or two keys corresponding to the symbol and then depresses keys for the associated price and lastly the range key.

Five contacts which are operated in predetermined code by depression of the various letter, figure, and range keys, are connected by means of sequence relays which are under control of the keyset, to various groups of magnets of an overlap unit thereby causing each character of the information representative of the various key depressions to be successively stored in code on the mechanism of the overlap unit.

The overlap unit shown on Figs. 17a, 17b and 17c comprises a plurality of selection magnets, each magnet having an operate and separate locking winding, a locking contact and a set of contacts which are arranged to be mechanically locked in either the closed or opened position.

Each selection magnet, following the energization of its operate winding, closes a pair of contacts which energizes a second or locking winding of the magnet to maintain the magnetic flux and thus assist in effecting the closure of the second pair of contacts. These latter contacts, however, are restrained from closing by a common bar. Upon the subsequent operation of a pair of transfer magnets, the common bar is withdrawn from interference with the contacts and those whose associated selection windings are energized are then permitted to close and the common bar is subsequently restored to maintain these contacts in a closed condition as the associated selection magnets are deenergized.

The selection magnets of the overlap unit are divided into groups, each group representative of a portion of the information to be transmitted.

Each character of the information or quotation written by the operator on the keyset is successively stored on the magnets of the overlap unit. The depression of a range key causes the range groups of selection magnets of the overlap unit to take a setting corresponding to the operated code contacts controlled by the range key depressed which operates the overlap unit to transfer the settings of all operated selection magnets to their associated contacts.

The contacts of the overlap unit are subsequently connected through two gang relays G1 and G2, Fig. 1, and four common control relays CC1 to CC4 on Figs. 4 and 5 to the storage and decoding relays of the transmitter. The operation of the gang relays to transfer the information stored on the overlap unit, is controlled by seeker relays. There is a seeker relay associated with each overlap unit and locked to a contact thereon. During the transfer of the quotation from the selection magnets to the contacts of the overlap unit, the seeker contact is opened thereby releasing its associated seeker relay. The seeker relay in releasing permits the transmitting distributor to revolve.

Seeker control relays under control of timing segments on the transmitting distributor, cause the operation of the aforesaid gang relays in a predetermined selective order in accordance with the condition of the overlap units. The four common control relays CC1 to CC4 are operated from timing segments on the transmitting distributor. The operation of these latter relays is such that the signals stored on the contacts of the overlap unit are transferred to the decoding and storage relays in sections so as to provide for overlap operation.

The seeker relays are so connected that, should they all be in a released condition simultaneously, indicating that signals for a complete transmission have been stored in all of the overlap units, these signals will be successively transmitted in a predetermined order. The circuit arrangement is such, however, that signals are transmitted successively from any number of keysets of a channel without loss of time due to the allotment of transmission time to idle keysets of the same channel.

During the revolution of the transmitting distributor during which a stock abbreviation is stored on the decoding relays, the monitor printers associated with the channel to which that quotation has been assigned, print the stock symbol. Also, during this revolution the stock abbreviation is decoded and recoded into a predetermined three digit stock number.

During the succeeding revolution of the distributor this stock number is transmitted over the line L, Fig. 6, as a permutation code together with the range and price of the quotation. The monitor printers MP1 or MP2, Fig. 6, which indicate the stock symbol, during this revolution print the range and price. Also, during this revolution, a quotation of the opposite channel is transferred to the decoding and storage relays and the monitor printers associated with that channel are caused to print the stock abbreviation of the quotation.

Should the first quotation to be transmitted be a channel 2 quotation, blank signals are transmitted during the first revolution of the transmitting distributor and this quotation will be transmitted during the second revolution of the distributor. A subsequent quotation on channel 1 may be transmitted during the third revolution of the distributor.

Interspersed with each transmission of a quotation is a signal for a multiplex character, the transmission of which will be hereinafter described.

In order that the invention may be more fully understood, reference will be had to the following drawings disclosing one embodiment thereof in which the Figs. 1 to 8 illustrate stock quotation transmitting apparatus embodying the principles of my invention.

Fig. 9 shows a diagram of the transmitting system.

Fig. 10 represents a timing chart of various elements of the transmitting equipment.

Fig. 11 represents a set of signals transmitted by the distributor during one revolution thereof.

Fig. 12 shows a suitable code for letters.

Fig. 13 shows a suitable code for range.

Fig. 14 shows a suitable code for price.

Fig. 15 shows a suitable code for the stock number.

Fig. 16 shows the arrangement of Figs. 1 to 8, and

Figure 1:
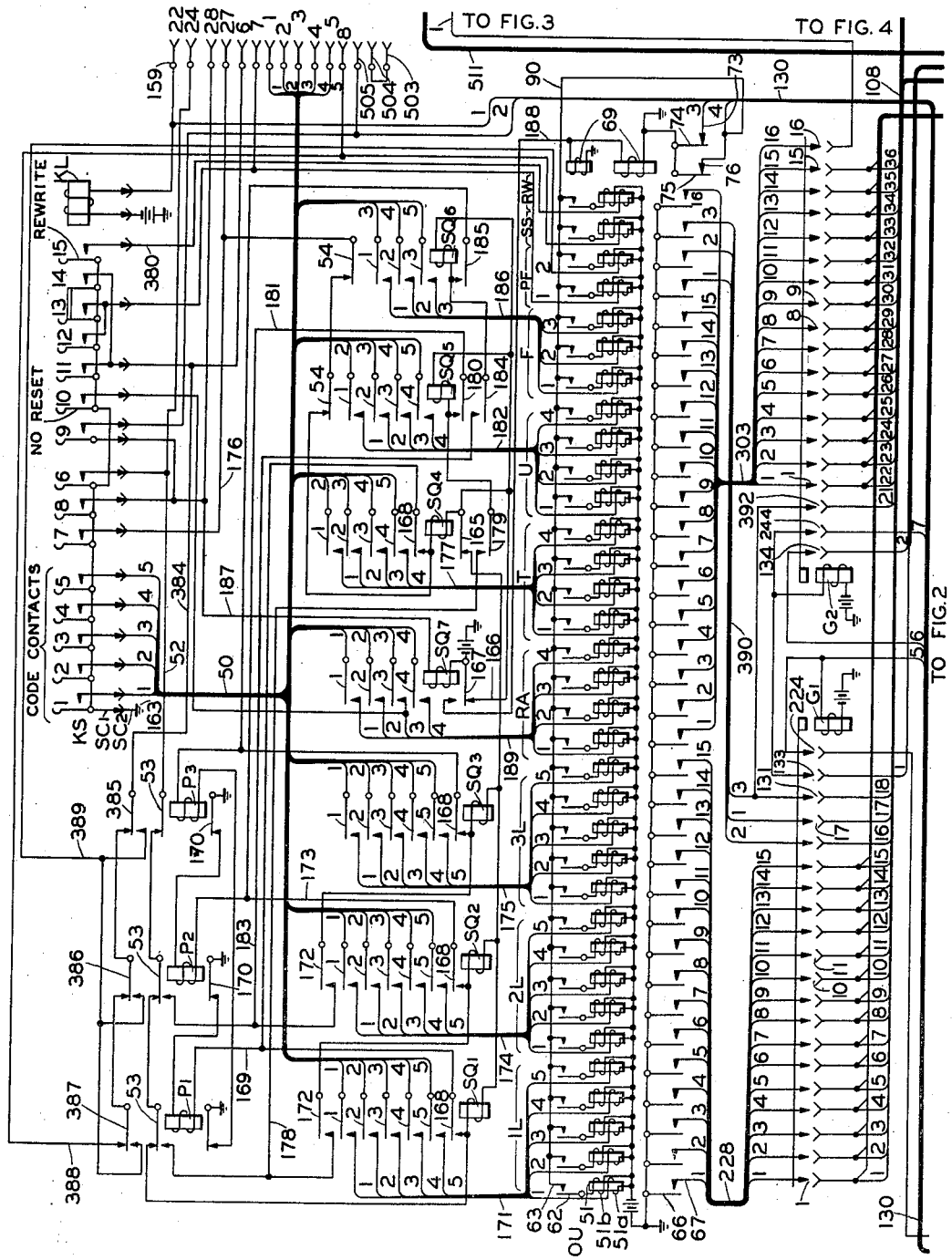

The general arrangement of the system and its complementary equipment may be more fully understood by referring to Fig. 9 which is a diagrammatic sketch of the entire transmitting system, and shows four keysets KS for each of the two channels. Each keyset is connected through slip connections SC1 and SC2 to a sequence relay group SQ which as heretofore stated, successively connects the various combinations of the code contacts of the keyset KS to the associated overlap unit OU. The overlap unit OU upon operation by the depression of a range key of the keyset KS transfers the signal from its contacts, and also causes a seeker relay in its associated seeker group to be released. The release of the seeker relay causes the transmitting distributor TD to rotate. The rotation of transmitting distributor TD causes the operation of the gang relays G associated with the seeker relay released, through the medium of seeker control relays of the transmitter control group. The operation of the gang relays G connects the contacts of the overlap unit OU to one side of the contacts of four common control relays of the common control group. The subsequent operation of the four common control relays by the distributor TD and through the medium of relays of the transmitter control group, causes the signal stored on the overlap unit OU to be transferred to relays of the decoding and storage group. The decoding relays under control of the transmitter control group decode the signals for the stock symbol and recode it into a three digit stock number which is transmitted over the line L, together with the price and range of the stock during the succeeding revolution of the transmitting distributor TD.

During the rotation of the transmitting distributor TD the stock symbol, price, and range characters which were stored on the decoding and storage relays were caused to be displayed on the tapes of the monitor printers MP associated with the channel of the stock transmitted.

A tape transmitter TT is provided for each channel for use with prepared tapes so that information may be transmitted from these transmitters. A tape transmitter TT may be substituted for any keyset of either channel by disengaging slip connection CS1 from SC2 and engaging slip connection SC3 of a tape transmitter TT with SC2. The tape transmitter TT under control of the tape control group and the transmitting distributor TD then causes the information which is stored in the tape to be successively stored in the overlap unit OU and subsequently transmitted in a manner similar to that of a transmission directly from a keyset.

A third tape transmitter MUX, under control of the transmitter control group, is provided for the transmission of messages, news items or other information. One character of a message is transmitted during each revolution of the transmitting distributor TD. A signal for each character is interspersed with the signals of a quotation being transmitted during a revolution. A multiplex printer PTR operates under control of the transmitter control group and serves to record the information transmitted by the tape transmitter MUX.

Keyset

As heretofore stated, each keyset KS, Fig. 1, is similar in general appearance to that of a typewriter comprising a plurality of keys, twenty-six of which are assigned to the letters of the alphabet, there being one key for each letter thereof. Ten keys are assigned to the digits 0 to 9 and the keys of this ten key group may also be used to transmit the fractions portion of a price. Ten other keys represent the various ranges in which the stock prices are to be posted. There are three keys each individual to the first, second and third preferred issues of the stock which operate contacts 11, 12 and 13 and 14 respectively. One key designated "no-reset" operates contact 10 which indicates that the tens digit of a price is to remain unchanged and another key called the "error" key, which when depressed before a range key operates contact 9, causes the information stored on the overlap unit OU to be released. A "blank" key is also provided, which is depressed when one or more digits of the stock price is to be deleted from the previous quotation or when it is desired to omit the transmission of the tens or units portion of the price. The depression of the blank key causes none of the contacts 1 to 5 to close. A "rewrite" key which operates contact 15 provides a special signal the purpose of which is hereinafter described.

There are five code contacts 1 to 5, Fig. 1, which close in predetermined combinations by the depression of the various letter, price, and range keys and cause the combination set thereon to be stored in the overlap unit OU. The combinations in which the contacts 1 to 5 are closed by the depression of the letter, range and price keys are shown in Figs. 12, 13 and 14 respectively. The letter code shown on Fig. 12 comprises five units controlled by code contacts 1 to 5, the range code is obtained from code contacts 1 to 4, the 4 unit code for the integers of the price from code contacts 2 to 5 and the 3 unit code for fractions from code contacts 3 to 5 of the keyset KS.

Associated with the letter and price keys is a control contact 6. Referring to the Keyset portion of the timing chart, Fig. 10, it will be seen that contact 6 closes and opens prior to the closing of the five code contacts 1-5 during the operating time T, when any one of these keys is depressed. This contact 6 operates certain of the sequence relays SQ1 to SQ7, Fig. 1, which switch the circuits successively from the five code contacts 1 to 5 to groups of selection magnets of the associated overlap unit OU.

Under control of the price keys and in addition to the control contact 6, is another control contact 7. As shown on the Keyset portion of the timing chart, Fig. 10, contact 7 closes and opens after the control contact 6 has operated and prior to the closing of the combination of the five control contacts 1-5. The first operation of this control contact 7 indicates to the group of sequence relays SQ1 to SQ7, Fig. 1, that the following operation of the five code contacts 1-5 in combination is indicative of the tens price digit of the stock whose symbol had just been written.

The "no-reset" key operates the control contact 7 and also closes the contact 10, Fig. 1, which adds the third unit to the range code to be set up on the group of selection magnets RA of the overlap unit OU, Fig. 1, by the subsequent depression of a range key.

The depression of any one of the range keys operates a control contact 8. Again referring to the Keyset portion of the timing chart, Fig. 10, it will be noted that contact 8 closes prior to the closure of the code contacts 1-5 and remains closed during the period of closure of these latter contacts. The control contact 8, indicates to the sequence relays that the combination, next set up on the code contacts 1-5, is to be transferred to the range group of selection magnets RA of the overlap unit OU, Fig. 1.

Figure 3:
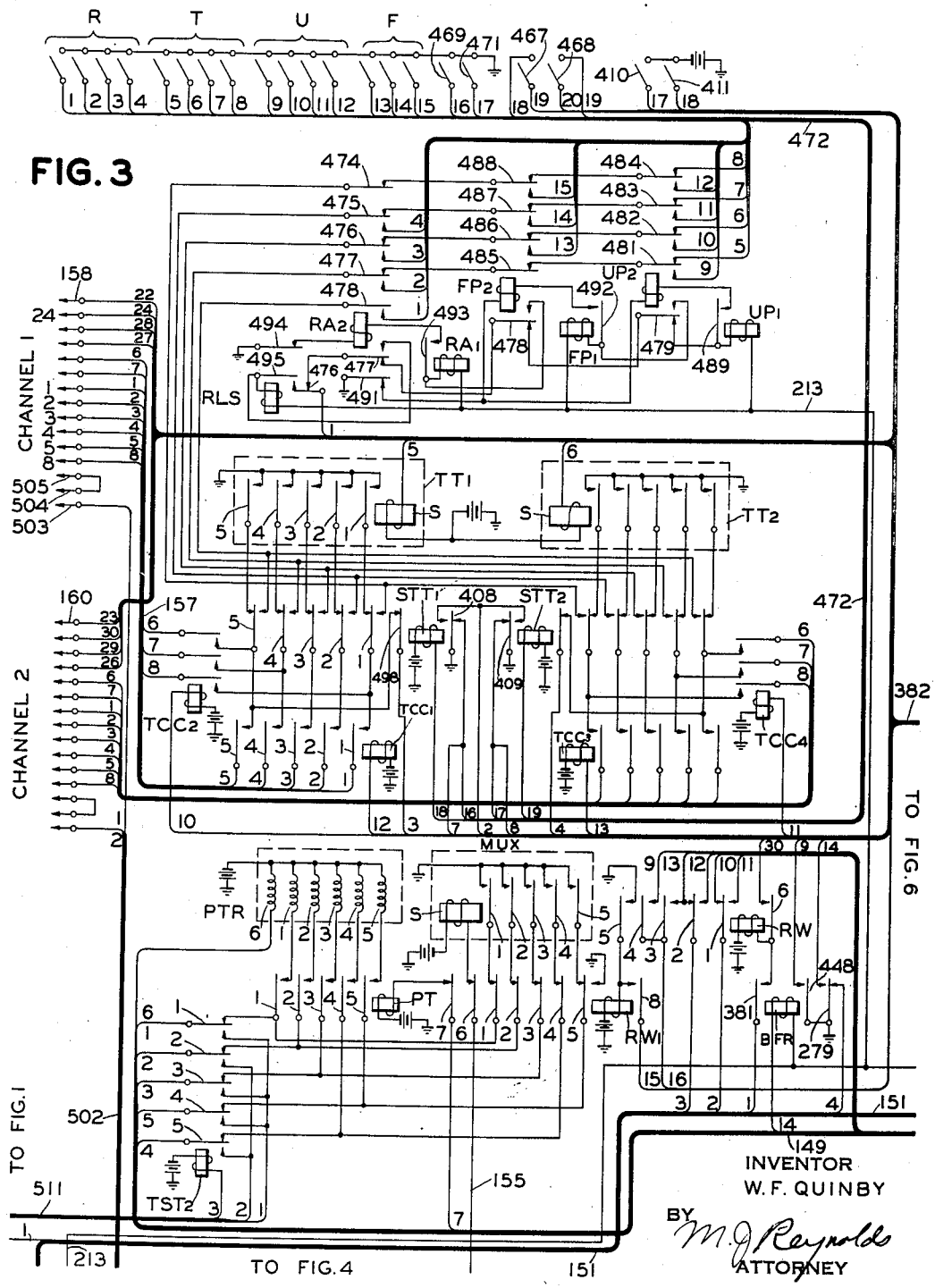
Figure 4:
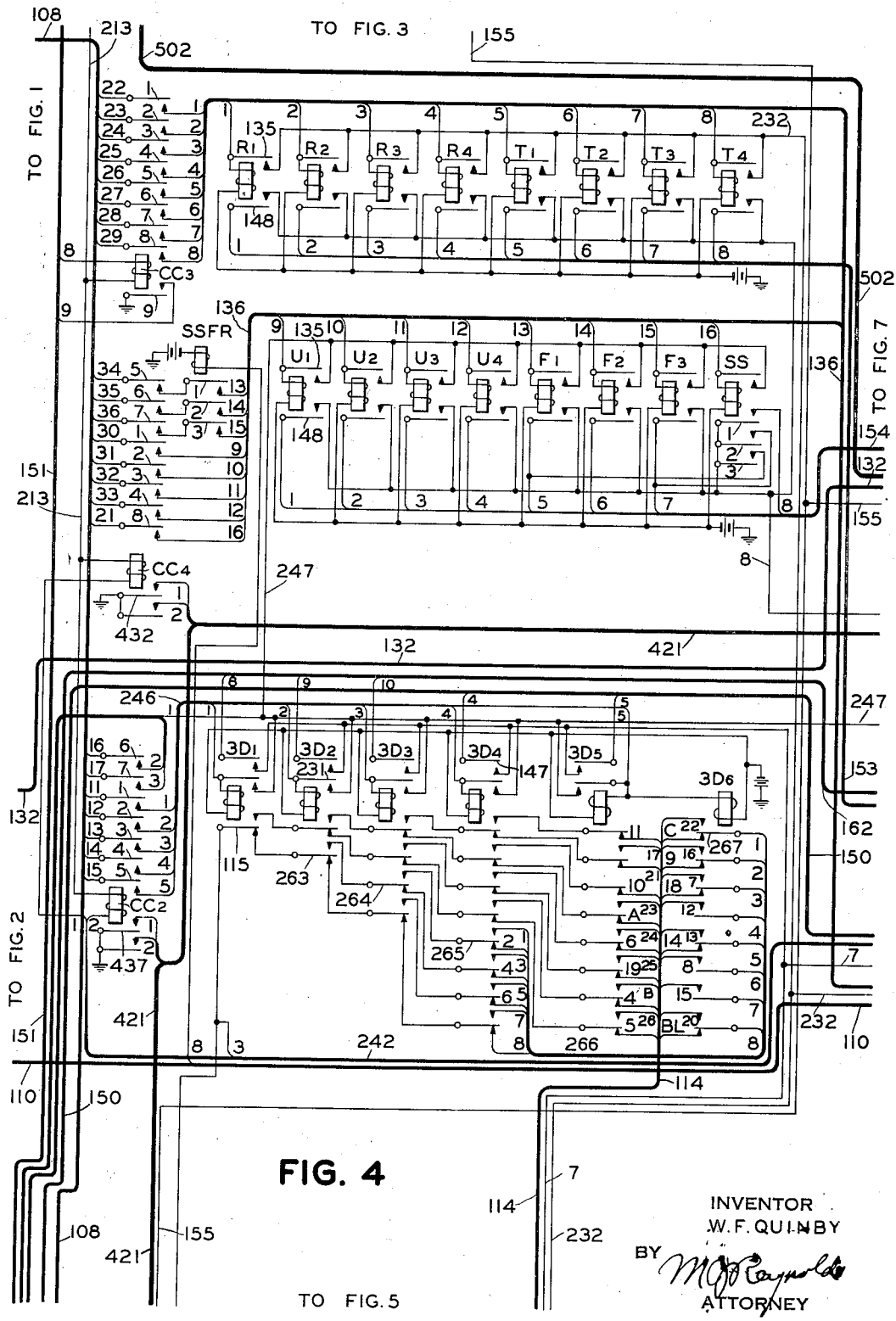

Associated with the range keys is a locking mechanism KL, Fig. 1, which prevents the operation of any of the range keys at a time when a previously written quotation has not been fully transferred from the contacts of the associated overlap unit OU, to the storage and decoding relays 1D1 to 1D6, 2D1 to 2D6, PF1 and PF2, Fig. 5 and 3D1 to 3D6, R1 to R4, T1 to T4, U1 to U4 and F1 to F3, Fig. 4. The locking mechanism of each keyset is under control of a seeker relay SK, Fig. 2, associated therewith.

The keysets are connected to their associated equipment by means of slip connections SC1 and SC2 which provide means for disconnecting a keyset in order that information may be taken from an associated tape transmitter TT, Fig. 3, the operation of which is hereinafter described.

*Sequence relays*

There are seven sequence relays, SQ1 to SQ7, Fig. 1, and three prime relays P1 to P3 associated therewith, individual to and under control of each keyset KS. The sequence relays serve to switch the conductors 1 to 5 of cable 50 which are connected to the five code contacts 1 to 5 of the keyset KS, to the operate windings 51A of the various groups of the selection magnets 51 of the overlap unit OU. These sequence relays operate from the control contacts 6, 7 and 8 of the keyset KS, in the manner previously described. The timing chart, Fig. 10, clearly shows the time relation of the operation of the sequence relays SQ1 to SQ7 and the relays P1, P2 and P3 to the control contacts 6, 7 and 8 during the following cycle of operations.

As the operator depresses a letter key indicative of the first letter of a stock symbol or abbreviation, the control contact 6 of the keyset KS closes and causes the operation of the sequence relay SQ1 over the following circuit. Battery at armature 167 and break contact of relay SQ7, armature 165 and break contact of relay SQ4, winding of relay SQ1, break contact and armature 53 of relays P1, P2 and P3 respectively, conductor 52, and through control contact 6 and slip connections SC1 and SC2 to ground. As the control contact 6 opens, the prime relay P1 operates in series with the sequence relay SQ1 from grounded armature 170 and break contact of relay P2 over a circuit closed by armature 168 and make contact of relay SQ1. The operation of relay SQ1, completes a circuit from the conductors 1 to 5 of cable 50 extending from the code contacts 1 to 5, to the group of five selection magnets 1L of the overlap unit OU, which group is used for storing the code corresponding to the first letter written.

Upon the depression of a letter key corresponding to the second letter of the stock designation, the control contact 6 again closes, and at this time operates the sequence relay SQ2, the conductor 52 from the control contact 6 having been switched from relay SQ1 to the relay SQ2 by the operation of the armature 53 of prime relay P1. As the control contact 6 opens, prime relay P2 operates in series with relay SQ2 and at armature 170 of relay P2 removes ground from relays P1 and SQ1 causing the release of these latter relays. The conductors 1 to 5 of cable 50 from the control contacts are now cut through so that the code signal corresponding to the letter key depressed will be stored on the group of five magnets 2L of the overlap unit OU.

The depression of a letter key indicative of the third letter of a stock symbol, similarly causes the sequence relay SQ3 to cut through the five conductors of cable 50 from the code contacts 1 to 5 to the group of five magnets 3L on the overlap unit OU which are provided for storage of the third letter code signal. The operation of the prime relay P3 in series with the relay SQ3 at the time of the opening of control contact 6 causes the relays P2 and SQ2 to release.

Assuming, for example, that the stock is a first, second or third preferred issue, the operator would depress a preferred key indicative of that issue of the stock, which closes contacts 11, 12 or 13 and 14, to store the signal on the group of two selection magnets PF on the overlap unit OU provided for the storage of signals for the preferred codes. The depression of the preferred keys does not affect the operation of the sequence relays.

Immediately following the writing of the stock symbol the operator depresses keys corresponding to the price to be transmitted. The first price key depressed represents the tens portion of the price. Upon the depression of a price key, as heretofore mentioned, the control contact 7 closes. The control contact 7 upon closure causes the operation of the sequence relay SQ4 over the following circuit: Grounded contacts of control contact 7, conductor 176, armature 54 and break contact of relays SQ6 and SQ5 respectively, winding of relay SQ4, break contact and armature 167 of relay SQ7 and thence to battery. The operation of relay SQ4 at its armature 165 releases relays SQ3 and P1. In the event that the stock symbol had been of one or two letters only, the sequence relays SQ1 or SQ2 would have been operated respectively with the associated prime relay, and these relays would have been released by the operation of relay SQ4 in the manner described for releasing relay SQ3. As control contact 7 opens, relay P1 is permitted to operate in series with relay SQ4. The relay SQ4 upon being operated connects leads 2, 3, 4 and 5 of cable 50 from the associated control contacts of the keyset to the four selection magnets T of the overlap unit OU provided for the tens portion of the price. The code combination representative of the price key depressed is stored by this group of four magnets T when the code contacts 1 to 5 close.

As the key for the following price digit is depressed, representing the units portion of the price, the control contacts 6 and 7 operate. The closing and opening of control contact 6 causes the sequence relay SQ5 to operate and subsequently lock in series with prime relay P2 which then operates. This latter relay in operating causes the release of relays SQ4 and P1 at its armature 170. The operation of control contact 7, after the depression of the first price key for the tens price digit, is not effective as its circuit is opened by the operation of armatures 54 and their break contacts of sequence relays SQ5 and SQ6. The operation of relay SQ5 cuts through the leads from the control contacts 2, 3, 4 and 5 to the group of four selection magnets U on the overlap unit OU for the storage of the units price digit code.

The operation of a fractions key will cause the operation of sequence relay SQ6 and prime relay P3 in series. The operation of relay P3 at armature 170 thereof releases relays SQ5 and P2. Relay SQ6 cuts through leads 3, 4 and 5 from the associated code contacts to a group of three selection magnets F of the overlap unit.

Following the writing of the stock symbol and the price portion of the message, the operator depresses a range key which causes the storage of signals on the overlap unit indicative of the range position or positions in which the price of a selected stock is to be displayed on the subscriber's boards. The depression of this range key first causes the closure of control contact 8 which operates sequence relay SQ7. Relay SQ7 in operating, removes battery from conductor 166 and thus releases relays SQ6 and P3 or any other combination of sequence relays and prime relays which may have been operated. The conductors from code contacts 1 to 4 are now cut through to the group of four selection magnets RA on the overlap unit which will take a setting corresponding to the signal of the range key depressed. Relay SQ7 in operating causes the settings of the overlap unit magnets to be transferred to their associated contacts which operation will now be described.

*Overlap unit*

Associated with each keyset and its sequence relay group is an overlap unit OU, Figs. 1, 9 and 17a to 17c within which the information written on the keyset KS is stored in code.

The overlap unit comprises thirty-four selection magnets 51, each magnet having two windings, 51A and 51B. As shown in detail on Figs. 17a to 17c, the thirty-four selection magnets 51 are mounted preferably adjacent to one another and in a single horizontal row on the plate 55 in any well known manner having a portion 56 thereof bent parallel with and in the direction of the magnets 51. Associated with each magnet 51 is an armature 57 which is pivoted at 58 and normally rests against a back stop 59. A member 60 holds loosely the armature 57 against the pivot 58.

Each of the magnets 51 upon energization of its operate winding 51A attracts its armature 57 thereto, and causes the contact spring 62 to be operated and make contact with spring 63, these springs 62 and 63 as well as springs 66 and 67 which comprise the pile-up 61 being normally electrically separated from one another by suitable insulating material 64. Now referring to Fig. 1 it will be seen that springs 62 and 63 of the various magnets 51, in closing, connect ground from contact 75 and its associated contact 76 and conductor 90 to one end of the associated locking windings 51B, thus locking up the armatures 57, Fig. 17c, of the energized magnets 51.

Figure 17A:
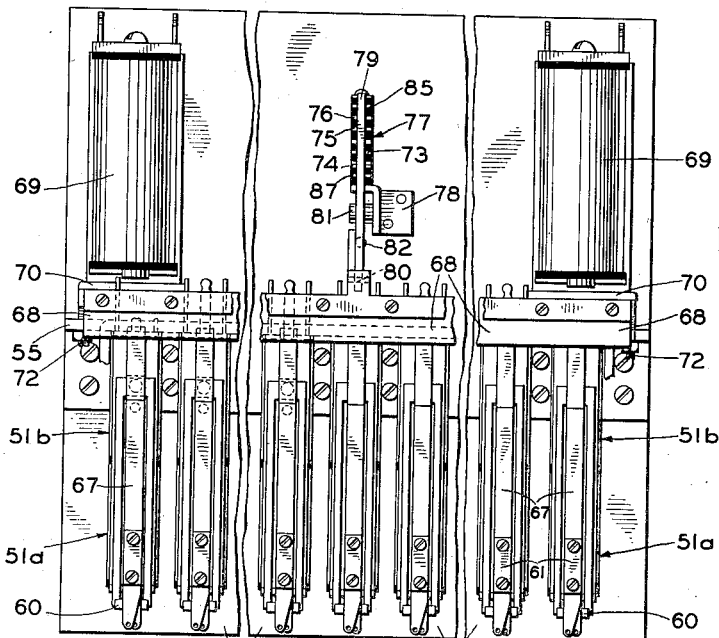
Figs. 17a to 17c show the plan, front and side elevation respectively, of the overlap unit.
Figure 17B:
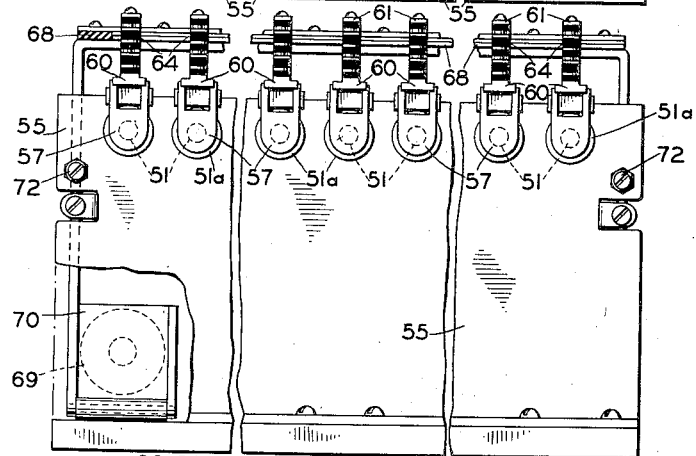
Figure 17C:
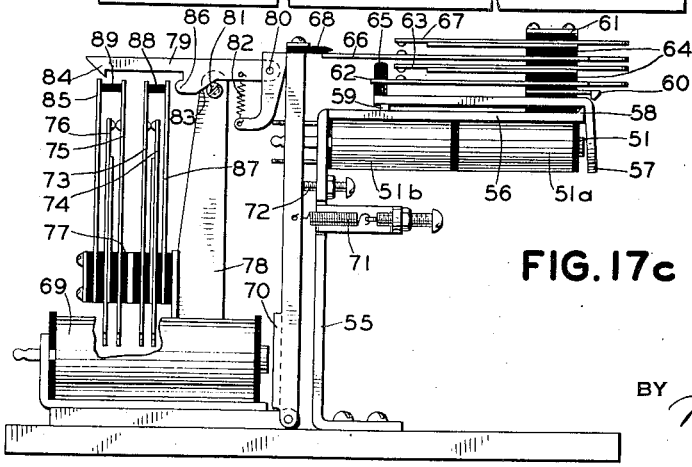

Referring to Fig. 17c, it will be noted that an armature 57 when attracted by its associated magnet 51 causes the insulator 65 to press upward against the spring 66 tending to deflect the spring 66 so that its contact engages with that of spring 67. This function, however, is prevented by the bar 68 which restrains the upward movement of the spring 66.

After the various magnets 51 have been energized to store the code signal of a quotation, and during the time when a range key is depressed causing contact 8 of the keyset KS, Fig. 1 to close, a circuit completed thereby energizes the magnets 69, Figs. 1 and 17a to 17c, which attract their armatures 70 thereby withdrawing the bar 68 from engagement with the several springs 66. Withdrawal of the bar 68 from engagement with the springs 66 permits each of those springs whose associated armature 57 is being attracted by its magnet 51 to be forced upward so that the contact of spring 66 engages with that of spring 67. Those springs 66 and 67 whose contacts have become engaged with one another are maintained in that position, after their magnets have become deenergized, by the subsequent return of the bar 68 to its normal position. In the event that some of the springs 66 and 67 had been previously held in the operated position by the bar 68, the operation of this bar will permit the springs 66 to return to their normal positions provided, however, their associated magnets 51 are not energized, in which latter case each of the energized magnets 51 will attract its armature 57 thus holding operated the associated springs 66 and 67.

As the magnets 69 became deenergized, armatures 70 under tension of springs 71 return to rest against the stop screws 72, thus returning bar 68 to its normal position. The bar 68 having returned to its normal position, holds operated those springs 66 and 67, which were operated by the energization of their individual magnets 51, and prevents those springs 66 which are not in engagement with springs 67 from becoming so engaged by the subsequent operation of their armatures 57, until such a time as the bar 68 is again withdrawn from engagement with the several springs 66.

Each overlap unit OU also comprises 2 pairs of normally closed contacts 73, 74 and 75, 76. These springs are normally electrically separated from one another by suitable insulating material 77 and affixed to a supporting member 78.

Springs 73, 74, 75 and 76 are controlled by a latch 79 which is joined to the bar 68 by a hinge pin 80. The latch 79 is under tension downward and is held against the eccentric adjustment screw 81 by action of the spring 82. Movement of the latch 79 to the left by action of the bar 68 causes the inclined portion 83 of the latch 79 under tension of spring 82 to slide downward on the screw 81 thus causing the left end of the latch 79 to be lowered. As latch 79 continues to move to the left a tip 84 slides over the top of spring 85, and a projection 86 of the latch 79 presses against a spring 87 and insulator 88 thus moving spring 73 to the left and disengaging its contact from that of spring 74. Opening the contacts of springs 73 and 74 causes the release of an associated seeker relay SK, Fig. 2, as will be hereinafter described.

As heretofore stated, the bar 68 in moving to the left permitted the springs 66, whose armatures 57 were being attracted by their associated magnets 51, to operate, and those springs 66 whose associated magnets 51 were deenergized, remained unoperated or returned, if previously operated, to their normal unoperated position. As the bar 68 returns to its normal position to maintain the various springs 66 in the positions in which they have been operated by the magnets 51, the latch 79 is moved to the right. As the latch 79 moves to the right and at a time after the projection 86 has moved far enough to permit the contacts of springs 73 and 74 to close, the tip 84 engages the spring 85 and moves it, together with the insulator 89 and spring 75 to the right, thus disengaging the contact of the latter spring from that of spring 76. Referring to Fig. 1, it will be seen that the opening of contacts 75 and 76 removes ground from conductor 90 which is connected to all the contacts 63 of the magnets 51 of the overlap unit, thus causing the deenergization of any of the magnets 51 and release of their armatures 57 which may have been operated and whose springs 66 and 67 are now held engaged by the bar 68.

As latch 79 continues to move to the right, the inclined portion 83 slides upward on the screw 81 thus causing the left end of latch 79 to move upward and disengage the tip 84 from the spring 85 thus allowing the contacts of springs 75 and 76 to again close to supply ground to the springs 63 for locking the magnets 51 when subsequently operated.

The contacts 75 and 76 also serve to control the associated error relay ER, Fig. 2, as follows:

Normally, after a quotation has been stored on the magnets of the overlap unit OU the operator depresses a range key which, as shown on Fig. 10, causes contact 8 to close and operate relay SQ7. The operation of relay SQ7 at its armature 167 and make contact thereof energizes the magnets 69 of the overlap unit which causes the stored signal to be transferred to the contacts 66 and 67 and at substantially the same time, as clearly shown on Fig. 10, the control contacts 73 and 74 of the overlap unit open to release the seeker relay SK as an indication that a quotation is ready to be transmitted. However, should the operator discover that the quotation which she has written or is in the process of writing is erroneous, she will then depress the "error" key of her keyset. The "error" key closes contacts 8 and 9 of the keyset, of which contact 8 causes the overlap unit to be tripped by the operation of magnets 69 so that the erroneous information stored on the magnets is transferred to the contacts 66 and 67, and contact 9, which operates concurrently with contact 8, causes the error relay ER to operate and lock by conductors 2 and 4 respectively of cable 130 to ground at the control contacts 75 and 76 of the overlap unit OU. The error relay ER in operating places a ground on armature 191 of the associated seeker relay SK and thereby prevents this seeker relay SK from releasing as the control contacts 73 and 74 are opened. No indication is thereby given of a quotation being in readiness for transmission from the overlap unit OU having the erroneous information stored therein. The error relay ER is released by the opening of contacts 75 and 76 at which time the locking circuit for the seeker relay SK is again restored by closure of control contacts 73 and 74 of the overlap unit. Since the seeker relay SK was not permitted to release because held operated by the relay ER, there was no indication given of a quotation ready for transmission and consequently the erroneous setting of the contacts 66 and 67 performs no function. This erroneous setting is displaced by the subsequent operation of a range key of the keyset KS without exercising a control upon the signals transmitted by the distributor TD.

The thirty-four selection magnets 51 and their associated storage mechanism are divided into groups of which three groups designated 1L, 2L and 3L comprising 5 magnets in each group are used for storing the first, second and third letters respectively of the stock symbol. One group PF of two magnets is used for storing the signals for the preferred issues of these stocks. Three groups designated RA, T and U comprising four magnets in each group are used for storing the range, and tens and units portions of the price signals respectively and one group F of three magnets is used for storing the fractions portion of the price.

Two other magnets SS and RW are used for storing special control signals the purpose of which will be hereinafter described.

Gang relays

Associated with each keyset position and connected to the contacts 67 of the overlap unit OU are two gang relays G1 and G2, Fig. 1, but the gang relays G1 and G2 for position 1 only are shown on the drawings. The gang relays for the other keyset positions are connected in a similar manner to their associated overlap units and seeker relays.

Figure 2:
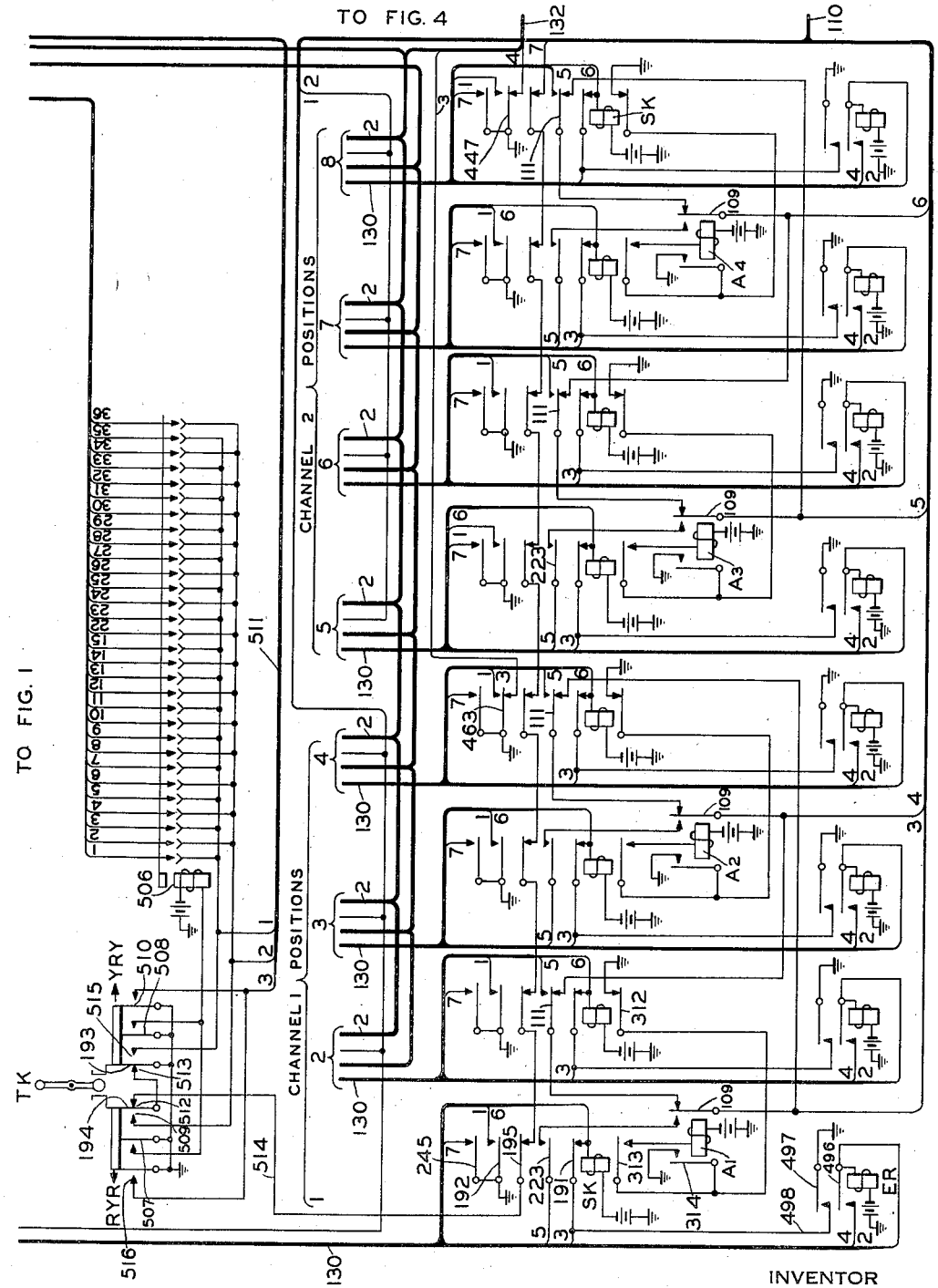

The relays G1 and G2 of each position are under control of their associated seeker relay SK, Fig. 2. After a seeker relay SK releases to indicate that a quotation is ready for transmission, the conductor 5 of cable 130 associated with the released seeker relay SK and connected to one end of the winding of relay G1, is grounded at the beginning of the revolution of the distributor TD, which causes relay G1 to operate and lock by way of its contact 224 to a grounded circuit. The circuits for controlling the operation of relay G1 will be described in detail as the description proceeds.

During the revolution of the distributor TD as the brush B engages contact 9 of ring R4 thereof, the relay G2 is caused to be operated by a ground applied to conductor 1 of cable 132, through the contact 133 of relay G1 to the winding of relay G2. Relay G2 operates and locks through its contact 244, conductor 7 of cable 130, break contact and armature 245 of relay SK to ground. Relay G1 releases during the latter part of the revolution of the distributor TD in which it was operated. Relay G2 is released during the latter part of the first half of the next revolution of the distributor TD.

Contacts 67 of groups 1L, 2L, 3L and PF of the overlap unit OU, on which signals for the stock symbol are stored, are connected to the contacts of the associated gang relay G1 by cables 228 and 390. This relay when operated connects the conductors from contacts 67 of groups 1L, 2L, 3L and PF to conductors 1 to 17 of cable 108, which extend to similar gang relays for the other 7 overlap units. Conductors 1 to 10 terminate at the armatures of common control relay CC1, Fig. 5, and conductors 11 to 17 terminate at the armatures of control relay CC2, Fig. 4. The operation of these common control relays CC1 and CC2 completes connections between these conductors and the various storage and decoding relays as hereinafter described. Contact 67 associated with magnet SS of the overlap unit is used for a special signal and is connected by conductor 3 of cable 390 to contact 131 of the associated gang relay G1. The operation of gang relay G1 connects this contact by way of conductor 18 of cable 108 to the armature 11 of common control relay CC1. Contacts 67 of groups RA, T, U and F of the overlap unit OU are connected by cable 303 to contacts of the gang relay G2. The operation of gang relay G2 connects the contacts 67 of groups RA, T, U and F of the overlap unit OU to conductors 22 to 36 of cable 108 which extend to the gang relays of the other 7 overlap units. Conductors 22 to 29 terminate at armatures of relay CC3 and conductors 30 to 36 terminate at armatures of relay CC4, Fig. 4. The operation of these two common control relays completes connections between these leads and the range and price storage relays, Fig. 4.

Seeker relays

Figure 8:
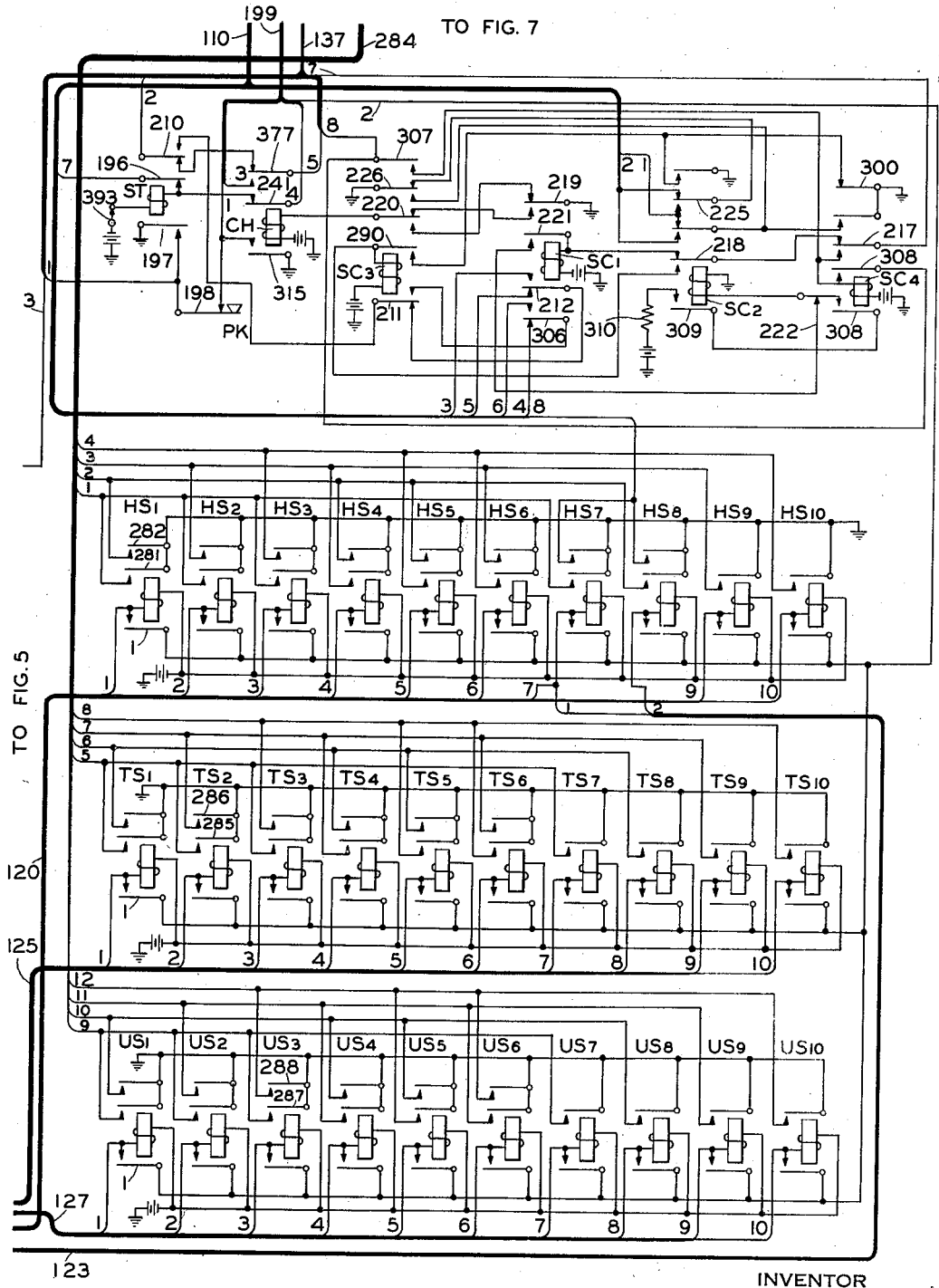

Associated with each of the eight overlap units and arranged to be locked to ground at control contacts 73 and 74 thereon by way of conductor 3 of cable 130 is an individual seeker relay SK, the release of any of which serves to indicate when a quotation is ready for transmission from the associated overlap unit OU by causing the release of the start relay ST, Fig. 8, to start the transmitting distributor in operation. The release of relay SK at its armature 223 completes a circuit for operating the associated gang relay G1. There are eight seeker relays SK, grouped four on each channel. The seeker relays SK of positions 1 and 2 are paired, and associated therewith is an auxiliary relay A1. Likewise, positions 3 and 4, 5 and 6, and 7 and 8 are paired, each pair having an auxiliary relay A2, A3 and A4 respectively. An auxiliary relay at its armature 109 serves to switch a gang relay G1 operate circuit from control by one seeker relay SK to the other seeker relay SK of a pair. Each pair of seeker relays SK and its associated auxiliary relay are so wired, that, for example, should relay SK of position 1 release, indicating that a quotation is ready for transmission from the overlap unit of position 1, the auxiliary relay A1 thereupon operates and locks through its own contact by way of conductor 4 of cable 130 to grounded contacts 76 and 75 of the overlap unit. Should relay SK of position 2 release immediately thereafter, the auxiliary relay A1 is not released until the seeker relay SK of position 1 is again operated indicating that the quotation from position 1 has been transmitted, at which time the auxiliary relay A1 releases and switches the control circuit for the gang relay G1 of the first position to the relay G1 of the second position. If the seeker relay SK of position 1 subsequently releases indicating a quotation awaiting transmission in the overlap unit of position 1, the auxiliary relay A1 cannot be operated to switch the gang relay control lead to position 1 until the seeker relay SK of position 2 has been again reoperated at the time the quotation from the latter position has been transmitted.

Connected to an armature 109 of each of the auxiliary relays A1 to A4 are the gang relay G1 control circuits. The four conductors 3, 4, 5 and 6 of cable 110 extend to a seeker control relay SC1, Fig. 8, which is one of a group of four seeker control relays SC1 to SC4. These seeker control relays SC1 to SC4 operate from relays C4 and C5, Fig. 6 which are under control of segments 12 and 13 respectively of ring R4 on the transmitting distributor TD, Fig. 7, and are so connected that during the first revolution of the transmitting distributor relays SC1 and SC2 are operated, during the second revolution relay SC3 is operated, during the third revolution relay SC4 is momentarily operated to release relays SC1 and SC2, and during the fourth revolution, relay SC4 is again momentarily operated to cause the release of relay SC3. This cycle of operation occurs once during each four revolutions of the transmitting disributor. The operation of these seeker control relays SC1 to SC4 serves to switch control circuits of the several gang relays G1 from the auxiliary relays A1, A2, A3 and A4 onto segment 1 of ring R1 of the transmitting distributor TD, in the following order:

During the first revolution of the transmitting distributor ground is supplied to the gang relay G1 control circuit, conductor 5 of cable 110, to the armature 109 of the auxiliary relay A3. During the second revolution ground is supplied by way of conductor 3 of cable 110 to the gang relay control circuit of auxiliary relay A1. During the third revolution ground is supplied by way of conductor 6 of cable 110 to the gang relay control circuit of auxiliary relay A4 and during the fourth revolution ground is supplied to the gang relay control circuit of auxiliary relay A2 by way of conductor 4 of cable 110.

The seeker control relays SC1 to SC4 also serve to cause the transmitting distributor TD to come to rest only at the end of a channel 2 or an even-numbered revolution. The gang relay G1 control circuits extending from the break contact of armature 109 of each of the auxiliary relays A1 to A4 to the armature 111 of each of the associated seeker relays SK, is connected by a make contact of the armature 111 to the auxiliary relay of the opposite pair of seeker relays SK within that channel, so that normally the pair of gang relay control conductors 3 and 4, and 5 and 6 of cable 110 for each channel are connected together. In this way no time is lost in the allotment of transmission time, for if one of the seeker relays SK of a pair is not released to indicate a call at the time that the associated gang relay G1 control circuit is energized, this control circuit, as previously explained, is connected to the armature 109 of the associated auxiliary relay of the other pair of seeker relays of that channel and serves to cause the gang relay G1 of one of the seeker relays SK of the latter pair to operate. For example, assuming that the operator is writing continuously on keyset 1, ground at one time is extended by way of conductor 3 of cable 110 directly to armature 109 of the auxiliary relay A1, whereas the next time the transmitting distributor sends a quotation over this channel, the ground on conductor 4 of cable 110 is extended by way of armature 109 and break contact of the auxiliary relay A2 and thence through the armature 111 and make contact of the associated seeker relay SK of position 4 to the armature 109 of the auxiliary relay A1 which then operates the gang relay G1 associated with the first keyset.

The arrangement is such that if all operators are writing continuously, the calls will be transmitted successively from positions 6, 2, 8, 4, 5, 1, 7 and 3 in the order stated. Assuming that the operator stops sending from position 2, the transmission time for that position is then alloted to position 1 and vice-versa. Positions 3 and 4, 5 and 6, and 7 and 8 function in a similar manner. In the event that no calls are being transmitted on positions 1 and 2, the time normally allotted for these positions is utilized by positions 3 and 4, and vice-versa. Similarly, positions 5 and 6 when not ready for transmission, may have their transmission time diverted to positions 7 and 8, and vice-versa.

*Decoding and storage relays*

Figure 5:
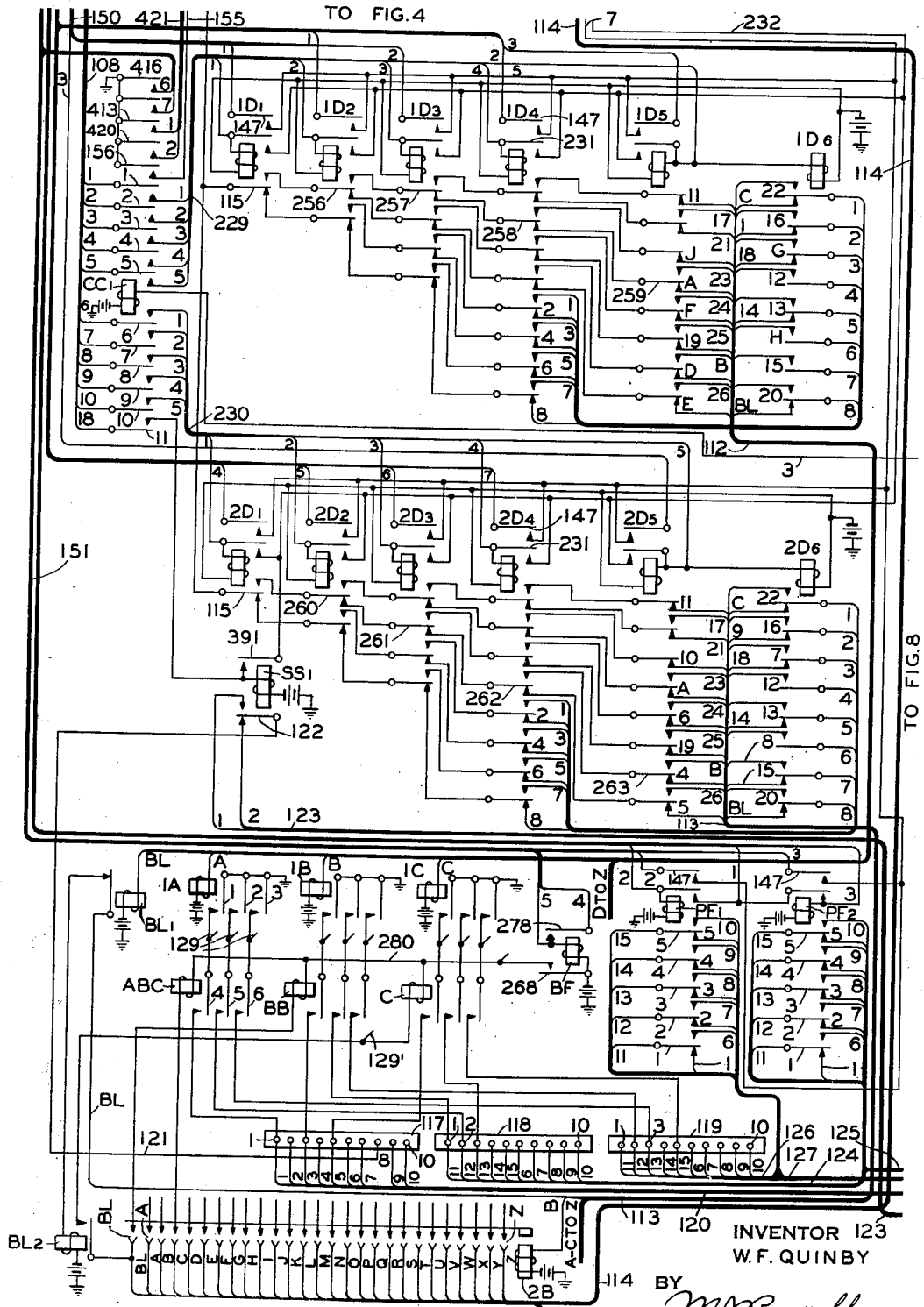

Immediately after the gang relay G1 of a position has operated to connect the contacts 67 of groups 1L, 2L, 3L, PF and SS of the associated overlap unit to the conductors 1 to 18, of cable 108 the common control relays CC1 and CC2 operate to transfer the code combination set up on the contacts 66 and 67 of the overlap unit, to the storage and decoding relays 1D1 to 1D6, 2D1 to 2D6, 3D1 to 3D6, PF1, PF2 and SS1, Figs. 4 and 5. Relay CC1 operates at the beginning of a revolution of the distributor and relay CC2 operates during the second half of the revolution of the transmitting distributor. The operation of the decoding and storage relays prepares circuits which cause monitor printers MP1 and MP2, Fig. 6 to display the symbol characteristic of the code stored on the relays, as the transmitting distributor revolves.

The relays 1D1 to 1D6, 2D1 to 2D6, and 3D1 to 3D6, also serve to decode the signals for the stock symbol stored thereon. These three groups of six relays each are provided for the storage and decoding of the first, second and third letters of a stock symbol. The fifth and sixth relays of each of these groups have their windings connected in pairs in parallel and thus invariably operate as a single relay. The various contacts on each of these three groups of relays 1D1 to 1D6, 2D1 to 2D6, and 3D1 to 3D6 are so connected, that for each combination of relays operated within a group, one of 27 conductors A to Z and BL of each associated cable 112, 113 and 114 which terminates on the contacts of the fifth and sixth relays, is connected to the armature 115 of the first relay 1D1, 2D1 and 3D1 of these groups respectively.

Connected to each of the 26 conductors A to Z of cable 112 of the first letter decoding relays 1D1 to 1D6, is the winding of a relay, hereinafter referred to as a first letter relay, and designated by the letter of the alphabet which corresponds to the one of the group of conductors A to Z connected thereto, prefixed by the figure 1. For example, conductors A, B and C of cable 112 which extend from contacts of relays 1D5 and 1D6 are connected to the windings of relays 1A, 1B and 1C respectively, Fig. 5. Similarly, the remaining conductors D to Z of cable 112 are connected to associated first letter relays which have been omitted to avoid complicating the drawings. The 27th conductor BL is connected to a relay BL1. Each first letter relay 1A to 1Z has three armatures 1, 2 and 3 which upon operation close their make contacts. The armatures 1, 2 and 3 are grounded and the make contacts thereof extend to three armatures 4, 5 and 6 on all stock relays as ABC, BB, C, Fig. 5 and others not shown, the first letter of the designation of which is the same as that of the first letter relay. For example, the contacts of armatures 1, 2 and 3 of the first letter relay 1A are connected to armatures 4, 5 and 6 respectively of stock relay ABC, Fig. 5, from whence these armatures 4, 5 and 6 are multiplied by way of conductors 129 to corresponding armatures on all stock relays whose first letter is A, such as, for example, stock relays A, AB, etc. Likewise, relay 1B has the contacts of its armatures 1, 2 and 3 connected to armatures 4, 5 and 6 respectively of the various stock relays whose first letter is B.

Each of the 26 conductors A to Z of cable 113 associated with the second letter decoding relays 2D1 to 2D6, Fig. 5, is connected to a relay having 27 make contacts. Each of these relays is referred to as a second letter relay, and is designated by the letter of the alphabet which corresponds to the one of the conductors A to Z connected thereto, prefixed by the figure 2. For example, conductor B of cable 113 is connected to the winding of relay 2B. Conductors A and C to Z are similarly connected to corresponding relays. The 27th conductor BL of cable 113 of the second letter decoding relays is connected to a relay BL2, the operating circuit of which is connected in series with a break contact and armature of the blank relay BL1. Each of the 27 conductors A to Z and BL of cable 114 of the third letter decoding relays 3D1 to 3D6, Fig. 4, is connected to one of the 27 contacts of relay 2B, Fig. 5 and thence multipled by way of cable 116 to corresponding contacts on each of the remaining second letter relays 2A and 2C to 2Z. The conductor BL is also connected to the armature of the relay BL2.

Assuming for example that the code signal for a stock symbol having only one letter is transferred to the decoding relays, only the combination of first letter storage relays 1D1 to 1D6 representative of the character received, will be operated. The operation of these first letter decoding relays 1D1 to 1D6 will close a circuit from the armature 115 of relay 1D1, to one of the 26 leads A to Z of cable 112 whose designation is similar to the character whose code is set up on the first letter decoding relays 1D1 to 1D6. The second and third letter decoding relays 2D1 to 2D6 and 3D1 to 3D6 will remain unoperated, and the circuit through the contacts of each of these two groups of relays extends from the armature 115 of relays 2D1 and 3D1 to the conductors BL of cables 113 and 114 respectively. The subsequent operation of the decoder operate relay DO, Fig. 7, at its armature 255, supplies ground by way of conductor 3 of cable 242 to the armatures 115 of relays 1D1, 2D1 and 3D1 and thence through a circuit established by the operated condition of the various decoding relays to one of the conductors A to Z and BL of each of the associated cables 112, 113 and 114. The circuit through the first letter decoding relays 1D1 to 1D6 causes the operation of a first letter relay 1A to 1Z representative of the character whose code has been set up on the decoding relays. The operation of the selected first letter relay 1A to 1Z supplies ground to the three armatures 4, 5 and 6 of each of the stock relays, whose first letter designation is the same as the selected first letter relay.

Ground at the unoperated armature 115 of relay 2D1 is extended through the circuit established by the second letter decoding relays 2D2 to 2D6 over conductor BL of cable 113 and the armature and break contact of relay BL causing the operation of relay BL2. Ground at the unoperated armature 115 of relay 3D1 is extended through the circuit of the third letter decoding relays 3D2 to 3D6 and conductor BL of cable 114 is continued by the operated relay BL2, to one end of the windings of all stock relays as C, which are representative of stock symbols comprising only one letter, this connection to the various single letter stock relays is indicated at 129'. The subsequent operation of the battery feed relay BF, Fig. 5, at its armature 263 supplies battery to the end of the windings of all of the stock relays whose opposite ends are supplied with ground by the operated relay BL2, thereby causing all of one letter stock relays A to Z (of which relay C only is shown) to operate. Circuits are extended only through the stock relay A to Z whose letter is the same as that of the first letter relay 1A to 1Z which is operated at this time, therefore, the other operated one letter stock relays whose first letter relays 1A to 1Z are unoperated do not perform any useful function in the assumed example.

The three contacts of the armatures 4, 5 and 6 of each of the stock relays ABC, BB, C, etc. are cross-connected to arbitrary stock code terminals of the terminal blocks 117, 118 and 119 respectively. The contact of armature 4 of the stock relays, connects to an assigned one of a group of ten terminals 117 which are representative of the hundreds stock number digits. The contact of armature 5 of the stock relays, connects to one of a group of ten terminals 118 which are representative of the tens portion of the stock number, and the contact of armature 6 of the stock relays connects to one of a group of ten terminals 119 representative of the units portion of the stock code number. Therefore, any time a stock relay is operated whose armatures 4, 5 and 6 have been grounded by the operation of a first letter relay 1A to 1Z, one terminal in each of the three groups of terminals 117, 118 and 119 is grounded.

The ten terminals 117 for the hundreds stock number are connected by the cable 120 respectively to windings of the ten hundreds stock number relays HS1 to HS10, Fig. 8. Terminals 1 to 7 and 9 and 10 are connected to their respective relays by correspondingly numbered conductors of cable 120. Terminal 8 is connected by way of conductor 121 to armature 122 of relay SS1 and thence by way of the break contact and conductor 2 of cable 123 to the winding of relay HS8. The operation of relay SS1 causes terminal 8 to be connected by way of conductor 121, armature 122 and make contact of relay SS1, conductor 1 of cable 123 to the winding of relay HS7 as will be hereinafter described. Each of the tens and units stock number terminals 118 and 119 is connected to the winding of an associated relay of the tens and units stock number groups TS1 to TS10 and US1 to US10, Fig. 8, by cables 125 and 127 respectively.

Terminals 1 to 5 of group 118 are connected by conductors 11 to 15 respectively of cable 124 to armatures 1 to 5 of relay PF2, and thence by way of the break contacts of the aforementioned armatures, and conductors 1 to 5 of cable 125, to the windings of relays TS1 to TS5, Fig. 8. Terminals 6 to 10 of group 118 are connected by conductors 6 to 10 of cable 124 to the make contacts of the armatures 1 to 5 respectively of relay PF2 and thence by way of conductors 6 to 10 of cable 125, to the windings of relays TS6 to TS10, Fig. 8.

The ten terminals 119, Fig. 5, relay PF1, and the units stock number relays US1 to US10, Fig. 8 are similarly connected by conductors of cables 126 and 127.

Figure 7:
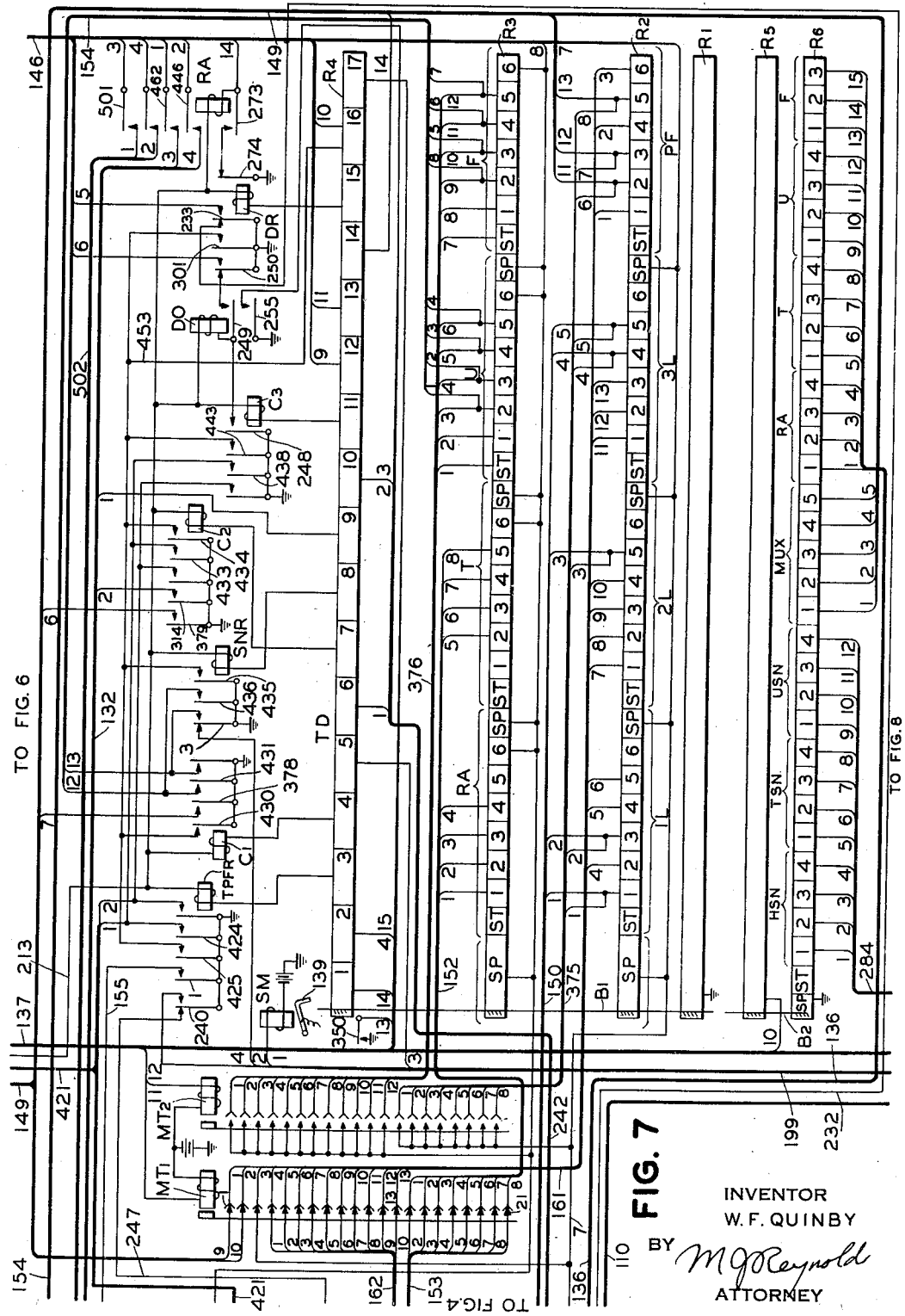

The grounding of a terminal in each of these groups 117, 118 and 119 by the operation of a stock relay, causes the stock number relay associated with each of the grounded terminals to operate and lock by way of its make contact and armature 1, conductor 2 of cable 199 to the break contact and grounded armature 3 of relay SNR, Fig. 7. Each of the stock number relays HS1 to HS10, TS1 to TS10 and US1 to US10 has its contacts so connected, that the operation of one of the relays in each of these three groups, will cause four segments in an associated group HSN, TSN and USN of ring R6, Fig. 7 of the transmitting distributor TD, to be electrified in accordance with a predetermined permutation code, so that the subsequent passage of the brushes B1 across these twelve segments will cause the transmission of the stock number signal to the line.

If a stock symbol having two letters was stored on the decoding relays of the first and second letter groups 1D1 and 1D6 and 2D1 to 2D6, Fig. 5, the first letter group 1D1 to 1D6 would cause the selection of a first letter relay 1A to 1Z as heretofore described, corresponding to the code set on the first letter group 1D1 to 1D6. The second letter decoding relays 2D1 to 2D6 would select one of the second letter relays 2A to 2Z corresponding to the code setting on the second letter decoding relays 2D1 to 2D6, and the third letter decoding relays 3D1 to 3D6, none of which are operated, cause ground on the lead BL of cable 114 to be supplied through a contact BL of the operated second letter relay 2A to 2Z and thence to one end of the windings of all of the stock relays as BB, Fig. 5 and others, whose second letter designation is the same as that of the second letter relay 2A to 2Z which is operated. As the battery feed relay BF is subsequently operated, all of the aforesaid stock relays are operated, and that stock relay which has its armatures 4, 5 and 6 grounded by an operated first letter relay 1A to 1Z, causes the operation of an arbitrary hundreds HS1 to HS10, tens TS1 to TS10 and units US1 to US10 stock number relay which electrify the 12 segments of groups HSN, TSN and USN of ring 6 on the distributor TD, Fig. 7, used for stock number transmission, in accordance with the predetermined code for that particular stock abbreviation.

A three letter stock symbol is similarly decoded, except that one end of the winding of the assigned stock relay as ABC, Fig. 5 is connected to a contact of its associated second letter relay 2A to 2Z, which contact receives ground from the operation of the third letter decoding relays 3D1 to 3D6.

The preferred relays PF1 and PF2, Fig. 5, serve to change the digits of a stock number assigned to a common stock to indicate that a stock is of the first, second or third preferred issue. For example, stock A may have assigned to it the code number 111. When the operator writes A, the code 111 is transmitted. If the stock A is of a first, second or third preferred issue, the operator depresses the preferred key corresponding to the issue. The preferred signals are stored in the overlap unit and are transferred to the preferred relays PF1 and PF2 at the same time the stock symbol is transferred to the decoding relays 1D1 to 1D6, 2D1 to 2D6 and 3D1 to 3D6. If the stock issue is of a first preferred, the relay PF1 operates and increases the units digit of the code number by five, causing the transmission of stock code number 116. The depression of a second preferred key causes the operation of relay PF2 which increases the tens digit by five, and a third preferred signal causes the operation of both relays PF1 and PF2 thereby increasing the value of the tens and units digits by five each.

As heretofore stated, the stock symbol signal is transferred from the contacts 66 and 67 of the overlap unit to the storage and decoding relays 1D1 to 1D6, 2D1 to 2D6 and 3D1 to 3D6 during the first part of a revolution of the transmitting distributor. The decoding of the signals for a stock symbol and recoding of this intelligence into a stock number occurs during the latter part of the same revolution, after which time the decoding relays 1D1 to 1D6, 2D1 to 2D6 and 3D1 to 3D6 are released preparatory to the reception of a signal for a stock symbol for the other channel. During the revolution of the distributor TD in which the stock symbol was stored on the decoding relays 1D1 to 1D6, 2D1 to 2D6 and 3D1 to 3D6 and the preferred relays PF1 and PF2, this symbol was also printed on tapes by the monitor printers.

At the completion of this revolution, the operation of relay CC3, Fig. 4, transferred the signals for the range and tens portion of the price, from the contacts 66 and 67 of the groups RA and T of the overlap unit OU, Fig. 1, to the storage relays R1 to R4 and T1 to T4, Fig. 4 respectively, by way of conductors 1 to 8 of cable 303 and conductors 22 to 29 of cable 108, the relay G2 having been operated previously.

During the succeeding revolution, the stock number assigned to the stock symbol which was previously decoded, and the range and price are transmitted. The units and fractions portions of the price are transferred during the beginning of this revolution from the contacts 66 and 67 of groups U and F of the overlap unit OU, to the storage relays U1 to U4 and F1 to F3, Fig. 4, in readiness for transmission during the latter part of this revolution. This transfer is effected by the operation of relay CC4 which connects the contacts 66 and 67 of groups U and F of the overlap unit which extend through conductors 9 to 15 of cable 303 and associated contacts of the relay G2 and conductors 30 to 36 of cable 108, to the windings of the storage relays U1 to U4 and F1 to F3.

Each of the storage relays R1 to R4, T1 to T4, U1 to U4 and F1 to F3, Fig. 4, upon operation locks to an associated armature 135 and its make contact which has ground applied thereto. The armatures 135 also connect by way of conductors 1 to 15 of cable 136 to respective segments of the groups RA, T, U and F of ring R6 of the distributor TD, Fig. 7. Therefore, the brush B2 in passing over the segments of groups RA, T, U and F of ring R6 is grounded each time it comes into contact with a segment which is connected to ground by the operation of its associated storage relay R1 to R4, T1 to T4, U1 to U4 and F1 to F3. Each time the brush B2 is grounded, a circuit is completed by way of the solid ring R5, conductor 10 of cable 137, break contact and armature 138 of relay PH3, Fig. 6 to one end of the winding of relay L1, the other end of which winding is connected to battery. The operation of relay L1 connects negative (marking) battery to the line L. The relay L1, when in its unoperated position due to the passage of the brush B2 over one or more segments which are not grounded, connects positive (spacing) battery to the line L. It will, therefore, be seen that the line signals consist of code combinations of positive and negative impulses in accordance with the grounded condition of the segments of ring R6 of the distributor TD. The monitor printers upon the tapes of which the stock symbol was printed during the previous revolution, are caused to print the price now being transmitted, and the monitor printers of the other channel are caused to print the stock symbol, which during this revolution, is stored on the decoding relays and recoded into a stock number. This stock number will be transmitted during the succeeding revolution of the distributor.

*Transmitting distributor*

The transmitting distributor TD, Fig. 7, comprises 6 rings R1 to R6, brushes B1 and B2 of which brush B1 connects rings R1, R2, R3 and R4 and brush B2 connects rings R5 and R6 with one another and a rotatable arm, frictionally driven by any suitable means such as a motor to which the brushes are attached and insulated therefrom and from each other. The brush arm is normally held in a rest position by the latch 139 of the start magnet SM. The start relay ST, Fig. 8 when released by any of the seeker relays SK, Fig. 2, in indication that a quotation is ready for transmission, causes the energization of the start magnet SM which draws its latch 139 thereto and permits the brushes B1 and B2 to rotate. These brushes rotate until stopped by the latch 139' which is released at a time when no quotation is ready for transmission.

Ring R1 is solid and is connected to ground. This ring is connected by brush B1 as it rotates, to the various segments of rings R2, R3 and R4 of which rings R2 and R3 are divided into 32 segments, each of which may be effective for 1/34 of a revolution with the exception of segments SP of groups PF and F of rings R2 and R3 respectively which may each be effective for 3/34 of a revolution. The segments of ring R2 are divided into four groups of eight segments each designated 1L, 2L, 3L and PF. These groups are representative of the first, second and third letters and the preferred issues of a stock symbol, and are utilized in controlling the operation of monitor printers MP1 and MP2, Fig. 6, to print this information on their tapes. The monitor printers MP1 and MP2, which are controlled by rings R2 and R3 may be similar to the stock ticker which operates on the start-stop principle and requires eight signals for each character operation, of which the first and eighth signals control the starting and stopping of the printers and the remaining six signals comprise the character selection and shift signals. The type wheel used thereon may be modified by replacing certain of the characters which are displayed in the lower portion of the tape by characters which are symbolic of the various ranges transmitted.

The monitor printers MP1 print characters representative of channel 1 information and the monitor printers MP2 print characters representative of channel 2 information. The printers MP1 are controlled by relay M1, Fig. 6, and the printers MP2 are controlled by relay M2. The relays M1 and M2 are controlled by the various segments of rings R2 and R3 of the transmitting distributor TD, Fig. 7. Each of the segments 1 to 5 of the groups 1L, 2L and 3L of ring R2, is connected to an armature 147 of its respective relay 1D1 to 1D5, 2D1 to 2D5 and 3D1 to 3D5, segments 2, 4 and 5 of group 1L, 1 to 4 of 2L and 1 to 3 of 3L being connected to their associated armatures 147 by way of conductors 4 to 13 respectively of cable 161, contacts 4 to 13 of the normally operated MT1 relay and conductors 1 to 10 of cable 152. Segments 1 and 3, 5, and 4 and 5 of groups 1L, 2L and 3L respectively are connected to their associated armatures 147 by way of conductors 1 to 5 of cable 150.

Segments 1 to 6 of group PF, ring R2, in addition to being used for the transmission of signals to the monitor printers indicative of preferred issues of stocks, are used in the indication by the monitor printers of special rewrite signals. Segments 1, 4 and 6 are connected by way of conductors 1, 2 and 3 of cable 161 to contacts 1, 2 and 3 of relay MT1 from whence the armature of contact 3 connects to conductor 7, which, as hereinafter described, is connected to the winding of relay M1 or M2, Fig. 6, depending upon the operated condition of the relay TR1, Fig. 6, and the armatures of contacts 1 and 2 of relay MT, connect by way of conductors 9 and 10 of cable 149 to the make and break contacts of armatures 4 and 1 respectively of relay RW, Fig. 3. Segments 2, 3 and 5 of the group PF are connected by conductors 11, 12 and 13 of cable 149 to contacts of the relay RW, conductors 11 and 12 connecting to the make contacts of armatures 1 and 2 respectively and conductor 13 connecting to the break contact of armature 2 and the make contact of armature 3 of relay RW. Armatures 1 and 2 of the relay RW are connected by way of conductors 2 and 3 of cable 151 to armatures 147 of relays PF1 and PF2 respectively, Fig. 5.

The armatures 147 of relays 1D1 to 1D5, 2D1 to 2D5, 3D1 to 3D5, PF1 and PF2 when operated to close their associated make contacts connect the various segments 1 to 5 of the groups 1L, 2L, and 3L, and PF, to conductor 7 of cable 146, which extends by way of the break contact 145 of relay TR2, conductor 142 and break contact of armature 140 of relay PH5 to the winding of monitor relay M2. As the grounded brushes B1 of the transmitting distributor TD pass over the various segments 1 to 5 of the groups 1L, 2L, 3L and PF, those relays of the groups 1D1 to 1D5, 2D1 to 2D5, 3D1 to 3D5 and PF1 and PF2, which are operated, complete circuits by their armatures 147 and make contacts, to the winding of the relay M2 as heretofore described and cause the operation of the relay M2.

Segments ST and 6 of the groups 1L, 2L and 3L and ST of PF, ring R2 are unconnected. Therefore, as the brush B1 passes over these segments the relay M2 is not caused to operate. Segments SP of the groups 1L, 2L, 3L and PF, ring R2, are connected directly to the conductor 7 of cable 146 which as heretofore described connects to the winding of the M2 relay.

The segments of ring R3 of the transmitting distributor TD are similarly divided into groups of 8 segments each. These groups designated RA, T, U and F control the monitor printers for displaying the range, tens, units and fractions portions of the price of a quotation. Segments ST of the four groups RA, T, U, and F are normally unconnected. Segments 1 to 4 and 2 to 5 of groups RA and T respectively of ring R3 connect by way of conductors 1 to 8 of cable 152, contacts 14 to 21 of relay MT1 and conductors 1 to 8 of cable 153 to the associated armatures 148 of relays R1 to R4 and T1 to T4, Fig. 3. Segments 2 to 5 of groups U and F connect by way of conductors 1 to 4, 8 and 5 to 7 respectively of cable 154 to associated armatures 148 of relays U1 to U4, SS and F1 to F3, Fig. 4.

Figure 6:
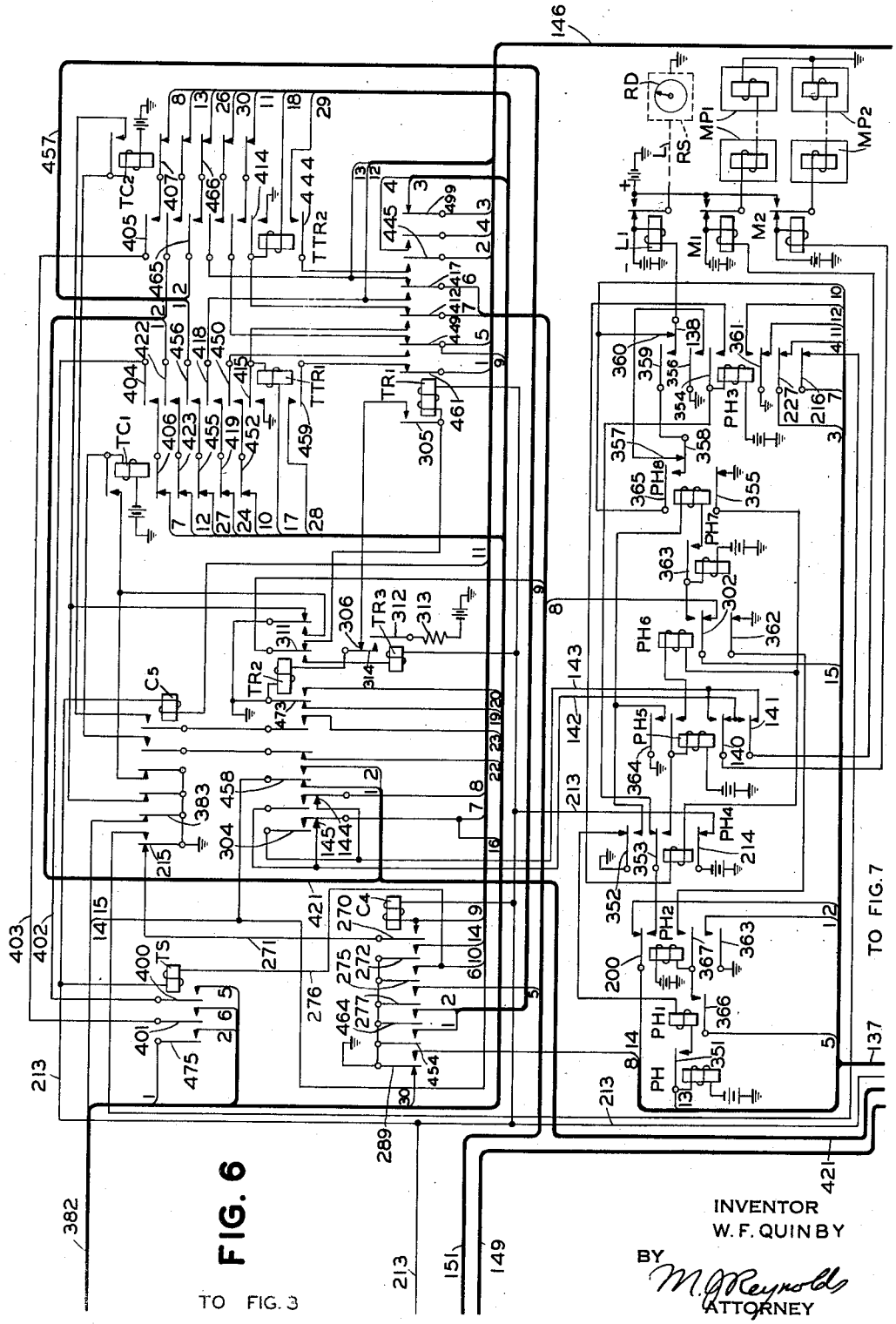

The operation of relays R1 to R4, T1 to T4, U1 to U4, F1 to F3 and SS completes circuits from their respective segments of ring R3 and armatures 148 by way of conductor 8 of cable 146, break contacts 144 of relay TR2, Fig. 6, conductor 143 and break contact and armature 141 of relay PH5 to the winding of relay M1. Segments SP and 6 of the groups RA, T, U and F of ring R3 are connected to conductor 8 of cable 146 which as heretofore mentioned extends to the winding of relay M1. The operation of the monitor relay M1 as the brush B1 passes over the segments of ring R3 is similar to that previously described for the relay M2.

During a channel 1 revolution monitor relay M1 operates from ring R3 and relay M2 operates from ring R2 and during a channel 2 revolution relay M1 operates from ring R2 and relay M2 operates from ring R3. This transfer is effected by the make before break contacts 144 and 145 of relay TR2, Fig. 6.

Ring R4 of the transmitting distributor TD, Fig. 7, is divided into 17 segments which are connected to various control relays associated therewith which are operated by the grounded brush B1 passing over these segments in a manner hereinafter described.

Ring R6 is divided into 34 segments of which segment SP is connected to ground and segment ST is unconnected. The various segments of the groups HSN, TSN, USN, RA, T, U and F of this ring are electrified in accordance with the settings of their various stock number and storage relays as heretofore stated. The segments 1 to 5 of ring 6 comprising the group MUX are connected by way of conductors 1 to 5 of cable 149 to armatures 1 to 5 and break contacts of relays TS2 and RW1 in series and thence to the tongues 1 to 5 of the multiplex tape transmitter MUX, Fig. 3. These tongues are brought into engagement with their associated contacts in accordance with a code representative of a character to be transmitted, which is perforated in a tape passing through the tape transmitter MUX.

Brush B2 in passing over the segments of ring

R6 connects them successively to ring R5 and thence by way of conductor 10 of cable 137 and contacts 138 of relay PH3 to the winding of relay L1. Relay L1 is operated to transmit a negative (marking) impulse each time a grounded segment of ring R6 is crossed by the brush B2. Passage of the brush B2 across ungrounded segments permits the relay L1 to assume its unoperated position and thus transmit a positive (spacing) impulse to the line L.

Tape transmitters

The tape transmitters TT1, TT2 and MUX, shown on Fig. 3 of the drawings, may be of the well known multiplex type which utilizes a tape on which the code of each character to be transmitted is arranged in a transverse row of perforations. The tape in addition to the code perforations comprises a series of feeder holes which engage with the teeth of a sprocket on the tape transmitter. This sprocket is caused to operate to step the tape one position forward each time the step magnet S of the tape transmitter is energized. The deenergization of the step magnet S permits the tongues 1 to 5 to come into contact with corresponding perforations of a transverse row in the tape, so that the tongues assume settings corresponding to the codes perforated in the tape. The step magnet S of the tape transmitter MUX is connected by way of break contact and armature 6 of relay RW1, conductor 155 to a make contact of relay TPFR, Fig. 7, which is grounded by the operation of its armature 1. Conductor 155 also extends to a make contact of grounded armature 156 of relay CC1, Fig. 5.

The tongues 1 to 5 of tape transmitter TT1 are connected by way of break contacts and armatures 1 to 5 of relay STT1 and make contacts 1 to 5 of relay TCC1 and by way of conductors 1 to 5 of cable 157 to slip connections 1 to 5 of the group of slip connections 158. When it is desired to use a tape transmitter instead of a keyset, the keyset is removed by disengaging the slip connections SC1 from SC2, Fig. 1, and the tape transmitter TT1 and its control circuits are connected by engaging the slip connections 158, Fig. 3, with the corresponding ones of the group 159, Fig. 1. The slip connections 1 to 5 of group 158 are then extended by way of slip connections 1 to 5 of group 159 and conductors 1 to 5 of the cable 50 to the various armatures of the sequence relays SQ1 to SQ7. The code contacts 1 to 5 of a keyset KS are thereby replaced by the contacts 1 to 5 of a tape transmitter TT1. The step magnet S of the tape transmitter TT1 is connected to the contacts of various control relays which energize the magnet S to step the tape. The operation of this tape transmitter and its associated circuits will be more fully described as the description proceeds.

Tape transmitter TT2 functions similarly to tape transmitter TT1 and is used for transmitting information from a channel 2 keyset position. Its slip connections 160, Fig. 3, engage with slip connections 159 of a channel 2 position when tape transmission is required on this channel.

Multiplex printer

The multiplex printer PTR, Fig. 3, is used for checking the information transmitted by the multiplex tape transmitter MUX. The code magnets 1 to 5 of the printer PTR are connected by the momentarily operated contacts and armatures 1 to 5 of relay PT to the tongues 1 to 5 of the multiplex tape transmitter MUX. At a time after these tongues have been operated to correspond to the perforated code in the tape, the energization of the magnets 1 to 5 of the printer in accordance with the setting of the tongues 1 to 5 of the tape transmitter MUX causes the combination to be mechanically stored within the printer PTR so that the subsequent energization of the magnet 6 of the printer causes the printing of a character in accordance with the code stored therein.

Operation of transmitter

In the following detailed description of the system herein disclosed, it will be assumed by way of example that signals indicative of a stock whose symbol is ABC having a price of 98⅞ which is to be displayed in the Unison range of a stock position, will be transmitted over line L and that this quotation will be transmitted from the position 1 keyset, Fig. 1. It will be also assumed that the stock code number 123 has been assigned for use with the stock symbol ABC.

As heretofore described, an operator successively depresses the keys of a keyset corresponding to the stock symbol, price and range of a quotation. As the operator depresses the letter key A, contact 6 of keyset KS, Fig. 1 closes and connects a ground 163 through the operated contact 6, conductor 52, armature 53 and break contact of relay P3, armature 53 and break contact of relay P2 and armature 53 and break contact of relay P1, to one end of the winding of relay SQ1. The other end of the winding of relay SQ1 connects by way of conductor 164, break contact and armature 165 of relay SQ4, conductor 166, break contact and armature 167 of relay SQ7 to battery, thus energizing the winding of relay SQ1 which operates and completes a circuit from the grounded end of its winding by way of its make contact and armature 168 and conductor 169 to one end of the winding of relay P1, the other end of which winding is connected to ground by way of break contact and armature 170 of relay P2. Relay P1 does not operate at this time as ground is applied at both ends of its winding. As contact 6 of the keyset KS opens, battery on conductor 164 is extended through the winding of relay SQ1, make contact and armature 168 and conductor 169 to the winding of relay P1 causing this latter relay to operate in series with relay SQ1 and thus hold both of these relays operated. After contact 6 of keyset KS has opened to cause relay P1 to operate in series with the previously operated relay SQ1, the code contacts 1 to 5 operate in a combination representative of the character A. The sequence of operation of the various contacts of the keyset KS is clearly indicated on Fig. 10 of the drawings. Referring now to the letter code shown on Fig. 12, it will be seen that the code for the letter A comprises the units 1 and 2 of marking character and the units 3, 4 and 5 spacing in character. Therefore when the letter key A is depressed, of the code contacts 1 to 5 of keyset KS, contacts 1 and 2 only close and contacts 3, 4, and 5 remain open. The closure of contacts 1 and 2 of keyset KS connects ground 163 to conductors 1 and 2 of cable 50, armatures 1 and 2 of relay SQ1 and make contacts thereof, conductors 1 and 2 of cable 171 to the winding 51A of the first and second magnets 51 respectively of the group IL of the overlap unit OU. Energization of the windings 51A of these magnets causes the attraction of their armatures 57, Fig. 17c, which effects closure of their associated contacts 62 and 63, thus maintaining the magnetic flux of the magnets 51 by energization of the associated windings 51B, by ground on the common spring 75 and its break contact 76, conductor 90, operate contacts 63 and 62 to one end of the windings 51B, the other end of which is connected to battery. Therefore the first and second magnets 51 are held energized to store the code for the letter A in the first letter group 1L of the overlap unit OU.

As the operator depresses the key corresponding to the second letter B of the stock symbol, contact 6 of keyset KS again closes and extends ground 163, by way of conductor 52, armature 53 and break contact of relay P2, armature 53 and break contact of relay P1, make contact and armature 172 of relay SQ1 to one end of the winding of relay SQ2, the other end of which winding extends by way of conductor 164, break contact and armature 165 of relay SQ4, conductor 166, break contact and armature 167 of relay SQ7 to battery. Relay SQ2 now operates over this circuit just traced. As contact 6 of keyset KS opens, relay P2 is caused to operate in series with relay SQ2. The operate circuit for relay P2 extends from grounded armature 170 and break contact of relay P3, winding of relay P2, conductor 173, armature 168 and make contact of relay SQ2, and thence through the winding of relay SQ2 to battery.

As relay P2 operates, relays P1 and SQ1 are caused to release by the break contact being disengaged from the grounded armature 170 of relay P2.

After contact 6 has closed and opened and caused the operation of relays SQ2 and P2 and the release of relays P1 and SQ1, the code contacts 1 to 5 of the keyset KS are operated in the combination representative of the letter B, which combination as shown on Fig. 12 is 1, 4 and 5 marking and 2, 3 spacing.

As contacts 1, 4 and 5 of the code contacts 1 to 5 of keyset KS close, ground 163 is connected through these contacts and by way of conductors 1, 4 and 5 of cable 50, armatures and contacts 1, 4, 5 of relay SQ2, conductors 1, 4, 5 of cable 174 to the first, fourth and fifth magnets 51 of the group 2L of the overlap unit OU, thus energizing these latter magnets to store the code for the letter B thereon by closure of their contacts 62 and 63.

As the letter key C is depressed, contact 6 again closes and connects ground 163 by way of conductor 52 to armature and break contact 53 of relay P3, armature 53 and make contact of relay P2, make contact and armature 172 of relay SQ2 to the winding of relay SQ3, which latter relay operates and locks in series with relay P3, the operation of relay P3 occurring after contact 6 has opened. Armature 170 of relay P3 in operating causes relays P2 and SQ2 to release.

After contact 6 opens, code contacts 2, 3 and 4 close in accordance with the code combination for the letter C. These contacts 2, 3 and 4 in closing, connects ground 163, by way of conductors 2, 3 and 4 of cable 50, armatures and contacts 2, 3 and 4 of relay SQ3, conductors 2, 3 and 4 of cable 175 to the second, third and fourth magnets 51 of the group 3L of the overlap unit OU. These magnets become energized to store the combination for C.

The stock symbol having been written, the operator now depresses keys indicative of the various portions of the price. As the price assumed in the example is 98⅞, therefore, the figure key 9 corresponding to the tens digit of the price is the first to be depressed. Reference to the timing chart, Fig. 10, shows that upon the depression of a key corresponding to the tens digit of the price, contact 6 closes but has no effect upon the operation of the sequence relays, as the circuit through conductor 52 is opened at the operated armature 53 of the relay P3. Immediately after the contact 6 opens, contact 7 closes and connects ground 163, by way of conductor 176, armature 54 and break contact of relay SQ6, armature 54 and break contact of relay SQ5 to the winding of relay SQ4, the opposite end of which winding is connected to battery by conductor 166 and break contact and armature 167 of relay SQ7. Relay SQ4 operates, and at its armature 165 releases relays P3 and SQ3. As contact 7 opens and removes the ground from one end of the winding of relay SQ4, relay P1 is caused to operate in series therewith, by ground from armature 170 and break contact of relay P2, winding of relay P1, conductor 169, armature 168 and make contact of relay SQ4, winding of relay SQ4, to battery by way of conductor 166 and break contact and armature 167 of relay SQ7.

After contact 7 is opened, the code combination representative of the digit 9 is set up on the code contacts 2 to 5 of the keyset. Referring to Fig. 14, it will be seen that the combination for this digit is 1, 3 and 4 marking, therefore, contacts 2, 4 and 5 of keyset KS close and connect ground by way of conductors 2, 4 and 5 of cable 50, armatures and make contacts 1, 3 and 4 of relay SQ4, conductors 1, 3, 4 of cable 177 to the first, third and fourth magnets 51 of the group T of the overlap unit OU. The energization of these magnets stores the code for the digit 9 thereon.

The key representative of the digit 8 is now depressed, and contact 6 closes. Ground 163 by way of the operated contact 6, conductor 52, armature 53 and break contact of relay P3, armature 53, break contact of relay P2, armature 53, and make contact of relay P1, conductor 178, make contact and armature 179 of relay SQ4 to one end of the winding of relay SQ5 causes this latter relay to operate and lock by way of its make contact and armature 180, conductor 181, winding of relay P2 and break contact and armature 170 of relay P3 to ground. As relay P2 operates after the opening of contact 6, relays P1 and SQ4 are caused to release by the opening of break contact and armature 170 of relay P2. As contact 7 subsequently closes, no circuit therefrom is established as it is opened at armature 54 and break contact of relay SQ5. As contacts 2 and 5 of keyset KS operate, the code combination of 1 and 4 marking is set up, this code being indicative of the digit 8, ground 163 is connected by way of conductors 2 and 5 of cable 50, armatures 1 and 4 and their make contacts of relay SQ5, conductors 1 and 4 of cable 182 of the first and fourth magnets 51 of group U of the overlap unit OU, thus energizing these magnets to store the code for the digit 8.

As the key, which is indicative of the fractions portion of the price ⅞, is depressed, contact 6 again closes and connects ground by way of conductor 52, armature 53 and break contact of relay P3, armature 53 and make contact of relay P2, conductor 183, make contact and armature 184 of relay SQ5 to one end of the winding of relay SQ6, causing the operation of this latter relay which locks in series, by way of make contact and armature 185, with relay P3 at the time contact 6 opens. Relay P3 in operating causes the release of relays P2 and SQ5. As contacts 3, 4 and 5 of keyset KS close to set up the code of 1, 2 and 3 marking, ground is extended by way of conductors 3, 4 and 5 of cable 50, armatures 1, 2 and 3 and make contacts of relay SQ6, conductors 1, 2 and 3 of cable 186 to the three magnets 51 of the group F of the overlap unit OU, causing the code for the fractions portion of the price to be stored thereon.

When the unison range key is depressed, the contact 6 is again closed, but is ineffective at this time as its circuit is open at armature 53 of relay P3. Contact 8 closes and extends ground by way of conductor 187 to the winding of relay SQ7 which then operates. As armature 167 of relay SQ7 moves from its break contact, it removes battery from conductor 166 and causes relays SQ6 and P3 to release. Armature 167 also connects battery to its make contact which extends by way of conductor 188 to one end of the windings of the electromagnets 69 of the overlap unit OU, the opposite ends of which windings are connected to ground. Energization of the electromagnets 69 withdraws the bar 68, Fig. 17, from engagement with the springs 66, thus permitting those springs 66 of the groups 1L to 3L and T, U and F whose associated magnets 51 are energized to be closed to their associated contacts 67.

Referring to Fig. 13, it will be seen that the code for the unison range is 3 marking only. As contact 3 of keyset KS closes, ground 163 is connected by way of conductor 3 of cable 50, armature 3 and its make contact of relay SQ7, conductor 3 of cable 189 to the third magnet 51 of the group RA of the overlap unit OU, causing this magnet to be energized to store the range signal unison.

As contact 8 opens and releases relay SQ7, the sequence relays SQ1 to SQ7 are again in their normal position and in readiness for a subsequent quotation from the keyset. Energization of the electromagnets 69 by the closure of make contact and armature 167 of relay SQ7, caused the contacts 73 and 74 to open and thus remove ground from conductor 3 of cable 130 and armature 191 of relay SK, thereby causing this latter relay to release.

Relay SK upon releasing connects ground by way of its armature 192 and break contact, conductor 1 of cable 130 to the winding of the key lock magnet KL of the keyset KS, Fig. 1, for energizing the magnet. Energization of this magnet locks the range keys and thus prevents their depression by an operator. Any of the letter and price keys, however, may be depressed and another quotation, with the exception of the range, may be stored on the magnets 51 of the overlap unit OU with the key lock magnet in an energized condition.

Ground on the make contact and operated armature 312 of relay SK of position 2, extends by way of armature 313 and break contact of relay SK of position 1, to one end of the winding of relay A1 thereby causing the latter relay to operate and lock by way of ground on its make contact and armature 314, and armature 313 of relay SK of position 1 to the winding of relay A1. Relay A1 in operating transfers conductor 3 of cable 110 from the break contact to the make contact of its armature 199, in readiness for the completion of a circuit through the break contact and armature 223 of realy SK of position 1 for operating relay G1, Fig. 1, which circuit will be described at the time of its completion.

As the electromagnets 69 become deenergized, contacts 73 and 74 reclose and connect ground to conductor 3 of cable 130, and immediately thereafter contacts 75 and 76 momentarily open to remove ground from conductor 90, thereby deenergizing the electromagnets 51 which were previously energized, their contacts 66 and 67 having been held closed by the bar 68, Fig. 17c, as it returned to the normal position.

Ground on the armature 193 of the test key TK, Fig. 2, extended by way of its break contact and armature 194 and break contact of key TK to the armature 195 of relay SK and make contact thereof and thence in series through similar armatures and make contacts on each of the other seeker relays SK, and conductor 7 of cable 110 to armature 196 and make contact of relay ST, Fig. 8, holds this latter relay operated. This circuit, upon interruption by the opening of the armature 195 and make contact of relay SK as relay SK releases, causes relay ST to release, which extends ground by way of its armature 197 and break contact, spring 198 and break contact of phasing key PK, and conductor 1 of cable 199 to one end of the winding of the distributor start magnet SM, Fig. 7 to energize the start magnet.

Energization of the start magnet SM causes its latch 139 to be attracted thereto to release the brushes B1 and B2 for rotation.

As heretofore stated, the first of a series of channel 1 quotations is transmitted during the third revolution of the transmitting distributor and the first of a series of channel 2 quotations is transmitted during the second revolution. The revolution preceding that during which a quotation is transmitted, is utilized for translating a stock symbol into a stock code number, and for causing the monitor printers associated with the channel of the stock symbol translated, to print that particular stock symbol on their tapes.

Inasmuch as the quotation in the assumed example is the first of a series of channel 1 quotations to be transmitted, it will be understood from the above that it will be transmitted during the third revolution of the distributor TD. The first and second revolutions of the transmitting distributor TD in this case serve to time the transmitter.

During the first revolution the line relay L1, Fig. 6, which is operated by battery at one end of its winding and ground at the other end of its winding extending by way of the break contact of the make before break contacts 138 of relay PH3, conductor 10 of cable 137, ring R5 of transmitting distributor TD, Fig. 7, and brush B2 to grounded segment SP of ring R6, is caused to release by the brush B2 passing onto the ungrounded segment ST. As relay L1 releases, it connects positive (spacing) battery to the line L which functions as a start signal for releasing the brush arms of the receiving distributors RD of the various receiving stations RS shown diagrammatically on Fig. 6 of the drawings and which are more fully described in my copending application Ser. No. 55,510 filed December 21, 1935. As the brush B2 continues to connect ring R5 with the segments of ring R6 successively, the relay L1 remains unoperated and maintains a spacing condition on the line L as none of these segments are grounded at this time. As brush B2 completes the first revolution and is passing over segment SP of ring R6, ground is again applied to the winding of relay L1, thus causing it to operate and connect negative (marking) battery to the line L. This marking signal serves to bring the brush arms of the various receiving distributors to rest. During the second revolution of the brush B2 of the transmitting distributor TD, the line relay L1 functions similarly, transmitting only a start impulse from segment ST, and thereafter spacing or blank signals. During the third revolution the segments of ring R6 are electrified in accordance with Fig. 11 which depicts the signal arrangement of the quotation of the assumed example, and the line relay L1 transmits these signals to the line in the order indicated.

During the first revolution of the transmitting distributor, as the grounded brushes B1 passed over the various segments of rings R2 and R3, the monitor relays M1 and M2 were caused to operate to start their associated monitor printers. However, no characters were printed on the tapes as the segments of these rings R2 and R3 were not electrified for transmission of character information during this revolution. During the second revolution of the distributor, as the brushes B1 pass over the segments of the rings R2 and R3, the channel 2 monitor printers MP2, which function at this time from ring R3, will receive blank signals, and the monitor printers MP1 functioning from ring R2 will be caused to print the letters of the stock symbol ABC, which was previously written on the keyset KS. The operation of the monitor printers from the rings R2 and R3 will be more fully described hereinafter. As grounded brush B1 passed over segment 13 of ring R4 during the first revolution of the transmitting distributor TD, ground was extended by way of conductor 11 of cable 146 to one end of the winding of relay C5, Fig. 6, the other end of which was connected to battery by way of conductor 213 and break contact and armature 214 of relay PH4. This caused the operation of relay C5. Ground from the operated armature 215 of relay C5 and the make contact thereof is extended by way of the break contact and armature 216 of relay PH3, conductor 7 of cable 137, armature 217 and break contact of relay SC4, armature 218 and break contact of relay SC2 to one end of the winding of relay SC1 thereby operating this latter relay. Relay SC1 in operating causes the operation of relay CH by ground extended from armature 219 of relay SC1 and make contact thereof, break contact and armature 220 of relay SC3 to one end of the winding of relay CH, the other end of this winding being connected to battery.

As the ground is removed from conductor 7 of cable 137 by the release of armature 215 of relay C5 by the passage of brush B1 off segment 13, relay SC1 is held locked by a circuit through its armature 221 and make contact, break contact 222 of the make before break combination of relay SC4, through the winding of relay SC2 to ground. This circuit causes relay SC2 to operate in series with relay SC1.

Ground from ring R1 is extended by brush B1, segment 17 of ring R4 at the end of the first revolution of the distributor, conductor 15 of cable 137, armature 302 and break contact of relay PH6, Fig. 6, conductor 8 of cable 151 to one end of the winding of relay CC3, Fig. 4, which operates. Ground is then connected by way of armature 9 of relay CC3 and its make contact, conductor 9 of cable 151, and armature 311 and break contact of relay TR2, Fig. 6, through the winding of relay TR1, break contact and armature 214 of relay PH4 to battery causing relay TR1 to operate and lock by way of its armature 305 and make contact in series with the winding of relay TR2 to ground, relay TR2 also operating over this circuit. As brush B1 passes off segment 17 of ring R4 relay CC3 releases.

Relay TR2 in operating caused the monitor relays M1 and M2 which were operating from ring R3 and R2 respectively to be interchanged so that during the next revolution of the distributor TD, the monitor printers MP1 will operate from ring R2 and the monitor printers MP2 will operate from ring R3. The interchanging of the monitor relays M1 and M2 with rings R2 and R3 takes place at the make before break contacts 144 and 145 of relay TR2, Fig. 6, which operates at the end of each revolution during which channel 1 signals are transmitted and releases at the end of each revolution for channel 2 signals.

As brush B1 passes over segment 1 of ring R4, during the latter part of the first revolution and at the beginning of the second revolution, ground from ring R1 is extended by way of conductor 14 of cable 137, armature 208 and break contact of relay PH2, conductor 2 of cable 137, armature 210, and break contact of relay ST, armature 211 and break contact of relays C3, armature 212 and make contact of relay SC1, conductor 3 of cable 110, armature 109 and make contact of relay A1, Fig. 2, break contact and armature 223 of relay SK, and conductor 5 of cable 130 to one end of the winding of relay G1, Fig. 1, and causes the operation of relay G1 which locks by way of its contact 224, conductor 1 of cable 110, make contact and armature 225 of relay SC2, break contact and armature 226 of relay SC3 to ground.

As grounded brush B1 engages segment 2 of ring R4, ground is connected by way of conductor 4 of cable 137, break contact and armature 227 of relay PH3, Fig. 6, conductor 3 of cable 137 to one end of the winding of relay CC1, Fig. 5, causing the operation of this relay.

As relay CC1 operates, one end of each of the winding of the relays 1D1 to 1D6 and 2D1 to 2D6 are connected by conductors 1 to 5 of cables 229 and 230 respectively to contacts and operated armatures 1 to 10 of relay CC1, conductors 1 to 10 of cable 108, contacts 1 to 10 of relay G1, and conductors 1 to 10 of cable 228 to contacts 67 of the groups 1L and 2L of the overlap unit OU, Fig. 1. Those contacts 67 which are in contact with their associated grounded springs 66, complete a circuit to operate the associated decoding relays of the groups 1D1 to 1D6, 2D1 to 2D6, Fig. 5. As heretofore stated, contacts 66 and 67 associated with the first and second selection magnets of the group 1L and the first, fourth and fifth selection magnets of the group 2L were closed in accordance with the code for the letters A and B respectively. Therefore, the grounds extended by way of conductors 1, 2, 6, 9 and 10 of cable 228, contacts 1, 2, 6, 9 and 10 of relay G1, conductors 1, 2, 6, 9 and 10 of cable 108, contacts 1, 2, 6, 9 and 10 of relay CC1, and conductors 1 and 2 of cable 229 and conductors 1, 4 and 5 of cable 230 to the windings of relays 1D1 and 1D2, 2D1, 2D4, 2D5 and 2D6 cause the operation of these decoding relays which lock by way of their armatures 231 and make contacts and conductor 232 to the break contact and armature 233 of relay DR, Fig. 7 to ground. As grounded brush B1 passes over segment 3 of ring R4, a circuit is completed through the winding of relay TPFR, Fig. 7, conductor 213, break contact and armature 214 of relay PH4, Fig. 6, to battery. Relay TPFR operates and connects ground by way of its armature 240 and make contact thereof, conductor 4 of cable 199, armature 241 and break contact of relay CH to the winding of relay ST causing relay ST to operate. The relays TPFR and ST perform no useful function at this time and release as brush B1 passes off segment 3 of ring R4.

As brush B1 crosses segment 4 of ring R4, ground is extended to one end of the winding of relay C1, the other end of which is connected to battery by way of conductor 213, break contact and armature 214 of relay PH4, causing the operation of the relay C1 which performs no useful function at this time.

As grounded brush B1 passes over segment 5 of ring R4, no circuit is completed at this time.

Brush B1 in engaging segment 6 of ring R4 extends ground by way of conductor 1 of cable 242 to one end of the winding of relay CC4, Fig. 4, the other end of which winding is connected by way of conductor 213 and break contact and armature 214 of relay PH4 to ground, causing the operation of relay CC4.

Relay CC4 in operating completes a connection in part from one end of the windings of relays U1 to U4, F1 to F3 and SS, Fig. 4, including conductors 21 and 30 to 36 of cable 108, to contacts 392 and 9 to 16 of the various relays G2. However, since none of the relays G2 is operated, no circuits are grounded to cause the operation of any of the relays U1 to U4, F1 to F3 and SS.

Brush B1 in crossing segment 7 of ring R4, grounds one end of the winding of relay C2, the other end of which is connected to battery by way of conductor 213, thus causing the operation of relay C2, which performs no useful function at this time.

Grounded brush B1 in passing over segment 8 of ring R4 causes the operation of relay SNR, one end of its winding being connected to segment 8 and the other end to battery by way of conductor 213. Relay SNR performs no useful functions at this time.

Grounded brush B1 in passing over segment 9 of ring R4 extends ground by way of conductor 1 of cable 132, operated contacts 133 of relay G1, Fig. 1, to one end of the winding of relay G2, thus causing the operation of this relay G2 which locks by way of its contacts 244, conductor 7 of cable 130 to break contact and the grounded armature 245 of relay SK.

As brush B1 grounds segment 10 of ring R4, a circuit is completed by way of conductor 2 of cable 242 to one end of the winding of relay CC2, the other end of which winding is connected to battery by way of conductor 213 and break contact and armature 214 of relay PH4, Fig. 6, thus causing the operation of relay CC2.

Relay CC2 in operating connects one end of the windings of relays 3D1 to 3D6, Fig. 4 and PF1 and PF2, Fig. 5 by way of contacts 1 to 5 and 6 and 7 respectively, conductors 11 to 17 of cable 108 to contacts 11 to 17 of relay G1 and contacts 67 of the groups 3L and PF of the overlap unit OU, Fig. 1. As heretofore stated contacts 66 and 67 of the second, third and fourth magnets only of the group 3L were operated to store the code corresponding to the letter C, having the second, third and fourth units thereof marking and the first unit spacing in character, Fig. 12. The contacts 66 and 67 associated with the group PF were not operated as the quotation in the assumed example is not for a preferred issue of stick. Ground from operated contacts 66 and 67 of the second, third and fourth magnets of group 3L of the overlap unit OU is extended by way of conductors 12, 13 and 14 of cable 228, contacts 12, 13 and 14 of relay G1, conductors 12, 13 and 14 of cable 108, armatures 2, 3 and 4 and their make contacts of relay CC2 and conductors 2, 3 and 4 of cable 246 to one end of the windings of relays 3D2, 3D3 and 3D4, Fig. 4, respectively, thus causing the operation of these latter relays which lock by way of their armatures 231 and make contacts, conductor 247 and break contact and armature 240 of relay TPFR, Fig. 7, to ground. As grounded brush B1 passes off segment 10 of ring R4, relay CC2 releases.

As brush B1 crosses segment 11 of ring R4, relay C3 is operated by ground at one end of its winding from segment 11 and battery at the other end of its winding by way of conductor 213, break contact and armature 214 of relay PH4.

Relay C3 in operating extends ground by way of its armature 248 and make contact to one end of the winding of relay DO, the other end of which winding is connected to battery by way of conductor 213. Relay DO operates and locks by way of its armature 249 and make contact to the break contact and armautre 250 of relay DR to ground. As relay DO operates, ground is extended by way of its armature 255 and make concontact, conductor 3 of cable 242 to the armatures 115 of relays 1D1 and 2D1, Fig. 5 and 3D1, Fig. 4. Circuits are now completed through the contacts of each of the three groups of decoding relays 1D1 to 1D6, 2D1 to 2D6 and 3D1 to 3D6 as follows:

Ground is extended from armature 115 and make contact of relay 1D1, armature 256 and make contact of relay 1D2, armature 257 and break contact of relay 1D3, armature 258 and break contact of relay 1D4, armature 259 and break contact of relay 1D5, conductor A of cable 112 to one end of the winding of the first letter relay 1A, thus causing relay 1A to operate its armatures 1, 2, and 3 and close the contacts thereof. The second circuit is completed from ground at armature 115 and make contact of relay 2D1, armature 260 and break contact of relay 2D2, armature 261 and break contact of relay 2D3, armature 262 and make contact of relay 2D4, armature 263 and make contact of relay 2D5, conductor B of cable 113 to one end of the winding of the second letter relay 2B causing the operation of relay 2B. The third circuit extends from grounded armature 115 and break contact of relay 3D1, Fig. 4, armature 263' and make contact of relay 3D2, armature 264 and make contact of relay 3D3 and armature 265 and make contact of relay 3D4, conductor 1 of cable 266, armature 267 and break contact of relay 3D5, conductor C of cable 114 to the operated contact C of the second letter relay 2B, Fig. 5, and thence to one end of the winding of the stock relay ABC. Relay ABC does not operate at this time, however, as the circuit to the other end of its winding is open at the unoperated armature 268 of the battery feed relay BF. As heretofore stated, the conductors BL and A to Z of cable 114 are multipled by means of cable 116 to all second letter relays and terminate on corresponding contacts thereof, but this circuit is without effect at this time due to the unoperated condition of these relays other than relay 2B.

As brush B1 passes off segment 11 and onto segment 12 of ring R4, relay C3 releases and ground is extended from segment 12 by way of conductor 9 of cable 146 to one end of the winding of relay C4, the other end of which winding is connected to battery by way of conductor 213, break contact and armature 214 of relay PH4, thus causing the operation of relay C4 which locks by way of its make contact and armature 270, conductor 271 and break contact and armature 215 of relay C5 to ground. As relay C4 operates, it connects ground by way of armature 272 and make contact, conductor 14 of cable 146 to one end of the winding of relay RA, which operates and locks by way of its armature 273 and make contact to break contact and armature 274 of relay DR. Relay RA performs no useful function at this time. Grounded armature 275 of relay C4 connects ground by way of its make contact and conductor 276 to one end of the winding of relay TS which operates to battery to conductor 213 but performs no useful function at this time. Armature 227 of relay C4 connects ground by way of its make contact and conductor 5 of cable 151 to one end of the winding of relay BF, Fig. 5, which operates and locks by way of its make contact and armature 278, conductor 4 of cable 151 and break contact and armature 279 of relay BFR, Fig. 3 to ground. Relay BF in operating, connects battery by way of its armature 268 and make contact, and conductor 280 to one end of all of the stock relays ABC, BB, C, etc., thus causing the operation of the selected stock relay ABC.

As stock relay ABC operates and moves its armatures 4, 5 and 6 into engagement with their associated make contacts, ground is extended from armatures 1, 2 and 3 and make contact of the relay 1A, armatures 4, 5 and 6 and make contacts of relay ABC terminals designated 1, 2 and 3 of the group 117, 118 and 119 respectively, conductors 1, 12 and 13 of the cables 120, 124 and 126, the circuit from conductor 13 of cable 126 continuing through armature 3 and break contact of relay PF1 to conductor 3 of cable 127, to one end of the windings of relays HS1, TS2 and US3, Fig. 8, causing these latter relays to operate and lock by way of their make contacts and armatures 1, conductor 2 of cable 199 and break contact and armature 3 of relay SNR, Fig. 7, to ground. Relay HS1 when operated extends ground by way of its armatures 281 and 282 and conductors 1 and 2 of cable 284 to segments 1 and 2 of group HSN of ring R6 of the transmitting distributor TD, Fig. 7. Relay TS2 when operated extends ground by way of its armatures 285 and 286 and make contacts, and conductors 5 and 7 of cable 284 to segments 1 and 3 of group TSN of ring R6, and relay US3 when operated extends ground by way of its armatures 287 and 288, and conductors 9 and 12 of cable 184 to segments 1 and 4 respectively of group USN, ring R6. The segments of groups HSN, TSN and USN of ring R6 are now electrified in accordance with the codes corresponding to the stock number digits 1, 2 and 3 respectively, which digits are assigned to the stock ABC in the assumed example.

As brush B1 passes onto segment 13 of ring R4, ground is connected by way of conductor 11 of cable 146 to one end of the winding of relay C5 causing this relay to operate and as its armature 215 disengages from its break contact, removes ground from conductor 271 and armature 270 of relay C4, thereby releasing relay C4. Armature 215 of relay C5 connects ground by way of its make contact, break contact and armature 216 of relay PH3, conductor 7 of cable 137, armature 217 and break contact of relay SC4, and armature 218 and make contact of relay SC2 to one end of the winding of relay SC3, thereby causing the relay SC3 to operate and lock by way of its armature 290 and make contact thereof in series with the break contact and armature 300 of relay SC4 to ground.

As the armature 226 of relay SC3 became disengaged from its break contact, ground was removed from armature 225 and make contact of relay SC2, conductor 1 of cable 110 causing relay G1 to release. Relay SC3 in operating also causes its armature 220 and break contact to open and remove ground from one end of the winding of the relay CH, thereby causing the latter relay to release. As brush B1 passes off segment 13 of ring R4, relay C5 is released.

Grounded brush B1 in passing over segment 15 of ring R4 causes the operation of relay DR, whose armatures 250, 274 and 233, in moving from their break contacts interrupt circuits which release relays DO, and RA, and remove ground from conductor 232, thereby causing the release of relays 1D1, 1D2, 2D1, 2D4 and 2D5, which were operated to store the code signals for the letters A and B of the stock symbol ABC. Grounded armature 301 of relay DR, when operated to its make contact extends ground by way of conductor 10 of cable 146 to one end of relay TS, Fig. 6, causing the relay TS to operate. As brush B1 passes over segment 16 and connects ground to conductor 10 of cable 146, relay TS is held operated.

Grounded brush B1 in passing over segment 17 connects ground by way of conductor 15 of cable 137, armature 302 and the break contact of relay PH6, conductor 8 of cable 151 to one end of the winding of relay CC3, Fig. 4, the other end of which winding is connected to battery by way of conductor 213 and break contact and armature 214 of relay PH4. Relay CC3 operates and closes a circuit from one end of the windings of each of the relays R1 to R4 and T1 to T4 by way of conductors 22 to 29 of cable 108, contacts 1 to 8 of relay G2, conductor 1 to 8 of cable 303 to the contacts 67 associated with the range and tens groups of the overlap unit OU, Fig. 1. As heretofore stated, contacts 66 and 67 of the third magnet of group RA and the first, third and fourth magnets of group T, are closed in accordance with the code for the unison range and the tens price digit 9, Figs. 13 and 14. Ground on springs 66 of these magnets is extended by way of conductors 3, 5, 7 and 8 of cable 303, contacts 3, 5, 7 and 8 of relay G2, conductors 24, 26, 28 and 29 of cable 108, armatures 3, 5, 7 and 8 and their make contacts of relays CC3, Fig. 4 to one end of the windings of relays R3 and T1, T3 and T4 respectively, thereby causing their operation. These latter relays lock by way of their armatures 135 and make contacts, conductor 232 to the break contact and armature 233 of relay DR.

Coincident with the passage of brush B1 over the segments of ring R4, ground is applied to the corresponding segments of rings R2 and R3 which as heretofore stated, control the monitor tickers MP1 and MP2. During the second revolution of the distributor, ring R3 controls monitor printers MP1 and ring R2 controls monitor printers MP2, these printers and rings having been previously interchanged by the operation of relay TR2. Brush B1 in passing over the segments of ring R3 during this revolution transmits signals to monitor printers MP2, which are indicative of no quotation whereas brush B1 in passing over the segments of ring R2 causes the monitor printers MP1 to print the stock symbol, which in this case, comprises the letters ABC.

As brush B1 passes off segment SP of group PF of ring R2, onto segment ST of group 1L, ground is removed from conductor 7 of cable 146, make contact and armature 304 of relay TR2, conductor 143, break contact and armature 141 of relay PH5, in series with the winding of relay M1, thereby causing relay M1 to release and transmit a signal of positive (spacing) battery to the monitor printers MP1. This spacing signal causes the distributor shafts of the monitor printers MP1 to revolve, preparatory to receiving subsequent character selection signals. At this time relay CC1, Fig. 5, operated in the manner described and caused the code signals indicative of the first and second letters A and B respectively of the stock symbol ABC, which were stored in groups 1L and 2L of the overlap unit OU to be transferred to the first and second letter decoding relay groups, thereby operating relays 1D1 and 1D2 of the first letter group and 2D1, 2D4 and 2D5 of the second letter group.

As grounded brush B1 passes over segment 1 of group 1L of ring R2, ground is extended by way of conductor 1 of cable 150, armature 147 and make contact of relay 1D1, conductor 7 of cable 146, and thence through a circuit heretofore described to one end of the winding of relay M1, thereby causing the operation of the relay M1, which transmits a signal of negative (marking) battery to the monitor printers MP1. Brush B1 in passing over segment 2 of group 1L of ring R2, connects ground by way of conductor 4 of cable 161, contact of relay MT1 and conductor 1 of cable 162 to the armature 147 and make contact of relay 1D2, conductor 7 of cable 146, make contact and armature 304 of relay TR2, conductor 143, break contact and armature 141 of relay PH5 and thence to the winding of relay M1, thereby maintaining it in the operated position and causing a second marking impulse to be transmitted to the monitor printers MP1. As relays 1D3, 1D4 and 1D5 are not operated, no circuits are completed as brush B1 passes over segments 3, 4 and 5 of group 1L of ring R2, therefore relay M1 is released as brush B1 passes off segment 2 of group 1L, and causes the transmission of spacing signals to the monitor printers MP1 for the duration of the three remaining character signals.

Six signals, namely the start signal and five character selection signals have now been received by the monitor printers MP1. The seventh signal transmitted thereto is for indicating whether the selected character is to be printed on the upper or lower position of the tapes. This 7th or shift signal is controlled by the 6th segment of each of the groups of segments of rings R2 and R3.

As brush B1 engages segment 6 of group 1L of ring R2, which is unconnected, no circuit is completed to the winding of relay M1, and this relay therefore is in a released condition and transmits a spacing signal to the monitor printers MP1 indicating that the previous signals transmitted thereto are indicative of a character to be displayed in the upper case position of the tapes.

Brush B1 in passing over segment SP of group 1L causes conductor 7 of the cable 146 to be grounded, thereby operating relay M1 which transmits a marking impulse to the monitor printers MP1 which causes their distributor shafts to come to rest.

As brush B1 passes over the segments of the groups 2L and 3L, the receiving mechanisms of the monitor printers MP1 are set in motion as segments ST are crossed, and are brought to rest as segments SP are crossed and segments 1 to 5 of each of the groups control the transmission of marking or spacing character signals, depending upon the condition of their associated relays 2D1 to 2D6 and 3D1 to 3D6. In the assumed example the relays 2D1, 2D4 and 2D5 are operated, thereby completing circuits to the monitor relay M1 as the brush B1 passes over segments 1, 4 and 5 of group 2L of ring R2, and causing character code signals for the letter B to be transmitted to the monitor printers MP1. Similarly, circuits are completed successively by relays 3D2, 3D3 and 3D4 from the segments 2, 3 and 4 of the group 3L to the winding of relay M1, thereby causing signals corresponding to the letter C to be transmitted to the monitor printers MP1.

Brush B1 in passing over the segments of the preferred group PF of ring R2 causes spacing signals to be transmitted to the monitor printers MP1 as the stock in the assumed example is not of a preferred issue.

Relay CC3 in operating at the time of the passage of brush B1 over segment 17 of ring R4 during the second revolution, extended ground by way of its armature 9 and make contact, conductor 9 of cable 151, armature 311 and its make contact of relay TR2 to the winding of relay TR3, thereby operating relay TR3. Armature 312 of relay TR3 connected battery through resistance 313 and contact 314 to one end of the winding of relay TR2 thereby holding the latter relay operated as relay TR1 was released by the opening of contacts 306 and 314. As brush B1 passed off segment 17 of ring R4 and released relay CC3, relay TR3 is also released by the opening of armature 9 and its make contact of relay CC3, and armature 312 and contact 314 of relay TR3 in opening released relay TR2. Relay TR2 in releasing caused its make before break contacts 144 and 145 to interchange the connections between the monitor printer relays M1 and M2 and the rings R2 and R3 so that monitor printers MP1 during the next revolution are controlled from ring R3 and monitor printers MP2 are controlled from ring R2 of the transmitting distributor TD.

As brush B1 connects ground to segment 1 of ring R4, during the third revolution of the transmitting distributor TD, ground is connected by conductor 14 of cable 137, armature 200 and break contact of relay PH2, Fig. 6, conductor 2 of cable 137, armature 210 and break contact of relay ST, Fig. 8, armature 211, and make contact of relay SC3, armature 306 and make contact of relay SC1, and conductor 6 of cable 110 to armature 109 of relay A4. This grounded circuit is utilized for operating a gang relay G1, associated with one of the channel 2 positions, whose seeker relay SK may at this time be released to indicate a quotation ready for transmission. If, for example, the seeker relay SK of the position 8 is released to indicate that a call from that position is ready for transmission, the ground on armature 109 of the auxiliary relay A4 continues by way of associated break contact and armature 111 and break contact of seeker relay SK, conductor 5 of cable 130 to the winding of the relay G1 associated with position 8, thereby causing the operation of this relay G1. Likewise the indication of a call ready for transmission from channel 2 position 7 by the release of the seeker relay SK of that position, would cause its associated gang relay G1 to be operated by the ground on armature 109 of relay A4, except in this case, the auxiliary relay A4 would be in the operated position, thereby causing the ground on armature 109 to continue by way of its make contact, and break contact and armature 111 of relay SK of position 7.

As brush B1 engages segment 2 of ring R4, ground is connected to conductor 4 of cable 137, break contact and armature 227 of relay PH3, conductor 3 of cable 137 and thence to the winding of relay CC1 thereby causing relay CC1 to operate and connect the windings of relays 1D1 to 1D6 and 2D1 to 2D6 to the conductors 1 to 10 of cable 108 which extend to correspondingly numbered contacts on the various relays G1. In the event that a gang relay G1 associated with one of the channel 2 positions had been operated by the passage of brush B1 over segment 1 of ring R4, the code for the first and second letters of a channel 2 stock symbol stored on the overlap unit associated with that particular relay G1, would now be transferred to the relays 1D1 to 1D6 and 2D1 to 2D6.

As brush B1 passes over segment 3 of ring R4, relay TPFR operates and at its armature 240 and break contact interrupts the locking circuit which extends by way of conductor 247 to the relays 3D1 to 3D5, thereby causing the release of those relays of this group which had been previously operated and locked to store the code for the letter C of the stock symbol ABC.

Brush B1 in passing over segment 4 of ring R4 causes relay C1 to operate but perform no useful function at this time.

As segment 5 of ring R4 is crossed by brush B1, ground is placed on conductor 3 of cable 199 but this circuit is not completed during this revolution of the brush.

Brush B1 in passing over segment 6 of ring R4 causes the operation of relay CC4 as heretofore described, which relay connects the winding of relays U1 to U4 and F1 to F3 and SS to the contacts 67 of the groups U and F and SS of the overlap unit OU, thereby connecting ground from the operated contacts 66 and 67 of the first and fourth magnets of the group U and the first, second and third magnets of the group F, which were previously operated to indicate the units and fractions portion of the price 8 and 7/8, by way of conductors 9, 12, 13, 14 and 15 of cable 303, contacts 9, 12, 13, 14 and 15 of relay G2, conductors 30, 33, 34, 35 and 36 of cable 108, armatures 1, 4, 5, 6 and 7 of relay CC4 from whence the make contacts of armatures 1 and 4 are connected by way of conductors 9 and 12 of cable 136 to one end of the windings of relays U1 and U4, and the contacts of armatures 5, 6 and 7 extend by way of armatures 1, 2 and 3 and the break contacts of relay SSFR, conductors 13, 14 and 15 of cable 136 to the windings of relays F1, F2 and F3 respectively. Relays U1, U4, F1, F2 and F3 operate and lock by way of their armatures 135 and make contacts, and conductor 247 to the break contact and grounded armature 240 of relay TPFR, Fig. 7.

As brush B1 passes over segment 7 of ring R4 and causes the operation of relay C2, ground is extended from armature 314 of relay C2 and its make contact, conductor 2 of cable 132, contacts 134 of operated relay G2, Fig. 1, and conductor 6 of cable 130 to one end of the winding of seeker relay SK, thereby operating this relay which locks by way of its make contact and armature 191, and conductor 3 of cable 130 to contact 73, and grounded armature 74 of the overlap unit OU. As relay SK operates, its armature 192 removes ground from its break contact, conductor 1 of cable 130 and keylock magnet KL, thereby preparing the keyset for the depression of a range key to operate the overlap unit OU and cause the transmission of a second quotation from keyset position 1. Armature 245 of relay SK removes ground from its break contact, conductor 7 of cable 130, contacts 244 and winding of relay G2 thereby causing it to release. Ground at armature 195 of relay SK which is connected by way of armature 193 and its break contact, and armature 194 and its break contact of the switch TK, is extended to the armatures 195 and make contacts of the seeker relays SK of the other positions, and conductor 7 of cable 110, to armature 196 of relay ST, Fig. 8, preparatory to locking relay ST when this latter relay is subsequently operated.

Brush B1 in passing over segment 8 of ring R4 causes the operation of relay SNR which, at its armature 3 and break contact, interrupts the ground which extends over conductor 2 of cable 199, thereby causing the release of relays HS1, TS2 and US3. These relays, it will be noticed, release at a time after the brush B2 has passed over the segments HSN, TSN and USN of ring R6.

At the beginning of the third revolution as brush B2 passed off the grounded segment SP onto segment ST of ring R6, ground was removed from ring R5, conductor 10 of cable 137, break contact 360 of the make before break contact 138 of relay PH3 and winding of relay L1, thus causing relay L1 to release and transmit a positive (spacing) signal to the line L which caused the receiving distributor RD of the several receiving stations RS, which may be of the type disclosed in my copending application Ser. No. 55,510, filed December 21, 1935, to revolve in synchronism with the transmitting distributor TD. As heretofore stated, segments 1 and 2 of group HSN of ring R6 and segments 1 and 3 of group TSN and segments 1 and 4 of USN were grounded by the operation of relays HS1, TS2 and US3. Therefore, as brush B2 passed over the segments of the groups of segments HSN, TSN and USN, those segments which were grounded extended ground by way of brush B2, ring R5, conductor 10 of cable 137 to the winding of relay L1, thus causing the operation of relay L1 to transmit a marking impulse to the line L, each time a grounded segment was crossed by the brush B2.

As brush B1 passes over segment 9 of ring R4, ground from ring R1 is extended by way of conductor 1 of cable 132 to contacts 133 of the several G1 relays, and in the event that a G1 relay associated with a channel 2 position has been operated, this ground will extend through the operated contacts 133 of the operated G1 relay to the winding of the associated relay G2, and thereby operate the latter relay in a manner similar to the operation of relay G2 of position 1, channel 1 which was heretofore described.

As brush B1 passes over segment 10 of ring R4, ground is applied to conductor 2 of cable 242 causing relay CC2 to operate and complete circuits from the windings of the relays 3D1 to 3D6, Fig. 4, and PF1 and PF2, Fig. 5, to associated contacts on the various G1 relays, thereby enabling the code signals for the third letter and preferred designations of a stock symbol of a channel 2 quotation to be cut through, provided a channel 2 quotation has been written on a keyset and a channel 2 position gang relay G1 had been operated at this time.

Brush B1 in passing over segment 11 of ring R4 causes the operation of relay C3, which by its armature 248 and make contact, operates relay DO which locks by way of its armature 249 and make contact thereof to the grounded armature 256 of relay DR. The operation of relay DO at its armature 255 supplies ground to conductor 3 of cable 242 and thence to the armature 115 of relays 1D1, 2D1 and 3D1, Fig. 4, to decode the signals for a stock symbol which may have been stored thereon indicative of a channel 2 quotation.

Brush B1 as it passes over segment 12 of ring R4 extends ground by way of conductor 9 of cable 146 to one end of the winding of relay C4, thereby causing this relay to operate and lock by way of its make contact and armature 276, to the break contact and grounded armature 215 of relay C5. Grounded armature 277 of relay C4 when operated to engage its make contact completes a circuit by way of conductor 5 of cable 151 to cause the operation of relay BF, Fig. 5, which supplies battery at its operated armature 268 and make contact to one end of the windings of all of the stock relays including the stock relays ABC, BB and C.

Operated armature 289 of relay C4 extends ground by way of conductor 8 of cable 137, armature 307 and make contact of relay SC3 to one end of the winding of relay SC4, thereby causing the latter relay to operate and lock by way of its contact and armature 308, conductor 8 of cable 137, make contact and armature 289 of relay C4 to ground. As relay SC4 operates, battery is connected by way of resistance 310, make contact and armature 309 of relay SC2, armature 308 and make contact of relay SC4 to one end of the winding of relay SC2, thus maintaining relay SC2 operated as contact 222 of relay SC4 is opened to interrupt the locking circuit of relay SC1 and cause the latter relay to release. As relay SC1 releases it connects ground by way of its armature 219 and break contact, and make contact and armature 220 of relay SC3 to one end of the winding of relay CH, causing the relay CH to operate.

As brush B1 passes over segment 13 ground is placed on conductor 11 of cable 146 and relay C5 is operated and at its armature 215 interrupts the locking ground for relay C4 which releases. The release of armature 289 of relay C4 removes ground from conductor 8 of cable 137, armature 308 and make contact and winding of relay SC4, and relay SC4 releases, and causes the release of relay SC2 by interrupting its locking circuit at the make contact and armature 308 of relay SC4. Relay SC2 in releasing removes ground from conductor 2 of cable 110, and thereby causes the release of any one of the gang relays G1 of channel 2 which may have been operated.

As brush B1 passes over segment 14 of ring R4 ground is connected to conductor 14 of cable 149 and relay BFR, Fig. 3, is operated and at its armature 249 removes ground from conductor 4 of cable 151 thereby releasing relay BF, Fig. 5.

Brush B1 in passing over segment 15 causes the operation of relay DR which in turn releases relays DO and RA and any of the relays 1D1 and 1D6 and 2D1 to 2D6, which may have been operated to store the signals for the first and second letters of a channel 2 quotation. Armature 301 of relay DR connects ground to its make contact and conductor 10 of cable 146 and conductor 276 to operate relay TS in a manner hereinbefore described, and the passage of brush B1 over segment 16 of ring R4 applies ground to conductor 10 of cable 146 to maintain relay TS operated after relay DR released by the passage of brush B1, off segment 15.

As brush B1 passes over segment 17, ground is connected by way of conductor 15 of cable 137, armature 302 and break contact of relay PH6, conductor 8 of cable 151 to one end of the winding of relay CC3, thereby causing relay CC3 to operate and connect the windings of relays R1 to R4 and T1 to T4 to corresponding contacts of the various G2 relays, permitting certain of the relays R1 to R4 and T1 to T4 to operate in accordance with code signals stored on a channel 2 overlap unit, whose associated relay G2 may be operated.

Relay CC3 in operating at the end of this, the third revolution, extends ground by way of its armature 9 and make contact, conductor 9 of cable 151, armature 311 and the break contact of relay TR2 to the winding of relay TR1, thereby operating the relay TR1. As the armature 305 of relay TR1 engages the make contact relay TR2 operates.

During the third revolution and coincident with the passage of brush B1 over segments 8 to 17 of ring R4, brush B2 connected ring R5 to the segments of the groups MUX, RA, T, U and F of ring R6, and the line relay L1 was actuated to transmit marking and spacing signals in accordance with the settings of the tongues of the multiplex tape transmitter MUX and the relays R1 to R4, T1 to T4, U1 to U4, and F1 to F3, certain of these relays having been operated to store the code signals indicative of Unison range, and 9, 8 and ⅞ for the price, of the assumed example. Each time brush B2 crossed a segment which was grounded by its associated relay being operated, the line relay L1 was caused to operate to transmit a signal of marking character. An ungrounded segment caused the relay L1 to transmit a spacing impulse. The signals transmitted during the third revolution, as previously stated, are shown in Fig. 11.

The monitor printers MP1 on whose tapes the stock symbol was printed during the preceding revolution of the distributor, were, during the third revolution, operated to print characters representative of the range and price of the stock being transmitted, which in the assumed example is Unison and 98⅞ respectively. The printers MP1 during the third revolution of the distributor were controlled by the segments of ring R3 and in a manner similar to that described for printing the symbol ABC.

The transmitting equipment is arranged to send at least two blank signals to the receiving equipment after the last of a series of quotations has been transmitted. These blank signals are required for timing the equipment at the receiving stations RS.

The transmitter in sending these blank signals operates in the following manner:

During the fourth revolution of the distributor

TD, as brush B2 passes over the transmitting segments of ring R6, relay LI is unoperated and blank signals of spacing character are therefore transmitted to the line L, and the monitor printers MPI and MP2 also receive signals indicative of no quotations.

As brush BI passes over segment 12 of ring R4 and causes the operation of relay C4, this relay by the operation of its armature 289, engages its make contact and extends ground by way of conductor 8 of cable 137, armature 307 and make contact of relay SC3, to one end of the winding of relay SC4, thereby operating relay SC4 which locks by way of its make contact and armature 308 to the grounded conductor 8 of cable 137. As relay SC4 operates its armature 300, ground is removed from the associated break contact, and the make contact and armature 290 of relay SC3, thereby causing the relay SC3 to release. Relay C4 in releasing by the passage of brush BI off segment 12, removes ground from conductor 8 of cable 137 and thus releases relay SC4. Relays SCI to SC4 are now both unoperated.

As relay SC3 was released by the operation of relay SC4, relay CH was also released by the armature 220 of relay SC3 moving from its make contact and interrupting the locking circuit of relay CH.

During the succeeding revolution of the transmitting distributor, which is the fifth revolution, blank signals are again transmitted to the line L and to the monitor printers MPI and MP2. As brush BI passes over segment 3 of ring R4 and operates relay TPFR, ground is extended by way of armature 240 and make contact of relay TPFR, conductor 4 of cable 199, armature 241 and break contact of relay CH to the winding of relay ST, which operates and locks by way of its make contact and armature 196 to ground on conductor 7 of cable 110 which ground extends through the make contacts and armatures 195 of the seeker relays which are at this time operated to the key TK. As armature 197 of relay ST operates and removes ground from its break contact and armature 198, break contact of phasing key PK, conductor 1 of cable 199, and winding of start magnet SM, the latch 139 associated with the start magnet is released preparatory to stopping the brushes BI and B2 at the end of their current revolution. Two blank transmissions are thus sent to the line L. However, as the distributor TD is arranged to come to rest only at the end of an even-numbered revolution, and this revolution is an odd-numbered one, provision is made for causing brushes BI and B2 to make one additional revolution.

As brush BI passes over segment 13 and causes the operation of relay C5, ground is extended from its armature 215 and make contact, break contact and armature 216 of relay PH3, conductor 7 of cable 137, armature 217 and break contact of relay SC4, armature 218 and break contact of relay SC2, to one end of the winding of relay SC1, thereby operating this relay SC1 and causing it to lock in series with relay SC2 upon the release of relay C5. Relay SC1 upon operation extends ground by way of its armature 219 and make contact, break contact and armature 220 of relay SC3 to the winding of relay CH, causing relay CH to operate. Armature 315 of relay CH in operating to its make contact, connects ground by way of conductor 1 of cable 199 to the winding of the start magnet SM, causing this magnet to again attract its latch 139 and withdraw it from the path of the rotating arm of the brushes BI and B2, thus enabling them to continue rotating for another revolution, this being the sixth.

As relay C5 is operated during the sixth revolution, ground from its armature 215 and make contact, break contact and armature 216 of relay PH3, conductor 7 of cable 137, armature 217 and break contact of relay SC4, and armature 218 and make contact of relay SC2 is connected to the winding of relay SC3, which operates and locks by way of its armature 290 and make contact to ground at the break contact and armature 300 of relay SC4. Relay SC3 in operating, causes the release of relay CH, by the armature 220 and break contact of relay SC3 interrupting the holding circuit of relay CH. Relay CH in releasing, removes ground from conductor 1 of cable 199 and the winding of the start magnet SM thereby permitting the latch 139 to release and thus bring the distributor TD to rest at the completion of the sixth revolution.

*Phasing operation*

The transmitting apparatus described herein, also has provision for transmitting a prolonged rest condition to the line L, at regular predetermined intervals. This rest condition is applied to the line for the time required for two revolutions of the distributor and invariably begins with an odd-numbered revolution. This rest condition is for the purpose of permitting any of the receiving stations which may have become out of synchronism with the transmitting distributor TD, to become in unison therewith.

Assume, for example, that the transmitter is operating continuously and that contact 350, Fig. 7, of the transmitting distributor TD is arranged to close momentarily, once during each period of time equivalent to 120 continuous revolutions of the distributor TD and apply ground to conductor 13 of cable 137 extending to one end of the winding of relay PH, Fig. 6, closure of this contact therefore operates relay PH which prepares a locking circuit by way of its armature 351 and make contact in series with the winding of relay PHI to ground at the armature and break contact 352 of relay PH4. When contact 350 opens and removes ground from conductor 13 of cable 137, relay PH locks in series with relay PHI, and relay PHI thus operates. With relay PHI operated, as brush BI is passing over segment 5 of ring R4 during an even numbered revolution, ground is extended by way of segment 5, conductor 3 of cable 199, make contact and armature 377 of relay CH, conductor 5 of cable 137, and armature 366 and make contact of relay PHI to one end of the winding of relay PH2 which now operates and locks by way of its armature 367 and make contact, to armature 362 and its grounded break contact of relay PH6.

As brush BI connects ground to segment 1 of ring R4, a circuit is completed by way of conductor 14 of cable 137, armature 200 and make contact of relay PH2, armature 353 and break contact of relay PH4 to one end of the winding of relay PH3 which operates. Relay PH3 locks by way of its armature 354 and make contact in series with the winding of relay PH4, to ground on the armature and break contact 355 of relay PH8 as the brush BI leaves segment S1. As relay PH3 operates, ground on its armature 356 is connected by way of its make contact, and contacts 357 and 358 of relay PH8 to the armature 359 and contact 138 of relay PH3, to the winding of relay LI, thereby operating the relay LI and causing a rest condition of negative battery to be applied to the line L. As armature 359 of relay PH3 engaged contact 138, it forced the latter contact from engagement with contact 360 and thereby caused the ring R5 to be disconnected from the winding of relay L1.

Relay PH3 in operating its armature 361 caused the release of MT1, Fig. 7, and the operation of relay MT2 by removing ground from conductor 11 of cable 137 and the winding of relay MT1, and connecting ground by way of conductor 12 of cable 137 to the winding of relay MT2. The operation of these relays causes a symbol indicative of the phasing period to be printed on the monitor printer tapes in a manner more fully described hereinafter. Armature 216 of relay PH3 opens the circuit from the grounded armature 215 and make contact of relay C5 which controls relays SC1 to SC4, Fig. 8, and armature 227 of relay PH3 opens the circuit to the winding of relay CC1, Fig. 5.

Relay PH4, as it operates in series with relay PH3 after brush B1 has passed off segment 1 of ring R4, by the operation of its armature 352, removes ground from the winding of relay PH1, thereby causing the relays PH1 and PH to release. Armature 352 also connects ground to its make contact and one end of the winding of relay PH8 preparatory to its subsequent operation. The operation of armature 353 of relay PH4 transfers the operate circuit from relay PH3 to relay PH5, so that the subsequent passage of brush B1 over segment 1 of ring R4 will operate relay PH5. Armature 214 of relay PH4 removes battery from its break contact, conductor 213, and the windings of various control relays, to prevent their operation as brush B1 passes over certain of the segments of ring R4 during this and the subsequent phasing revolutions of the distributor TD. At the beginning of the first phasing revolution the cycle of transmission ceases and is not resumed until the second phasing revolution of the distributor has been completed, at which time the transmission cycle is continued.

After the brushes B1 and B2 of distributor TD have completed one phasing revolution and started the second revolution, ground is connected by way of segment 1 of ring R4, conductor 14 of cable 137, armature 200 and make contact of relay PH2, armature 353 and make contact of relay PH4, to the winding of relay PH5, thereby causing the operation of this relay which, as brush B1 leaves segment 1, locks in series with the winding of relay PH6, causing the relay PH6 to operate in series with relay PH5. Relay PH5 upon operation of its armatures 140 and 141 interchanges the connections between the monitor printers MP1 and MP2 and rings R2 and R3 of the transmitting distributor TD, so that during the second phasing revolution monitor printers MP1 are controlled from ring R2 and monitor printers MP2 are controlled from ring R3. Relay PH6, upon operating, interrupts the locking circuit of relay PH2 at the break contact and armature 362 of relay PH6, thereby causing the release of relay PH2. As relay PH2 released and its armature 363 left the make contact, ground was removed from conductor 1 of cables 137 and 199 thus causing the start magnet SM to release, provided, however, that the relay ST was operated to indicate that no other quotations were ready for transmission. It was assumed, however, that continuous quotations were being transmitted, therefore, relay ST is released and start magnet SM is held energized by ground from the break contact and armature 197 of relay ST.

As brush B1 engages segment 17 of ring R4 during the second phasing revolution, ground is connected by way of conductor 16 of cable 137, armature 302 and make contact of relay PH6 to one end of the winding of relay PH7, thereby causing relay PH7 to operate. As brush B1 passes off segment 17 and removes ground from conductor 16 of cable 137, relay PH7 locks by way of its armature 363 and make contact in series with the winding of relay PH8 to ground on the make contacts and armatures 352 and 364 of relays PH4 and PH5 respectively, thereby causing the operation of relay PH8. As relay PH8 operates its armature 355, ground is removed from one end of the windings of relays PH6 and PH4, thereby causing the release of these latter relays and relays PH5 and PH3 which were locked in series therewith. Armature 365 of relay PH8 upon engaging contact 358 reconnected ring R5 of the distributor TD, by way of conductor 10 of cable 137, armature 359 and contact 138 of relay PH3, to the winding of relay L1. As armature 365 of relay PH8 forces contact 358 from engagement with contact 357, ground which extended by way of armature 356 and its make contact of relay PH3 is disconnected from the winding of the line relay L1. As relay PH3 released, armature 359 disengaged from contact 138, and the latter contact connected with contact 360 and completed another circuit from the winding of relay L1 to ring R5 preparatory to the subsequent release of relay PH8 and the opening of a similar circuit from ring R5 to the winding of relay L1. As relays PH4 and PH5 released, ground on their armatures 352 and 364 respectively, was removed from the winding of relay PH8, thereby causing the release of relays PH8 and PH7, thus normalizing the transmitter and preparing it for regular quotation transmission for the time equivalent to another 120 revolutions of the transmitting distributor TD.

Relays MT1 and MT2, the first of which was deenergized and the second energized at the time of the operation of relay PH3, are, as heretofore stated, for the purpose of causing characters to be printed on the monitor printer tapes as an indication of the phasing period. Relay MT1 upon releasing disconnects certain of the segments of the rings R2 and R3 and relay MT2 upon operating, reconnects certain of these segments to cause signals to be transmitted for printing a series of characters such as, for example, the letters STOP.

Segments 2, 4 and 5 of group 1L, 1, 2, 3 and 4 of group 2L, 1, 2 and 3 of group 3L and 1, 4 and 6 of group PF, all of ring R2, which are connected by way of conductors 4 to 13 and 1, 2 and 3 respectively of cable 161 to correspondingly numbered contacts of relay MT1 are rendered ineffective by the released condition of relay MT1, as brush B1 passes over these segments. Segments 1 and 3 of group 1L, 5 of group 2L, 4 and 5 of group 3L and 2, 3 and 5 of group PF are connected by way of conductors 1 to 8 of cable 375 to separate contacts on relay MT2 which when operated during the phasing period, connects these contacts, conductors and segments together and to conductor 7 of cable 146, break contacts 145 of relay TR2, conductor 142, break contact and armature 140 of relay PH5 to the winding of relay M2. Brush B1 in crossing the segments of ring R2 during the first phasing revolution controls the operation of relay M2 and the printers MP2. Character signals, however, are determined by the circuit which is completed from certain of the segments of the groups 1L, 2L, 3L and PF of ring R2, through conductors of cable 375 and operated contacts of relay MT2 to the winding of relay M2. These signals may be of any suitable form to cause the printing of a characteristic symbol or series of symbols. One specific arrangement of symbols shown on the drawings by way of illustration is such as to cause the printing of the word Stop on the monitor printer tapes.

Segments 1 to 4 of group RA and 2 to 5 of group T of ring R3 which are connected by conductors 1 to 8 respectively of cable 152 to separate contacts of relay MT1. These segments are rendered ineffective during the two phasing revolutions, as relay MT1 is in the released condition at this time. Segments ST to 5 of groups U and F of ring R3 are connected by way of conductors 1 to 12 of cable 376 and operated contacts of relay MT2, to conductor 8 of cable 146 and thence by way of break contacts 144 of relay TR2, conductor 143 and break contact and armature 141 of relay PH5 to the winding of relay M1. As brush B1 passes over the segments of groups RA and T of ring R3 during the first phasing revolution, monitor printers MP1 are caused to operate and print on their tapes two characters indicative of the reception of blank signals. As each of the segments of groups U and F is crossed, a circuit is completed to relay M1, thereby maintaining it in the operated condition, thus causing the transmission of negative (marking) battery to the printers MP1 and maintaining them in their rest condition for the time of two complete character transmissions.

As the time of the operation of relay PH5 at the beginning of the second phasing revolution, the control circuits of relays M1 and M2 are interchanged so that during the second revolution the letters Stop are printed on the channel 1 monitor printer tapes and the channel 2 tapes display characters indicative of two blank signals.

Therefore, as stated, during the first phasing revolution of the distributor TD, ring R2 caused signals for the word Stop to be transmitted to the monitor printers MP2, and the monitor printers MP1 under control of the segments of ring R3 were caused to print two characters indicative of blank signals. During the second phasing revolution the monitor printers MP1 and MP2 were interchanged so that ring R2 caused monitor printers MP1 to print the word Stop and monitor printers MP2 printed two blank symbols.

The monitor printers MP1 and MP2 are also arranged to print the word Stop on their tapes once during each period of time equivalent to 120 revolutions of the distributor TD even though the transmitter is idle. Assuming that the transmitter is idle, brushes B1 and B2 are held at rest on their rest segments by latch 139, relay CH is not operated and relay ST is in its operated condition. Closure of the phasing contact 350 with its grounded contact completes a circuit by way of conductor 13 of cable 137 to operate relay PH. Interruption of the operate circuit of relay PH by the opening of the phasing contacts 350 causes relay PH1 to operate in series with the locking circuit of relay PH. Ground from segment 1 of ring R4 is extended by way of conductor 14 of cable 137, armature 200 and break contact of relay PH2, conductor 2 of cable 137, armature 210 and make contact of relay ST, break contact and armature 377 of relay CH, conductor 5 of cable 137, and armature 366 and make contact of relay PH1 to the winding of relay PH2 thereby operating relay PH2 which, upon operation, extends ground from conductor 14 of cable 137 at its armature 200 and make contact, armature 353 and its break contact of relay PH4 to operate relay PH3. Relay PH2 connects ground by way of its armature 363 and make contact, conductor 1 of cable 137, armature 198 and break contact of phasing key PK, and conductor 1 of cable 199 to the winding of start magnet SM which becomes energized and withdraws its latch 139 from engagement with the brush arm and releases brushes B1 and B2 for two revolutions during which the phasing relays PH to PH8 operate and the monitor printers print the phasing symbols on their tapes. During the second phasing revolution, at the time of the release of relay PH2, the circuit through the start magnet SM is interrupted at the armature 363 and contact of relay PH2, thus causing the latch 139 to be released and engage the brushes B1 and B2 at the end of the second phasing revolution. It is apparent therefore, that the phasing operation occurring during an idle transmission period, maintains the marking idle line condition of the line L and displays the phasing symbol on the printer tapes.

A phasing key PK, Fig. 8, provides for manually stopping the transmitter for any desired length of time, without the loss or mutilation of quotations in the process of transmission.

Assuming that the transmitter is operating continuously, and that the start magnet SM is held energized either by ground from armature 197 and its break contact of relay ST, of from armature 363 of relay PH2 or from some other source, extending by way of armature 198 and its break contact of key PK, and conductor 1 of cable 199 to the winding of magnet SM. Manual operation of the armature 198 will remove ground from the start magnet SM and permit its latch 139 to release to stop the brushes B1 and B2 provided the distributor is not at this time making a channel 1 or odd numbered revolution. In case the distributor is making a channel 1 revolution, relay CH which is operated during each odd numbered revolution and released during each even numbered revolution, will be operated and connect ground by way of its armature 315 and make contact, and conductor 1 of cable 199 to operate the start magnet SM and cause the brushes B1 and B2 to revolve for an even numbered revolution before coming to rest. The reclosure of the contact and armature 198 of the key PK permits transmission to continue.

Manual phasing neither prevents nor interferes in any way with the operation of the monitor printers MP1 and MP2 in printing the letters Stop during the regular fixed and recurring automatic phasing periods.

*MUX transmission*

In the system herein disclosed, provision is also made for the transmission of messages, news items and the like to the remote receiving stations. One character of the message is transmitted during each revolution of the transmitting distributor TD, this character signal being interspersed with the signals of the quotation transmitted at the time.

A multiplex transmitter MUX and multiplex printer PTR, Fig. 3, which are each of a type well known in the art, are employed in the transmission and monitoring of the character signals transmitted. Segments 1 to 5 of the group designated MUX of ring R6, Fig. 7, are connected by way of conductors 1 to 5 of cable 149, armatures 1 to 5 and their break contacts of relay TST2, Fig. 3, armatures 1 to 5 and break contacts of relay RW1 to the tongues 1 to 5 of the multiplex transmitter MUX. Armatures 1 to 5 of relay RW1 also connect to armatures 1 to 5 of relay PT, the operation of which latter relay connects the magnets 1 to 5 of the printer PTR to the tongues 1 to 5 of the multiplex tape transmitter MUX.

Stepping magnet S of the transmitter MUX has its winding connected to battery on one end and the other end extends by way of break contact of armature 6 of relay RW1 and conductor 155 to the make contact of armature 156 of relay CC1, Fig. 5, and also to the make contact of armature 1 of relay TPFR, Fig. 7, so that the operation of these relays by the passage of brush B1 over segments 2 and 3 of ring R4 causes ground to be applied to the conductor 155 and thereby energizes the stepping magnet S of transmitter MUX to advance the perforated tape one step in the transmitter.

The operation of relay C1, Fig. 7, by the brush B1 passing over segment 4 of ring R4 extends ground by way of armature 378 and its make contact of relay C1, conductor 7 of cable 149 and armature 7 and break contact of relay RW1 to the winding of relay PT, Fig. 3, thereby operating the relay PT. Relay PT in operating connects the windings of magnets 1 to 5 of printer PTR by way of the make contacts and armatures 1 to 5 of relay PT, armatures 1 to 5 and break contacts of relay RW1 to tongues 1 to 5 respectively, of the transmitter MUX causing the magnets 1 to 5 of the printer PTR to be energized in accordance with the combination set up on the tongues 1 to 5 of the transmitter MUX by the perforated tape.

Operation of armature 379 of relay C2 by the passage of brush B1 across segment 7 of ring R4 connects ground by way of conductor 6 of cable 149 to the winding 6 of the printer PTR. Energization of the winding 6 causes the code set up by the magnets 1 to 5 to be translated so that the printer causes a character, in accordance with the code received, to be printed upon the tape. Operation of the magnet 6 also restores the magnets of printer PTR to normal preparatory to receiving the signal for a succeeding character during the next revolution of the transmitting distributor TD.

Passage of brush B2 over the segments 1 to 5 of the group MUX of ring R6 successively connects the line Relay L1 to ring R5 and the segments 1 to 5 of ring R6 which are connected to the tongues 1 to 5 of the transmitter MUX. Ground by way of the make contacts and operated ones of tongues 1 to 5, which are positioned in accordance with the code of the perforated tape, extends to the MUX segments 1 to 5 of ring R6 and thus causes the line relay L1 to be actuated to transmit the character signal set up in the multiplex transmitter as brush B2 traverses these segments.

Succeeding revolutions of the distributor TD cause additional multiplex character signals to be transmitted in a similar manner, the tape for the multiplex transmitter being stepped ahead one position during each revolution of the distributor, and the printer PTR recording the transmitted information.

Rewrites indication

The multiplex character transmission time may also be utilized for the transmission of a special signal which is related to quotation signals transmitted during the same revolution. This special signal is utilized when it is desired that the quotation being transmitted should be displayed only on certain quotation boards at which a switch has been operated to condition the receiving station for the reception of such quotations. This feature is particularly adapted for the transmission of signals to rewrite a subscriber's board without changing the settings of other subscribers' boards.

The operation of the "rewrite" key on the keyset KS of Fig. 1 closes the contacts 15 and initiates the special rewrite signal. When it is desired that a quotation to be transmitted should be accompanied by the rewrite signal, the rewrite key is depressed prior to the depression of the other keys relating to the quotation, or, stated more specifically, the rewrite key is first depressed and then the letter, figure and range keys comprising a complete quotation are depressed.

The depression of the rewrite key as stated causes the closure of the contacts 15 of the keyset KS, thereby extending ground 163 by way of conductor 330 to one end of the winding 51A of the electromagnet RW of the overlap unit OU. Energization of the electromagnet RW causes the closure of the associated contacts 62 and 63 and thereby maintains the electromagnet energized.

After a quotation has been stored on the electromagnets 51 of the overlap unit and a range key has been depressed to store the range code and to cause the code combinations stored on the electromagnets 51 to be transferred to the contacts 66 and 67, the seeker relay SK associated with the particular overlap unit in which the quotation to be transmitted is stored, is caused to be released and the transmitter is set in operation preparator to transmitting the quotation in the manner heretofore described.

During the revolution of the distributor prior to the transmission of the quotation, the relay G2 which is associated with the overlap unit in which the quotation to be transmitted is stored, operates and connects ground by way of contact 66 and 67 of the electromagnet RW, conductor 16 of cable 303, contact 16 of relay G2 and thence by way of conductor 1 of cable 151 to armature 381 of relay BFR, Fig. 3. During the latter part of the revolution in which relay G2 was operated, relay BFR was operated as brush B1 crossed segment 14 of ring R4, and thereby caused the ground which extended from the contacts 66 and 67 of the electromagnet RW of the overlap unit OU through the previously traced circuit to armature 381 to be connected to the make contact associated with armature 381 of relay BFR and one end of the winding of relay RW, thus causing relay RW to operate and lock by way of its armature 6 and make contact, conductor 30 of cable 382 to ground on the break contact and armature 289 of relay C4.

As relay RW operated its armatures 1 to 4, it changed the connections between the segments 1 to 5 of the group PF of ring R2 and the armatures 147 and make contacts of relays PF1 and PF2, Fig. 5, so that signals which are indicative of a rewrite quotation will be transmitted to the monitor printer associated with the ring R2.

The fourth character position of each quotation printed on the monitor tapes is used for indicating common and preferred issues of stocks and rewrite transmissions. There are at least eight different symbols printed in this position for indicating these conditions, which symbols may be as follows:

1. An asterisk for common stocks.
2. The digit 1 for first preferred issues.
3. The digit 2 for second preferred issues.
4. The digit 3 for third preferred issues.
5. The symbol RW for rewritten common stocks.
6. The symbol R1 for rewritten first preferred issues of stocks.
7. The symbol R2 for rewritten second preferred issues of stocks.
8. The symbol R3 for rewritten third preferred issues of stocks.

Relays PF1 and PF2, Fig. 5, by their armatures 147 and make contacts, connect circuits to segments 4 and 5 of the group of segments PF of ring RA to control printing of the preferred symbols on the monitor tapes. The relay RW, when it is operated, switches the circuits to the segments 1 to 5 of the group PF of ring R2 thereby causing characteristic signals to be transmitted to the monitor printers representative of the various rewrite symbols.

The circuits for controlling the printing of the different rewrite symbols from the segments PF of ring R2 are similar and therefore the circuits for controlling the printing of only one such symbol will now be described. Assuming, for example, that the rewrite is for a second preferred stock and that contact 12 of the keyset KS closes and causes the operation of relay PF2 to indicate a second preferred item, relay RW is operated to indicate that the item is being rewritten. The following circuits are therefore established between the segments 1 to 5 of the group PF of ring R2 and relays PF2 and RW.

Segment 1 of the group PF is connected by way of conductor 1 of cable 161, operated contacts 1 of relay MT1, conductor 9 of cable 149, make contact and armature 4 of relay RW, conductor 16 of cable 382, break contacts 145 of relay TR2, conductor 142, break contact and armature 140 of relay PH5 to the winding of relay M2, it being also assumed that this quotation is for a channel 2 item and relay TR2 is therefore not operated.

Segment 2 of the group PF is connected by way of conductor 11 of cable 149, make contact and armature 1 of relay RW, conductor 2 of cable 151, armature 147 and the make contact of relay PF1, and thence by way of conductor 7 of cable 146 and break contacts 145 of relay TR2 from which the circuit continues to the winding of relay M2.

Segment 3 of the group PF its connected by conductor 12 of cable 149, make contact and armature 2 of relay RW, conductor 3 of cable 151 to the armature 147 of relay PF2, but as relay PF2 is unoperated, this circuit is without effect.

Segment 4 of the group PF is connected by way of conductor 2 of cable 161, contacts of relay MT1, conductor 10 of cable 149 to the break contact of armature 1 of relay RW. However, as the relay RW is operated no circuit is completed from segment 4.

Segment 5 of the group PF is connected by way of conductor 13 of cable 149, make contact and armature 3 of relay RW, conductor 16 of cable 382 to the break contacts 145 of relay TR2 from which the circuit continues to the winding of relay M2.

As brush B1 passes across the segments 1 to 5 of the group PF they are successively grounded, thereby causing the operation of relay M2 only as the brush crosses segments 1, 2 and 5. The operation of relay M2 thus controls the monitor printer MP2 to print the symbol R2 in accordance with the code combination having units 1, 2 and 5 marking and units 3 and 4 spacing in character which is indicative of a rewrite signal of the second preferred issue.

Relay RW in operating its armature 5 connects ground to one end of the winding RW1, thereby operating relay RW1, which locks by way of its make contact and armature 8 and conductor 15 of cable 382 to ground on the break contact and armature 383 of relay C5.

Relay RW1 upon operation of its armatures 1 to 7, disconnects the tongues 1 to 5 and the step magnet S of the transmitter MUX and opens the circuit to the winding of the relay PT, thereby preventing the operation of the transmitter MUX and the relay PT. Armature 4 of relay RW1 connects ground by way of its make contact, break contact and armature 4 of relay TST2, conductor 4 of cable 149 to segment 4 of the group MUX of ring R6 of the transmitting distributor TD. During the revolution of the distributor TD in which the rewrite quotation is transmitted, brush B2 in passing over segments 1 to 5 of the group MUX is grounded only as it passes over the 4th segment of this group, thereby causing the transmission to the receiving equipment of a code signal having the fourth unit only marking in character. This signal when received causes the quotation not to be posted unless a switch provided for the purpose has previously been operated. The operation of this switch causes the rewrite signal to be ineffective and thus permits the quotation to be posted.

During this revolution of the distributor, as segments 12 and 13 of ring R4 are grounded by the passage of brush B1 across them, relays C4 and C5 are operated respectively, and thereby cause the release of relays RW and RW1, thus restoring the system to its normal condition for the transmission of multiplex characters.

*Posting of special items*

In posting certain items, as for example, volume of sales, it is desirable that each display comprise 4 digits and that any one of these digits may be one of those from 0 to 9 or blank.

The transmission of information of this character is accomplished by writing the item to be posted twice on the keyset to effect two transmissions and using a different code number for each transmission.

During the first writing, a stock symbol, for example, VOL for Volume of sales, which has an arbitrary code number of 711 assigned to it, is used for transmitting the hundreds and tens digits of the item. During the second writing in which the units and fractions digits are transmitted, the keys for the symbol VOL are again depressed, but prior to their depression, the first preferred key of the keyset is operated, which closes the contacts 11. The operation of the keyset in this manner causes the operation of a relay SS1, Fig. 5, which changes the arbitrary code No. 711 assigned to the symbol VOL so that it will be transmitted subsequently as 811.

The receiving equipment is so arranged that when a code number whose hundreds digit is 7 is received, the tens and units price written on the keyset will be posted in the hundreds and tens positions of the item associated with that particular stock number and the reception of a code number whose hundreds digit is 8 will cause the tens and units price digits to be posted in the units and fractions positions of the selected item.

The operation of the transmitter in sending the hundreds and tens digits of an item is substantially the same as that for transmitting a quotation as heretofore described, except that the first digit of the code number is 7. In transmitting the units and fractions portions of information for an item the only difference in the operation of the keyset is that the first preferred key is depressed prior to the writing of any of the letters of the stock symbol. The depression of the first preferred key connects ground by way of contact 11 of keyset KS, conductor 384, armature 385 and break contact of relay P3, armature 386 and break contact of relay P2, armature 387 and break contact of relay P1 and thence by way of conductor 388, to one end of the winding 51A of the electromagnet SS of the overlap unit OU. The electromagnet SS is thus operated and locked by way of conductor 90, break contact 76 and grounded armature 75 of the overlap unit.

After the depression of the first preferred key, the operator writes the stock symbol, price and range in the usual manner. If the stock symbol includes a preferred issue symbol, the preferred keys are operated after the stock letters have been written as in the case of regular stock symbols. The depression of the first preferred key after any letter key has been depressed causes the operation of the second magnet of the group PF of the overlap unit OU, as one of the relays P1, P2 or P3, Fig. 1, was operated by the depression of a letter key thus causing the conductor 384 extending from contact 11 of the first preferred key to be switched by one of the armatures 387, 386 or 385 of relays P1, P2 or P3 respectively from its break to its make contact and conductor 389 and thence to the winding of the second magnet of the group PF of the overlap unit OU.

The depression of a range key causes the quotation stored on the electromagnets 51 of the overlap unit OU to be transferred to the contacts 66 and 67 of the overlap unit, and the transmitting distributor TD is set in motion to cause the transmission of this quotation.

At the beginning of the revolution of the transmitter TD in which the relay G1 is operated and at a time when relay CC1 operates its armature 11 to its make contact, ground from the operated contacts 66 and 67 of the electromagnet SS of the overlap unit OU is extended by way of conductor 3 of cable 390, contact 131 of relay G1, conductor 18 of cable 108 and armature 11 and make contact of relay CC1 to the winding of relay SS1, Fig. 5, thereby causing the operation of relay SS1 which locks by way of its make contact and armature 391 and conductor 232 to the break contact and grounded armature 233 of relay DR, Fig. 7.

Relay SS1 in operating its armature 122 from its break contact to its make contact disconnects the winding of relay HS8, Fig. 8, from terminal 8 of the group 117, Fig. 5, and connects this terminal by way of conductor 1 of cable 123 to the winding of relay HS7.

At a time when relay BF operates its armature 268 to extend battery by way of conductor 280 to the stock relays ABC, BB, etc., Fig. 5, a stock relay similar to relay ABC associated with the symbol written on the keyset, operates and connects ground to the terminal 8 of group 117 and to an arbitrarily assigned terminal in each of the group 118 and 119 corresponding to the hundreds, tens and units digits of a code number employed for selecting the item. Ground from terminal 8 extends by way of conductor 121, armature 122 and make contact of operated relay SS1 by way of conductor 1 of cable 123 to the winding of relay HS7, thereby causing it to operate and ground segment 1 of the group HSN of ring R6 of transmitting distributor TD so that brush B2 in connecting grounded segment 1 with ring R5 of the distributor causes the transmission of a signal indicative of the hundreds stock digit 7. Relay CC4 in operating at the end of the revolution of the distributor in which the stock symbol was translated, causes ground from contacts 66 and 67 of the electromagnet SS of the overlap unit to be connected by way of contact 392 of relay G2, conductor 21 of cable 108, armature 8 and its make contact of relay CC4, conductor 16 of cable 136 to one end of the winding of relay SS, Fig. 4, thereby operating the relay SS which locks by way of its armature 135 and conductor 247 to the break contact and grounded armature 240 of relay TPFR.

Relay SS by operating its armatures 1, 2 and 3 to their associated make contacts, connects segments 2, 3 and 5 of group F of ring R3 by way of conductors 8, 5 and 7 respectively to conductor 8 and thence by way of previously traced circuits to the monitor printer relay M1 or M2 operated by ring R3 during this revolution of the distributor to cause a character to be printed as an indication of the transmission of a special quotation, which in the specific arrangement shown on the drawings is 0.

Tape transmitter operation

The transmitting equipment herein described is arranged so that a tape transmitter may be substituted for a keyset in any one of the four positions of each channel in order that information previously perforated in a tape may be transmitted. For this purpose, two tape transmitters TT1 and TT2, Fig. 3, are provided, the former is for use with channel 1 and the latter for channel 2. The stepping magnets S of each of the tape transmitters TT1 and TT2 have battery connected to one end of their windings and the other end of each of these windings extends by way of conductors 5 and 6 respectively of cable 382 to the make contacts of armatures 400 and 401 of relay TS, Fig. 6. Armature 400 of relay TS is connected to ground by way of conductor 402, armature 404 and make contact of relay TTR1 when operated, armature 406 and break contact of relay TC1 and thence by way of conductor 7 of cable 382 to the break contact and grounded armature 408 of relay STT1, Fig. 3. Armature 401 of relay TS is similarly connected to ground by way of conductor 403, armature 405 and its make contact of relay TTR2 when operated, armature 407 and break contact of relay TC2 and thence by way of conductor 8 of cable 382 to the break contact and grounded armature 409 of relay STT2, Fig. 3.

Relay TS is operated four times during each revolution of the distributor TD as will appear from the description hereinafter. Each time relay TS operates and closes its armatures 400 and 401 to their associated make contacts, the stepping magnets S of the tape transmitters TT1 and TT2 are energized to cause the operation of the tape transmitters to advance their associated tapes one position.

During normal operation of the transmitter when no tape transmitters are in service, the stepping magnet circuits heretofore traced, are open at armatures 404 and 405 of relays TTR1 and TTR2 respectively, Fig. 6, thereby preventing operation of the tape transmitters.

Each tape transmitter TT1 and TT2 has associated therewith a switch 410 and 411 respectively, Fig. 3, and a relay TTR1 and TTR2, Fig. 6, under control of the switches 410 and 411. The relays TTR1 and TTR2 which control various control circuits in connection with tape transmission, have their respective windings connected by way of a make contact and break contact respectively of armature 412 of relay TR1, conductor 7 of cable 151, to the make contact of armature 413 of relay CC1, Fig. 5. When the distributor is rotating continuously, and switches 410 and 411 are closed to battery, the operation of relay CC1 during an odd numbered revolution will extend ground by way of armature 413 and its make contact of relay CC1, conductor 7 of cable 151, armature 412 and break contact of relay TR1, Fig. 6, to one end of the winding of relay TTR2, thereby causing relay TTR2 to operate and lock to ground on its make contact and armature 414.

During an even numbered revolution of the distributor TD, relay TR1 is in the operated position and the ground which is extended from armature 413 of relay CC1 by way of its associated make contact and conductor 7 of cable 151, is connected by way of armature 412 and its make contact of relay TR1 to one end of the winding of relay TTR1, thereby causing the relay TTR1 to operate and lock to ground by way of its make contact and armature 415.

Relays TC1 and TC2, Fig. 6, are associated with tape transmitters TT1 and TT2, Fig. 3, respectively and are utilized for preventing the operation of their associated tape transmitters at a time when a prior quotation is stored on the magnets 51 of the associated overlap unit OU, Fig. 1. For example, if a quotation is stored on the contacts 66 and 67 of an overlap unit and another quotation is stored on the magnets 51 of the same overlap unit, this latter quotation cannot be transferred to the contacts 66 and 67 until the first quotation has been transferred to the storage and decoding relays; therefore, during this period of time the tape transmitter associated with the overlap unit must be prevented from operating until the quotation on the magnets 51 has been transferred to the contacts 66 and 67.

A complete quotation comprises eight transverse rows of perforations on the tape, the first three perforated rows are used for the first, second and third letters of the stock number, the fourth row for the preferred issues, the fifth, sixth and seventh rows for the tens, units and fractions digits respectively of the price, and the eighth row for the range.

Assuming by way of example that a tape is inserted in the tape transmitter TT1 and that the transmitting apparatus is ready for operation, the operation of the transmitter is as follows:

Switch 393, Fig. 8, is opened thereby releasing relay ST which at its armature 197 extends ground to the winding of the start magnet SM. The start magnet is thus maintained energized, thereby withdrawing the latch 139 and causing the brushes B1 and B2 to revolve continuously.

Switch 410, Fig. 3, associated with tape transmitter TT1 is closed and connects battery by way of conductor 17 of cable 382 to one end of the winding of relay TTR1. Ground is connected to the other end of this winding by the operation of relay CC1 during the first even numbered revolution of the distributor occurring after switch 410 is closed. This circuit is completed by the grounded armature 413 and its make contact of relay CC1, conductor 7 of cable 151, armature 412 and its make contact of relay TR1 to the winding of relay TTR1 which operates and locks by way of its armature 415 and make contact to ground. Relay TTR1 remains operated until the switch 410 is opened.

During the beginning of the first even numbered revolution of the distributor after switch 410 has been closed, and at a time when relay TTR1 operates, operated armature 416 of relay CC1 extends ground by way of conductor 6 of cable 151, armature 417 and its make contact of relay TR1, armature 418 and its make contact of relay TTR1, armature 419 and its break contact of relay TC1 and thence by way of conductor 24 of cable 382, the slip connection 24 of the groups 158 and 159, conductor 52, armature 53 and its break contact of relay P3, armature 53 and its break contact of relay P2, armature 53 and break contact of relay P1 to one end of the winding of relay SQ1, thereby causing relay SQ1 to operate and subsequently lock in series with relay P1. Armature 420 of relay CC1 extends ground by way of conductor 1 of cable 421, armature 422 and make contact of relay TTR1, armature 423 and break contact of relay TC1 and thence by way of conductor 12 of cable 382 to one end of the winding of relay TCC1, thereby operating the armatures 1 to 5 of relay TCC1 to their associated contacts to connect the tongues 1 to 5 of the tape transmitter TT1 by way of the break contacts and armatures 1 to 5 of relay STT1, make contacts and armatures of relay TCC1, conductors 1 to 5 of cable 157, through slip connections 1 to 5 of the groups 158 and 159, conductors 1 to 5 of cable 50, operated armatures 1 to 5 and their make contacts of relay SQ1, conductors 1 to 5 of cable 171, and thence to the respective windings 51—A of the group 1L of the overlap unit, thereby causing the energization of magnets 51 by the tongues 1 to 5 of the tape transmitter TT1, in accordance with the code combination of the first letter of the stock symbol.

As brush B1 passes off segment 2 of ring R4 relay CC1 releases and as the brush engages segment 3, relay TPFR is operated and ground is extended by way of its armature 424 and make contact to the winding of relay TCC1 thereby maintaining it operated for the duration of the operation of relay TPFR.

The operation of relay TPFR connects ground by way of its armature 425 and make contact, and conductor 10 of cable 146 to one end of the winding of the tape step relay TS, the other end of which winding is connected to battery by way of conductor 213 and break contact and armature 214 of relay PH4. Relay TS in operating its armature 499 to the make contact, connects the ground which extends from armature 408 and its break contact of relay STT1, conductor 7 of cable 382, break contact and armature 406 of relay TC1, make contact and armature 404 of relay TRR1, and conductor 492 to armature 400 of relay TS by way of its make contact and conductor 5 of cable 382, to one end of the winding of the stepping magnet S of the tape transmitter TT1, thereby causing the energization of the stepping magnet S to step the perforations corresponding to the second letter of the stock symbol into the tape transmitter TT1.

The operation of relay C1 by brush B1 passing over segment 4 of ring R4, extends ground by way of armature 430 and its make contact of relay C1 to the winding of relay TS to maintain it operated for the duration of the time in which relay C1 is operated. It will be noted that the operation of relay TPFR as the brush B1 engaged segment 3 of ring R4, operated relay TS and the subsequent operation of relay C1 maintained relay TS operated after relay TPFR released. This arrangement provides for an impulse to the stepping magnet S of the tape transmitter TT1 of such a duration as to eliminate the possibility of failure of the tape transmitter to step the tape.

Relay C1 in operating its armature 431 extends ground to armature 53 of relay P1, Fig. 1, from whence the ground is connected by way of the associated make contact and make contact and armature 172 of relay SQ1 to the winding of relay SQ2 thereby operating the relay SQ2 which locks in series with relay P2 as relay C1 releases. Relay P2 in operating, causes the release of relays P1 and SQ1 as armature 170 and its break contact of relay P2 are opened.

As relay CC4 is operated by the passage of brush B1 across segment 6 of ring R4 grounded armature 432 of relay CC4 operates to its make contact and extends ground by way of conductor 1 of cable 421 in a manner previously described to the winding of relay TCC1. Relay TCC1 operates and again connects the tongues 1 to 5 of the tape transmitter TT1 to the conductors 1 to 5 of the cable 50 which extend by way of the armatures 1 to 5 and their make contacts of relay SQ2 to the respective windings of the magnets 51 of the group 2L of the overlap unit OU. Circuits are thus completed to cause the magnets 51 of the group 2L to operate in accordance with the settings of the tongues 1 to 5 of the tape transmitter TT1 corresponding to the second letter of the symbol.

As brush B1 passes off segment 6 and onto segment 7 of ring R4, relay CC4 is released and relay C2 is operated. Grounded armature 433 of relay C2 operates to its make contact and applies ground to maintain relay CC3 operated for the duration of the time relay C2 is operated.

Armature 434 and its make contact of relay C2 connects ground to the winding of relay TS, thereby causing the relay TS to operate and thus cause the operation of the tape transmitter TT1 to step the tape so that the perforations corresponding to the third letter of the symbol are in alignment with the feeler pins of the tape transmitter.

As brush B1 passes off segment 7 of ring R4 and onto segment 8, relay C2 is released and relay SNR is operated and its armature 435 connects ground by way of its make contact to maintain operation of the relay TS for the duration of the operation time of relay SNR. Armature 436 of relay SNR connects ground to armature 53 of relay P2 and thence by way of the make contact associated with this armature, make contact and armature 172 of relay SQ2 to the winding of relay SQ3 which operates and locks in series with relay P3 when relay SNR releases. Relay P3 in operating its armature 170 interrupts the locking circuit for relays P2 and SQ2, thereby causing their release.

As brush B2 passes over segment 10 of ring R4, relay CC2 operates and connects ground by way of its armature 437 and make contact to the winding of relay TCC1, thereby causing the operation of relay TCC1 which connects the tongues 1 to 5 of the tape transmitter TT1 to the conductors 1 to 5 of cable 50 from whence they are connected by way of armatures 1 to 5 and their associated make contacts of relay SQ3 of the magnets 51 of the group 3L of the overlap unit OU, thereby conditioning the magnets 51 of the group 3L in accordance with the settings of the tongues 1 to 5 of the tape transmitter TT1.

As the brush B1 passes off segment 10 of ring R4 onto segment 11, relay CC2 releases and relay C3 operates. Grounded armature 438 of relay C3 operates to its associated make contact and maintains relay TCC1 operated for the duration of the operating time of relay C3. Armature 443 of relay C3 connects ground by way of its associated make contact to the winding of relay TS, thereby causing the operation of relay TS, which operates the stepping magnet S of the tape transmitter TT1, and thereby steps the perforations into the tape transmitter TT1 which provides for the preferred designation.

As brush B1 engages segment 12 of ring R4, ground is applied to conductor 9 of cable 146, thereby operating relay C4. Relay C4 at its armature 275 applies ground to the winding of relay TS to step the tape to the next position, relay TS remaining operated over this circuit until the brush B1 has left segment 12.

Relay C4 in operating also moved its grounded armature 454 into engagement with the contact thereof thereby grounding conductor 1 of cable 457 from whence the circuit is continued through armature 456 and make contact of relay TTR1, armature 455 and break contact of relay TC1, conductor 27 of cable 382, slip connections 27 of the switch groups 158 and 159 respectively, conductor 175, armature 54 and break contact of relay SQ6, armature 54 and break contact 54 of relay SQ5, winding of relay SQ4, conductor 166, break contact and armature 167 of relay SQ7 to battery, thereby causing relay SQ4 to operate and lock by way of its armature 168 and make contact thereof, conductor 169, winding of relay P1 to the break contact and grounded armature 170 of relay P2. The operation of the sequence relay SQ4 prepares the sequence group for the reception of the tens price information. Although this operation may appear premature, as the preferred-special-stock information has not yet been transferred from the tape, it will be recalled in connection with the description of the operation of the sequence group using keyset transmission that no operations of sequence relays are required for the reception and storage of the preferred information. The sequence group may, therefore, be prepared at this time for the reception of the tens price information which will be transferred from the tape immediately following the preferred-special-stock information.

As the brush B1 engages segment 14 of ring R4, ground is placed on conductor 14 of cable 149, thereby operating relay BFR. As relay BFR moved its armature 448 into engagement with its contact, it placed ground upon conductor 9 of cable 382, armature 449 and make contact of relay TR1, armature 450 and make contact of relay TR1, armature 452, and break contact of relay TC1, conductor 10 of cable 382, winding of relay TCC2 and thence to battery. Relay TCC2 operates and closes through the No. 1, No. 4 and No. 5 pin contact leads from the tape transmitter to the SS, 1PF and the 2PF electromagnets respectively of the overlap unit OU, whereupon the code combination for preferred and special stock is stored in the overlap unit in accordance with the perforations on the tape and in the manner described for keyset operation.

As brush B1 engages segment 15 of the ring R4, relay DR is operated and at its armature 233 it places ground on conductor 5 of cable 146, armature 449 and make contact of relay TR1, armature 450 and make contact of relay TTR1, armature 452 and break contact of relay TC1, conductor 10 of cable 382, winding of relay TCC2 to battery, thereby holding relay TCC2 operated until the brush leaves segment 15. The operation of relay DR at its armature 301 placed ground upon conductor 453, conductor 10 of cable 146, thereby operating relay TS to step the tape for the fourth time and place the perforations for the tens-price in alignment with the tape pins. Conductor 10 of cable 146 is joined to segment 16 of ring R4 thus holding relay TS operated until the grounded brush B1 leaves this segment. This completes the first storing revolution for this quotation during which the code combinations for the stock letters and preferred-stock information has been transferred from the perforated tape to the storage elements of the overlap unit.

As brush B1 engages segment 17 of ring R4, ground is applied to conductor 15 of cable 137, armature 302 and break contact of relay PH6, conductor 8 of cable 151 and thence to the winding of relay CC3, Fig. 4, thereby causing relay CC3 to operate. As armature 9 of relay CC3 engages its contact it applies ground to conductor 9 of cable 151, armature 311 and make contact of relay TR2, winding of relay TR3 from whence the circuit is continued through the break contact and armature 214 of relay PH4 to battery. Relay TR3 operates over this circuit and at its contact 306 causes the release of relay TR1, relay TR2 remaining operated by the engagement of armature 312 and contact 314 of relay TR3 in series with the resistance 313 to battery.

As brush B1 leaves segment 17, relay CC3 releases, releasing relays TR3 and TR2.

The transmitting distributor now makes a second revolution during which the operations described for the preceding revolution are repeated and the sequence of operating relay TCC1 to close through the tape pin contact leads, stepping the tape, and advancing the sequence relay counting chain is continued for the transfer of the tens price, units price and fractions price information to the storage elements of the overlap unit.

Following the storing of the fractions price, a new set of operations takes place comprising the preparation of the circuits for storing the range code and tripping the overlap unit corresponding to the similar operations which take place during keyset transmission.

As the brush B1 engaged segment 10 of ring R4 ground was applied to conductor 2 of cable 242 to operate relay CC2 which at its armature 437 placed ground on conductor 1 of cable 421, armature 422 and make contact of relay TTR1, armature 423 and break contact of relay TC1, conductor 12 of cable 382 and thence to the winding of relay TCC1 causing relay TCC1 to operate. TCC1 is held operated under control of relay C3 until the brush B1 leaves segment 11 over the following circuit:

Battery winding of relay TCC1, conductor 12 of cable 382, break contact and armature 423 of relay TC1, make contact and armature 422 of relay TTR1, conductor 1 of cable 421, make contact and armature 438 of relay C3 to ground. The operation of relay C3 as segment 11 of ring R4 is engaged by the brush B1, operates relay TS thereby stepping the perforations for the range combination into alignment with the transmitter pins.

The brush B1 engages segment 12 of ring R4, ground is placed on conductor 9 of cable 146 thereby causing the relay C4 to operate and as armature 272 of relay C4 engages its make contact, ground is applied to conductor 14 of cable 146 to cause relay RA to operate and lock by way of its armature 273 to the break contact and grounded armature 274 of relay DR. The operation of relay RA causes relay SQ7 to operate over the following circuit:

Grounded conductor 3 of cable 132, contacts and armature 462 of relay RA, conductor 1 of cable 146, armature 461 and break contact of relay TR1, armature 459 and make contact of relay TTR1, conductor 28 of cable 382, terminals 28 of switch groups 158 and 159, winding of relay SQ7 to battery. The operation of relay SQ7 closes the path for the range selection signals to the overlap unit magnets.

As the brush engages segment 14 of ring R4, conductor 14 of cable 149 is grounded thereby causing relay BFR, Fig. 3 to operate and at its armature 279 apply ground to conductor 14 of cable 382, armature 458 and break contact of relay TR2, conductor 1 of cable 421, armature 422 and make contact of relay TTR1, armature 423 and break contact of relay TC1, conductor 12 of cable 382, winding of relay TCC1 and thence to battery, thereby causing relay TCC1 to operate and close through the tape pin contact leads for the transfer of the range selection to the overlap unit storing magnets. Relay TCC1 is held operated to armature 250 of relay DR until the brush B1 has passed segment 15 of ring R4 over the following circuit:

Grounded armature 250 and make contact of relay DR, conductor 6 of cable 146, armature 458 and break contact of relay TR2, conductor 1 of cable 421, armature 422 and make contact of relay TTR1, armature 423 and break contact of relay TC1, conductor 12 of cable 382, winding of relay TCC1 to battery.

The operation of relay SQ7 at its armature 167 placed battery on the magnets 69 of the overlap unit OU, thereby tripping the unit and transferring the settings of the selection magnets 51 of the unit to their respective contacts 66 and 67.

The operation of relay DR as the brush B1 engaged segment 15 of ring R4 caused the operation of relay TS over the following circuit:

Grounded armature 301 and make contact of relay DR, conductor 453, conductor 10 of cable 146, winding of relay TS and thence to battery. Relay TS remains operated until the brush has passed segment 16 of ring R4 as conductor 10 of cable 146 is connected to this segment. The operation of relay TS causes the tape in the tape transmitter to be stepped ahead one step so that the perforations corresponding to the first letter of the following stock designation are in alignment with the feeler pins of the tape transmitter. The seeker relay is released following the tripping of the overlap unit and since the quotation to be transmitted is a channel 1 quotation, the transmitting distributor TD makes two additional revolutions, during the first of which the code signals for the stock designation are translated into an arbitrarily assigned three digit stock number and during the second revolution the translated stock number and price signals comprising the quotation are transmitted over the line L to the receiving stations.

Briefly stated, the translation and transmission of a quotation following the tripping of the overlap unit is the same, regardless of whether the quotation signals were taken from a perforated tape or directly from a keyset.

Inasmuch as the last two revolutions of the distributor just referred to are similar to preliminary and transmitting revolutions using keyset operation of the transmitter which have been hereinbefore described in detail, a description of the details of operation of the transmitter during these revolutions would be repetitious and is therefore not again described to avoid making the description unnecessarily cumbersome.

*Tape transmission using four-step tape*

The transmitter shown on the drawings is arranged to transmit quotations on either or both channels under the joint control of a perforated tape and the keys shown on Fig. 3, in such a manner that the selection of the stock is controlled by the perforated tape and the price signals therefor by the groups of keys T, U, F and R of Fig. 3. This form of transmission is referred to hereinafter as semi-tape transmission to distinguish it from full-tape transmission wherein, as just described, eight transverse rows of perforations in the tape are employed for each complete quotation. In semi-tape transmission four perforations only for each quotation are required, these perforations corresponding to the first, second and third letters of the stock abbreviation and the preferred designation, if any. Should a stock designation have less than three letters, blank signals are perforated in the tape for any of these characters thus omitted, the tape invariably stepping ahead four steps for each quotation transmitted and therefore referred to as a four-step tape. When semi-tape transmission is in progress using a four-step tape the same range and price information set up on the code keys R, T, U and F, Fig. 3, will be transmitted for all stocks while the settings of these keys remain unchanged. It will be understood that the signal controlling the transmission of a special stock may be perforated into the tape as the fourth row of transverse perforations in lieu of the preferred signal thereof if desired. Assuming, by way of example, that a four-step tape is inserted in the tape transmitter TT1 with the first letter perforations of the first stock in alignment with the feeler pins of the transmitter and that the transmitting apparatus is ready for operation. The operation of the transmitter is as follows:

Keys 467 and 410 are closed and the range and price information to be sent out in connection with the stocks on the tape is set up on the R, T, U and F groups of code keys, Fig. 3, by operating them in accordance with the code permutations. Any key of these groups of code keys when operated to its closed position will cause the sending of a signal of marking character in the corresponding unit of the code.

The operation of key 467 caused relay STT1 to operate over the following circuit: Battery winding of relay STT1, conductor 18 of cable 472, contacts of key 467, conductor 19 of cable 382, break contact and armature 473 of relay TR2 to ground. During the first revolution of the transmitting distributor TD which, as will be recalled, is a preparatory revolution, relay STT1 although operated, performs no useful function and releases when relay TR2 operates as the brush leaves segment 17 of ring R4. The starting of the distributor takes place as in the case of full-tape transmission using 8-step tape.

Following the preparatory revolution of the distributor the preliminary storing revolution proceeds as in the case of full-tape transmission and the stock letters and preferred or special information is taken from the tape and stored in the same manner, the tape advancing four steps during this revolution. Relay TR2 is released at the end of this revolution and at its armature 473 applies ground to conductor 19 of cable 382 to again operate relay STT1. As the armatures 1, 2, 3, 4 and 5 of relay STT1 operated, the circuits to the tape pin contacts of the tape transmitter TT1 were opened and the circuits from the contacts of relay TCC1 and TCC2 were thus transferred from the tape transmitter TT1 to the armatures 474 to 478 of relay RA2. As armature 408 of relay STT1 operated, ground is removed from conductor 7 of cable 382, break contact and armature 406 of relay TC1, make contact and armature 404 of relay TTR1 and armature 400 of relay TS which circuit is continued through the associated contact of relay TS, conductor 5 of cable 382 to the winding of the stepping magnet S of the tape transmitter TT1 and thence to battery, thereby preventing the operation of the stepping magnet and advance of the tape beyond the fourth step as relay TS operates during this revolution of the distributor.

As armature 408 of relay STT1 engaged its front contact ground was applied to conductor 2 of cable 382 to the make contact of relay TS so that when armature 475 of relay TS operates and engages this contact, ground is applied to conductor 1 of cable 382, contacts 476 of relay RLS, armature 477 and break contact of relay RA2, armature 478 and break contact of relay FP2, armature 479 and break contact of relay UP2, winding of relay UP1, conductor 213, break contact and armature 214 of relay PH4 to battery. When relay CC1 operates as the brush grounds segment 2 of ring R4, relay TCC1 is operated from grounded armature 420 of relay CC1 over the following circuit: Ground, armature 420 and make contact of relay CC1, conductor 1 of cable 421, armature 422 and make contact of relay TTR1, armature 423 and break contact of relay TC1, conductor 12 of cable 382, winding of relay TCC1 to battery. The operation of relay TCC1 closes the leads from the group of tens keys T over conductors 5 to 8 of cable 472, break contacts and armatures 481 to 484 of relay UP2, break contacts and armatures 485 to 488 of relay FP2, break contacts and armatures 474 to 477 of relay RA2 from whence these circuit paths are completed through operated contacts of relays STT1 and TCC1 to the sequence relay group.

The following operation of relay TS from relay TPFR as the brush grounds segment 3 of ring R4 causes its armature 475 to engage the front contact thereof and place ground on conductor 1 of cable 382 to cause the operation of relay UP1. As the brush leaves segment 4 of ring R4, relay TS releases and ground is removed from conductor 1 of cable 382, thereby removing the shunt circuit from relay UP2 which now operates in series with relay UP1 over the following circuit: Ground, armature 491 and break contact of relay RA2, winding of relay UP2, make contact and armature 489 of relay UP1, winding of relay UP1 to battery on conductor 213. The operation of relay UP2 at its armatures 481 to 484 opens the circuit paths from the tens code keys and closes the circuits between the units code keys and the sequence relay group, these circuits including conductors 9, 10, 11 and 12 of cable 472 extending between the group of units keys and the make contacts of armatures 481 to 484 of relay UP2. The next operation of relay TCC1, therefore, causes the storing of the units price signals in the overlap unit. The next operation of relay TS when the brush grounds local segment No. 7 of ring R4 causing relay C2 to operate, again places ground on conductor 1 of cable 382 causing relay FP1 to operate over the following circuit: Grounded conductor 1 of cable 382, break contacts 476 of relay RLS, armature 477 and break contact of relay RA2, armature 478 and break contact of relay FP2, armature 479 and make contact of relay UP1, winding of relay FP1 to battery on conductor 213.

As armature 492 of relay FP1 engages its front contact, a circuit is closed through the winding of relay FP2 to the break contact and armature 491 of relay RA2. When relay TS releases ground is removed from conductor 1 of cable 382 and relay FP2 operates in series with relay FP1 to the grounded armature 491 of relay RA2. The operation of relay FP2 at its armatures 485 to 488 opens the circuits from the units code keys and closes circuit paths at the make contacts of armatures 486, 487 and 488 over conductors 13, 14 and 15 of cable 472 to the fractions group of keys F so that the fractions price code will be transferred to the overlap unit when the relay TCC1 again operates.

The next operation of relay TS from relay C3 as the brush B1 engages segment 11 of ring R4 again grounds conductor 1 of cable 382 causing the operation of relay RA1 over the following circuit: Grounded conductor 1 of cable 382, contacts 476 of relay RLS, armature 477 and break contact of relay RA2, armature 478 and make contact of relay FP2, winding of relay RA1 to battery on conductor 213. As armature 493 of relay RA1 engages its make contact, ground from conductor 1 of cable 382 is extended to the winding of relay RA2, the other end of which is connected to the break contact and armature 494 of relay RLS and thence to ground. When relay TS releases, the removal of ground from conductor 1 of cable 382 causes the operation of relay RA2 in series with relay RA1. Relays RA1 and RA2 both lock under control of relay RLS. The operation of relay RA2 opens the circuits from the fractions code keys at its armatures 474, 475 and 476 and at the make contact of armatures 478, 477, 476 and 475 and make contacts thereof, completes circuits by way of conductors 1, 2, 3 and 4 of cable 472 to the group of range keys so that the next operation of relay TCC1 will transfer the range selection signals to the overlap unit. As armature 491 of relay RA2 operated, ground was removed from the pairs of relays FP2, FP1 and UP2, UP1, causing these relays to release. After the range selection magnets of the overlap unit have taken their settings, the overlap unit is tripped in the same manner as described for full-tape operation.

The final operation of relay TS during this revolution of the transmitting distributor which occurs when the brush engages segment 15 of ring R4, thereby operating relay DR, again grounds conductor 1 of cable 382 causing the operation of relay RLS over the following circuit: Grounded conductor 1 of cable 382, contact 476 of relay RLS, armature 477 and make contact of relay RA2, winding of relay RLS to battery on conductor 213. As armature 495 of relay RLS engages its make contact a circuit is completed between grounded conductor 1 of cable 382 to one end of the winding of relay RLS, the other end of which is connected to battery on conductor 213, thereby maintaining relay RLS locked until the brush B1 has passed segment 16 of ring R4, at which time relay TS releases and removes the ground from conductor 1 of cable 382 thus causing relay RLS to release. The operation of relay RLS at its grounded armature 494 opened the locking circuit for relays RA1 and RA2 causing them to release.

Relay TR2 operates at the end of the revolution of the distributor and at its armature 473 removes ground from conductor 19 of cable 382, switch 467, Fig. 3, conductor 18 of cable 472 and the winding of relay STT1 causing relay STT1 to release and prepare circuits for the transfer of the first letter signal of the next stock from the perforated tape to the overlap unit.

Following the tripping of the overlap unit the cycle of operations of the transmitter in translating the stock abbreviation into a three digit stock number and transmitting this stock number with the range and price information to the monitor printers and the outgoing line L is identical with the operation of the transmitter when keyboard transmission is employed.

*Semi-tape transmission using eight-step tape*

This method of transmission is employed when there is available perforated eight-step tape complete the stock selection, range and price perforations, but when it is desired to use only the stock selection perforations comprising the first four of the eight steps from the tape and obtain the signals for the range and price portion of the quotation message from the R, T, U and F keys of Fig. 3. This condition may arise as for example when an eight-step tape has been perforated to transmit all of the previous closing prices of the stocks to be transmitted and it is desired to set up the same price on all of these stocks at the various stations to check the operation of the system.

When this method of transmission is employed the tape is stepped ahead eight steps for each quotation transmitted, the first four of which control the selection of each stock whereas the last four transverse rows of perforations for each stock will be ineffective and the range and price signals transmitted will be in accordance with the settings of the range and price keys of Fig. 3. To place the transmitter in condition for operation under these conditions an eight-step tape is inserted in one of the tape transmitters as, for example, the transmitter TT1 and the keys 469, 467 and 410 are closed. Key 393 is opened thereby releasing the start relay ST and thus setting the transmitting distributor in operation. Relay STT1 is operated by key 467 during alternate revolutions of the transmitting distributor in the same manner as when a four-step tape is employed. Ground from armature 408 of relay STT1 and break contact thereof will be extended to conductor 1 of cable 382, TS relay operates during the second storing revolution and the counting relays UP1, UP2, FP1, FP2, RA1 and RA2 will transfer the range and price information from the code keys to the contacts of relay TCC1, likewise the opening of the break contacts of armatures 1, 2, 3, 4 and 5 of relay STT1 will open the circuits from the tape pin contacts during this revolution. The tape, however, will continue to step during this revolution because although the ground for stepping the tape from armature 408 of relay STT1 is disengaged from its break contact by the operation of relay STT1, it is now replaced by ground from the closed contacts of key 469 over the following circuit: Grounded key 469, conductor 16 of cable 472, conductor 7 of cable 382, brake contact and armature 406 of relay TC1, make contact and armature 484 of relay TTR1, conductor 402, armature 400 and make contact of relay TS, conductor 5 of cable 382, winding of stepping magnet S of tape transmitter TT1 to battery.

Error release

If at any time during the operation of the keyset prior to the depression of a range key, the operator realizes that an error in the keyset operations has been made the incomplete quotation may be cancelled by depressing the error key of the operators keyset. When the error key is depressed, contact 8 of the keyset KS is closed thereby applying ground to conductor 187 and causing relay SQ7 to operate. Contact 9 of the keyset is also closed by the depression of the error key thereby placing ground on conductor 2 of cable 130 and causing the operation of the error relay ER, Fig. 2, associated with this keyset. The error relay locks by way of its armature 496 and make contact, conductor 4 of cable 130, contacts 76 and 75 of the overlap unit to ground. It also closes a circuit from its grounded armature 497 and make contact to conductor 498 and armature 191 and make contact of relay SK, thereby to maintain relay SK operated when ground is removed from conductor 3 of cable 130 by the opening of contacts 73 and 74 of the overlap unit as the overlap unit is tripped in response to armature 167 of relay SQ7 engaging its make contact as relay SQ7 operates. Since relay SK is thus not permitted to release, the transmitting distributor is not set into operation and the erroneous quotation is transferred by the tripping of the overlap unit from the selection magnets 55 thereof to the contacts 66 and 67, but is not transmitted to the line L or to the monitor printers.

As the contacts 75 and 76 were momentarily opened by the tripping of the overlap unit, ground was removed from conductor 4 of cable 130, thereby releasing the relay ER. Armature 479 of relay ER is not disengaged from its contact as relay ER releases until after contacts 73 and 74 of the overlap unit are again closed thereby to insure that relay SK does not release at this time.

If when preparing an eight-step quotation tape on a perforator the operator should make an error at any time before the range perforations are made, this perforated quotation may be cancelled by perforating a code signal for the letter T or any other character comprising a marking pulse in the No. 5 code unit in the range perforation position.

When the perforations for this quotation are passed through the tape transmitter the operations are normal until the relay SQ7 of the sequence group operates to close through the circuits to the range selection magnets of the overlap unit. The closure of the No. 5 tape pin contact of the tape transmitter causes the operation of the error relay ER in the seeker relay group over the following circuit: Ground, closed contacts of No. 5 feeler pin of the tape transmitter TT1, break contact and armature 5 of relay STT1, break contact and armature 498 of relay STT1, conductor 3, cable 382, break contact and armature 499 of relay TR1, conductor 3, cable 146, armature 501 and make contact of relay RA, conductor 1 of cable 502, terminals 503, 504 and 505 of the jack connectors 58 and 59, conductor 2 of cable 130, winding of relay ER to battery. The operation of relay ER prevents the transmission of the erroneous quotation in the same manner as when this relay is operated by the depression of the error key of the operators keyset.

Transmission of test signals

The key TK, Fig. 2, is employed to control the transmission of signals to the outgoing line L and the monitor printers for testing the receiving stations and the monitor printers. As is well known in systems employing transmitting and receiving distributors of the character herein disclosed, it is the practice to adjust the receiving distributors so that the best portion of the line signal will be received as the brushes of the receiving distributors pass over their respective segments. This adjustment is known as orientation and is usually made during the time when signals of alternate polarity are transmitted. The usual practice is to adjust the receiving distributor in one direction until failure of the receiving apparatus occurs, then adjust it in the other direction until the receiving apparatus again fails after which the distributor is set at a point midway between these two failure points. The failure points are indicated by a pointer coacting with a scale, which structure is a necessary part of such receiving apparatus including the monitor tickers. The description of the transmitting apparatus when sending test signals follows:

The key TK has three positions, the left or RYR position, the right or YRY position and the unoperated position shown on the drawings. When operated to the YRY position, it causes the transmission of test quotations having the first pulse of the hundreds digit of the stock number marking in character and all succeeding pulses alternate in polarity. The operation of the key TK to the position RYR provides for the first pulse of the hundreds digit of the stock to be spacing in character and all succeeding pulses alternate in polarity.

With the key TK in either of its operated positions, circuits are closed for operating the multi-contact relay 506 and relay TST2, Fig. 3. In either operated position of the key, the locking ground for the start relay ST is opened at contacts 512 or 513 of the key TK thereby, permitting this relay to release and set the transmitting distributor in operation. The circuit for the operation of relay 506 is completed through contacts 507 of the key TK when in the RYR operated position and through the contacts 508 when in the YRY position. The operation of relay TK at its contacts 510 or 516 places ground on conductor 3 of cable 511 and the winding of relay TST2 to cause this relay to operate. When key TK is moved to either operated position key contacts 512 or 513 are opened, thereby removing ground from conductor 514, armature 195 and make contact of each of the seeker relays in series, conductor 7 of cable 110, armature 196 and make contact of relay ST and one end of the winding of relay ST causing this relay to release and operate the distributor start magnet SM.

When the key TK is operated to the side YRY a set of contacts of the multi-contact relay 506 close ground from contacts 515 of the key TK to the multiple side of the seeker gang relays G1 and G2, which circuit is continued through cable 108 to the incoming leads of the several storage relay groups for storing pulses corresponding to stock YRY, second preferred, high, 552. This stock is cross-connected in the translator to transmit the stock number 222 and as the distributor rotates, this quotation is sent to the line and the monitor printers. The operation of relay TST2 opens the circuits from the MUX transmitter to the MUX segments of ring R6 and through the contacts energized from the key TK marks the MUX segments 1, 3 and 5 of ring R6, thus sending the multiplex signal for the letter Y over the following circuit:

Grounded contact 515 of key TK, conductor 1 of cable 511, make contact and armatures 1, 3 and 4 of relay TST2, conductors 1, 3 and 5 of cable 149 to MUX segments 1, 3 and 5 of ring R6.

When the key TK is operated to the side RYR, the codes for the letters RYR first preferred are stored in the letter storage relay groups and the MUX segments 2 and 4 are marked for transmission of the letter R over the following circuit as the brush crosses these segments:

Grounded contact 509 of key TK, conductor 2 of cable 511, contacts and armatures 2 and 5 of relay TST2, conductors 2 and 4 of cable 149 to the MUX segments 2 and 4 respectively. Stock RYR is cross-connected in the translator to transmit the stock No. 555.

When the key TK is restored to the unoperated position, relays 506 and TST2 release and the locking circuit for relay ST is reestablished at contacts 512 and 513 of the key so that when relay ST operates during an odd-numbered revolution of the distributor it locks, the operation of relay CH during the same revolution causing the distributor to make one additional revolution during which all operated storage relays and other associated relays are released. Relay CH also releases during this revolution and the distributor comes to rest at the end of this even-numbered revolution.

For purposes of illustration this invention has been described in connection with a stock quotation system, but it obviously is not so limited, being adapted for use in various systems for the dissemination of information. Also, the embodiment of the invention may take other specific forms without a departure from the spirit or principles herein described. The present embodiment is therefore illustrative and not restrictive, the scope of the invention being indicated by the appended claims rather than by the foregoing description, and all changes within the meaning and range of equivalency of the claims are intended to be embraced therein.

What is claimed and desired to be secured by U. S. Letters Patent is:

1. In a signaling system for disseminating information regarding various items, a transmitter comprising a distributor and plurality of operators' keysets for setting up information to be transmitted, a seeker for connecting said keysets to the transmitting distributor in accordance with the operator condition of the keysets, and a tape transmitter selectable by said seeker and interchangeable with any of said keysets for setting up signals indicative of quotations when selected for operation by the seeker.

2. In a system of the character described, a transmitting apparatus comprising a transmitting distributor and a plurality of keysets and a tape transmitter for causing said distributor to transmit a set of signals representative of a quotation or other message, means including a perforated tape for setting up a complete message in the tape transmitter, additional means whereby the message is set up in part by the keysets and in part by the tape transmitter, and means including said additional means for selectively causing the complete message to be transmitted by said transmitting distributor either under control of the tape transmitter alone or under the joint control of said tape transmitter and keysets.

3. In a system for transmitting information relating to stocks or other items, a plurality of transmission channels, a plurality of tape transmitters respectively connectable to said channels for initiating the information to be transmitted in regard to the selection, price and range of different items, a plurality of groups of settable keys for setting up information as to the price and range of the items and means whereby the price and range portion of the information set up in the tape transmitters is made ineffective while the price and range information is taken from the groups of keys.

4. In a signaling system comprising a distributor, means including a plurality of transmission channels, a plurality of tape transmitters respectively connectable to said channels for initiating a portion of a message to be transmitted over the associated channel, a set of keys for controlling the remainder of the message, said distributor being operatively associated with said tape transmitters and set of keys for transmitting said messages, and means for preventing the operation of the tape transmitters while the remainder of the message is being transmitted by the distributor.

5. In a signaling system for transmitting selection and price information regarding stocks or other items, a transmitting distributor, a tape transmitter including a tape perforated for a complete message comprising item selection and price information, a set of keys for setting up code combinations representative of the price signals to be transmitted, means for controlling the tape transmitter whereby the selection portion of the message is controlled by the tape transmitter and the price portion by the set of keys as the distributor operates, and means for stepping the tape in the tape transmitter past the price perforations while the price information set up on the keys is being transmitted by the distributor.

6. In a system of the character disclosed, the combination of two transmitting channels, two groups of keysets individual to each of said two channels, a seeker mechanism, a plurality of tape transmitters respectively connectable to said channels and selectable by said seeker mechanism, a transmitting distributor, and means whereby the tape transmitters may be substituted for any of the keysets to control the transmitting distributor as the tape transmitters are selected for operation by the seeker mechanism.

7. In a signaling system for disseminating information regarding various items, the combination of several operators' keysets, each including letter designation and preferred selection keys, a plurality of storage means respectively associated with the keysets for storing signals representative of the information set up on the keys, a transmitting distributor, a translating device intermediate the storage means and distributor for automatically converting the signals set up by the letter selection and preferred keys into a numerical equivalent, and a seeker device controlled by the transmitting distributor for bringing said plurality of storage means into operative relationship with the transmitting distributor in a predetermined order in accordance with the operated condition of the keysets.

8. In a market quotation system, a series of groups of keylevers comprising selection, price digit and special signal keys, a transmitting distributor having stock selection segments, multiplex segments, price and range segments, a multiplex transmitter normally operative to transmit a character signal from the multiplex segments as the distributor operates, means controlled by the special signal key for rendering the multiplex transmitter ineffective, and means for transmitting the special signal over the multiplex segments while the stock number, price and range signals are transmitted by the stock, selection, price and range segments.

9. In a posting system for stocks and the like, several keysets for setting up quotations to be posted, each keyset including alphabetical selection and price digit keylevers, storage means associated with each of the keysets, translating means common to the keysets for converting said alphabetical selection into a stock number, a seeker mechanism for successively connecting said keysets to the translating means, and a transmitting distributor controlled by the keysets and said translating means for transmitting quotations in accordance with the operated keys of the keysets.

10. In a signaling system, a transmitting station, a keyset having selection and price digit keys, said selection keys arranged to transmit a permutation code signal having the number of code units different from the signals transmitted by the price digit keys, translating means automatically responsive to the keyset operation for changing the selection code set up by the keyset into a code having the same number of code units as the code set up by the price digit keys, a set of elements for storing the translated code signals, a transmitting distributor controlled by said set of elements and the price digit keys for sending signals over a line outgoing from said transmitting station, and a pair of monitor printers operated by the transmitting distributor and said set of elements for posting the quotation as the distributor operates.

11. In a stock quotation system, a keyset having alphabetical keys and preferred keys operable in accordance with the stock designation and a set of price digit keys, an overlap unit for storing the quotation signals set up on the keyset, a set of letter storage relays operated by certain of the storage elements of the overlap unit, a set of price and range relays operated by other of the storage elements of the overlap unit, a set of decoding relays operated by the said set of letter storage relays, a plurality of stock relays, means for selecting any of the stock relays in accordance with the operated decoding relays and preferred keys, a plurality of groups of stock number relays corresponding in number to the number of digits in the stock number, means for operating a relay in each of the groups of stock number relays in accordance with the stock relay selected, an outgoing line, and a transmitting distributor controlled by the operated ones of the stock number relays and the price and range relays for transmitting permutation code signals over said outgoing line.

12. In a signaling system for disseminating information regarding various items, a transmitter comprising a plurality of operators' keysets for setting up letters and digits respectively comprising the designation and price of the item, a translating device controlled by the keyset for changing the letter designation into a numerical signal, a first set of devices for storing the letter designation, a second set of devices for storing the numerical signal, a transmitting channel, a plurality of monitor printers, and a transmitting distributor controlled by the said first and second sets of devices for causing the monitor printers to post the letter designation set up in the first set of devices and for transmitting over said channel the numerical signal set up in the second set of devices.

13. In a market quotation system, a transmitting distributor having stock number segments, multplex segments and price and range segments, a series of key levers comprising selection, price and a special signal key, a multiplex transmitter normally operative to transmit a character signal from the multiplex segments as the distributor operates, a posting device controlled by said transmitting distributor, and means controlled by the special signal key for rendering the multiplex transmitter ineffective and causing said multiplex segments to transmit a special signal for operating said posting device to post a character representative of the special signal.

14. In a quotation system, two transmitting channels, two groups of keysets individual to each of said two channels for setting up quotations each comprising alphabetical item designation and numerical price signals, a translating device common to the keysets for converting said alphabetical item designation signals into numerical item selection signals, a transmitting distributor, means controlled jointly by any of the said keysets and the translating device for causing the distributor to transmit said numerical selection and price signals, said means operatively connecting said transmitter and translating device to the groups of keysets alternately as the distributor transmits the quotation signals over the channels.

WILLIAM F. QUINBY.